(12) United States Patent
Edris et al.

(10) Patent No.: US 10,330,559 B2
(45) Date of Patent: Jun. 25, 2019

(54) METHODS AND APPARATUS FOR CHECKING EMITTER BONDS IN AN IRRIGATION DRIP LINE

(71) Applicant: Rain Bird Corporation, Azusa, CA (US)

(72) Inventors: Mark Richard Edris, Glendora, CA (US); Farshad Motamedi, Claremont, CA (US); Berj Zakarian, Redlands, CA (US); Mark Murphy Ensworth, Orange, CA (US)

(73) Assignee: Rain Bird Corporation, Azusa, CA (US)

( * ) Notice: Subject to any disclaimer, the term of this patent is extended or adjusted under 35 U.S.C. 154(b) by 78 days.

(21) Appl. No.: 14/851,545

(22) Filed: Sep. 11, 2015

(65) Prior Publication Data
US 2016/0076965 A1    Mar. 17, 2016

Related U.S. Application Data

(60) Provisional application No. 62/049,327, filed on Sep. 11, 2014.

(51) Int. Cl.
| *G01M 3/28* | (2006.01) |
| *G01M 3/04* | (2006.01) |
| *G01M 3/26* | (2006.01) |
| *G01M 3/06* | (2006.01) |
| *A01G 25/02* | (2006.01) |

(52) U.S. Cl.
CPC ............ *G01M 3/28* (2013.01); *A01G 25/026* (2013.01); *G01M 3/04* (2013.01); *G01M 3/06* (2013.01); *G01M 3/26* (2013.01)

(58) Field of Classification Search
CPC .................................. G01M 3/28; G01M 3/08
See application file for complete search history.

(56) References Cited

U.S. PATENT DOCUMENTS

| 2,174,515 A | 10/1939 | Hughes |
| 2,449,731 A | 9/1948 | Therrien |
| 2,508,403 A | 5/1950 | Knauss |

(Continued)

FOREIGN PATENT DOCUMENTS

| AU | 511876 | 10/1978 |
| AU | 2004208646 | 3/2006 |

(Continued)

OTHER PUBLICATIONS

USPTO; U.S. Appl. No. 12/495,193; Notice of Allowance dated Feb. 10, 2017.

(Continued)

*Primary Examiner* — Eric S. McCall
*Assistant Examiner* — Timothy P Graves
(74) *Attorney, Agent, or Firm* — Fitch, Even, Tabin & Flannery LLP

(57) ABSTRACT

Methods and apparatus for checking emitter bonds in an irrigation drip line and for manufacturing drip line in a manner that allows the bond between the in-line emitter and surrounding conduit to be checked. In one form, a downstream in-line vacuum tester is provided for monitoring the amount of air escaping from outlet openings in the drip line to detect excessive air associated with poorly bonded emitters.

19 Claims, 25 Drawing Sheets

(56) References Cited

U.S. PATENT DOCUMENTS

| | | | |
|---|---|---|---|
| 2,625,429 A | 1/1953 | Coles | |
| 2,639,194 A | 5/1953 | Wahlin | |
| 2,683,061 A | 7/1954 | Tuttle, Jr. | |
| 2,762,397 A | 9/1956 | Miller | |
| 2,794,321 A | 6/1957 | Warner | |
| 2,873,030 A | 2/1959 | Ashton | |
| 2,970,923 A | 2/1961 | Sparman | |
| 3,004,330 A | 10/1961 | Wilkins | |
| 3,155,612 A | 11/1964 | Weber | |
| 3,182,916 A | 5/1965 | Schulz | |
| 3,199,901 A | 8/1965 | Jeppsson | |
| 3,302,450 A * | 2/1967 | Wakar | G01M 3/04 73/45.5 |
| 3,323,550 A | 6/1967 | Lee | |
| 3,361,359 A | 1/1968 | Chapin | |
| 3,420,064 A | 1/1969 | Blass et al. | |
| 3,426,544 A | 2/1969 | Curtis | |
| 3,434,500 A | 3/1969 | Burrows | |
| 3,467,142 A | 9/1969 | Boyle et al. | |
| 3,586,291 A | 6/1971 | Malec | |
| 3,672,571 A | 6/1972 | Goodricke | |
| 3,693,888 A | 9/1972 | Rondas et al. | |
| 3,697,002 A | 10/1972 | Parkison | |
| 3,698,195 A | 10/1972 | Chapin | |
| 3,719,327 A | 3/1973 | McMahan | |
| 3,727,635 A | 4/1973 | Todd | |
| 3,729,142 A | 4/1973 | Rangel-Garza et al. | |
| 3,753,527 A | 8/1973 | Galbraith et al. | |
| 3,777,980 A | 12/1973 | Allport | |
| 3,777,987 A | 12/1973 | Allport | |
| 3,779,468 A | 12/1973 | Spencer | |
| 3,780,946 A | 12/1973 | Smith et al. | |
| 3,791,587 A | 2/1974 | Drori | |
| 3,792,588 A | 2/1974 | Gilaad | |
| 3,797,741 A | 3/1974 | Spencer | |
| 3,804,334 A | 4/1974 | Curry | |
| 3,807,430 A | 4/1974 | Keller | |
| 3,814,377 A | 6/1974 | Todd | |
| 3,815,636 A | 6/1974 | Menzel | |
| RE28,095 E | 7/1974 | Chapin | |
| 3,833,019 A | 9/1974 | Diggs | |
| 3,851,896 A | 12/1974 | Olson | |
| 3,856,333 A | 12/1974 | Cox | |
| 3,863,845 A | 2/1975 | Bumpstead | |
| 3,866,833 A | 2/1975 | Susumu | |
| 3,870,236 A | 3/1975 | Sahagun-Barragan | |
| 3,873,030 A | 3/1975 | Barragan | |
| 3,874,598 A | 4/1975 | Havens | |
| 3,882,892 A | 5/1975 | Menzel | |
| 3,895,085 A | 7/1975 | Suzuki et al. | |
| 3,896,999 A | 7/1975 | Barragan | |
| 3,903,929 A | 9/1975 | Mock | |
| 3,940,066 A | 2/1976 | Hunter | |
| 3,948,285 A | 4/1976 | Flynn | |
| 3,954,223 A | 5/1976 | Wichman et al. | |
| 3,957,292 A | 5/1976 | Diggs | |
| 3,966,233 A | 6/1976 | Diggs | |
| 3,970,251 A | 7/1976 | Harmony | |
| 3,981,452 A | 9/1976 | Eckstein | |
| 3,993,248 A | 11/1976 | Harmony | |
| 3,998,244 A | 12/1976 | Bentley | |
| 3,998,391 A | 12/1976 | Lemelshtrich | |
| 3,998,427 A | 12/1976 | Bentley | |
| 4,008,853 A | 2/1977 | Tregillus | |
| 4,017,958 A | 4/1977 | Diggs | |
| 4,022,384 A | 5/1977 | Hoyle | |
| 4,036,435 A | 7/1977 | Pecaro | |
| 4,037,791 A | 7/1977 | Mullett | |
| 4,047,995 A | 9/1977 | Leal-Diaz | |
| 4,054,152 A | 10/1977 | Ito | |
| 4,058,257 A | 11/1977 | Spencer | |
| 4,059,228 A | 11/1977 | Werner | |
| 4,077,570 A | 3/1978 | Harmony | |
| 4,077,571 A | 3/1978 | Harmony | |
| 4,084,749 A | 4/1978 | Drori | |
| 4,092,002 A | 5/1978 | Grosse | |
| 4,095,750 A | 6/1978 | Gilead | |
| 4,105,162 A | 8/1978 | Drori | |
| 4,121,771 A | 10/1978 | Hendrickson | |
| 4,122,590 A | 10/1978 | Spencer | |
| 4,132,364 A | 1/1979 | Harmony | |
| 4,134,550 A | 1/1979 | Bright | |
| 4,143,820 A | 3/1979 | Bright, Sr. | |
| 4,160,323 A * | 7/1979 | Tracy | A61G 15/14 312/209 |
| 4,161,291 A | 7/1979 | Bentley | |
| 4,177,946 A | 12/1979 | Sahagun-Barragan | |
| 4,177,947 A | 12/1979 | Menzel | |
| 4,196,753 A | 4/1980 | Hammarstedt | |
| 4,196,853 A | 4/1980 | Delmer | |
| 4,209,133 A | 6/1980 | Mehoudar | |
| 4,210,287 A | 7/1980 | Mehoudar | |
| 4,223,838 A | 9/1980 | Maria-Vittorio-Torrisi | |
| 4,225,307 A | 9/1980 | Magera | |
| 4,226,368 A | 10/1980 | Hunter | |
| 4,235,380 A | 11/1980 | Delmer | |
| 4,247,051 A | 1/1981 | Allport | |
| 4,250,915 A | 2/1981 | Rikuta | |
| 4,274,597 A | 6/1981 | Dobos | |
| 4,307,841 A | 12/1981 | Mehoudar | |
| 4,331,293 A | 5/1982 | Rangel-Garza | |
| 4,354,639 A | 10/1982 | Delmer | |
| 4,366,926 A | 1/1983 | Mehoudar | |
| 4,369,923 A | 1/1983 | Bron | |
| 4,384,680 A | 5/1983 | Mehoudar | |
| 4,385,727 A | 5/1983 | Spencer | |
| 4,385,757 A | 5/1983 | Muller | |
| 4,413,786 A | 11/1983 | Mehoudar | |
| 4,413,787 A | 11/1983 | Gilead | |
| 4,423,838 A | 1/1984 | Dinur | |
| 4,424,936 A | 1/1984 | Marc | |
| 4,430,020 A | 2/1984 | Robbins | |
| 4,460,129 A | 7/1984 | Olsen | |
| 4,473,191 A | 9/1984 | Chapin | |
| 4,473,525 A | 9/1984 | Drori | |
| 4,502,631 A | 3/1985 | Christen | |
| 4,508,140 A | 4/1985 | Harrison | |
| 4,513,777 A | 4/1985 | Wright | |
| 4,519,546 A | 5/1985 | Gorney | |
| 4,534,515 A | 8/1985 | Chapin | |
| 4,545,784 A | 10/1985 | Sanderson | |
| 4,572,756 A | 2/1986 | Chapin | |
| 4,573,640 A | 3/1986 | Mehoudar | |
| 4,593,857 A | 6/1986 | Raz | |
| 4,613,080 A | 9/1986 | Benson | |
| 4,626,130 A | 12/1986 | Chapin | |
| 4,627,903 A | 12/1986 | Chapman | |
| 4,642,152 A | 2/1987 | Chapin | |
| 4,653,695 A | 3/1987 | Eckstein | |
| 4,687,143 A | 8/1987 | Gorney | |
| 4,702,787 A | 10/1987 | Ruskin | |
| 4,718,608 A | 1/1988 | Mehoudar | |
| 4,722,481 A | 2/1988 | Lemkin | |
| 4,722,759 A | 2/1988 | Roberts | |
| 4,726,520 A | 2/1988 | Brown | |
| 4,726,527 A | 2/1988 | Mendenhall | |
| 4,728,042 A | 3/1988 | Gorney | |
| 4,735,363 A | 4/1988 | Shfaram | |
| 4,749,130 A | 6/1988 | Utzinger | |
| 4,753,394 A | 6/1988 | Goodman | |
| 4,756,339 A | 7/1988 | Buluschek | |
| 4,765,541 A | 8/1988 | Mangels | |
| 4,775,046 A | 10/1988 | Gramarossa | |
| 4,781,217 A | 11/1988 | Rosenberg | |
| 4,789,005 A | 12/1988 | Griffiths | |
| 4,796,660 A | 1/1989 | Bron | |
| 4,807,668 A | 2/1989 | Roberts | |
| 4,817,875 A | 4/1989 | Karmeli | |
| 4,824,019 A | 4/1989 | Lew | |
| 4,824,025 A | 4/1989 | Miller | |
| 4,854,158 A | 8/1989 | Gates | |
| 4,856,552 A | 8/1989 | Hiemstra | |
| 4,859,264 A | 8/1989 | Buluschek | |
| 4,862,731 A | 9/1989 | Gates | |

(56) References Cited

U.S. PATENT DOCUMENTS

| | | |
|---|---|---|
| 4,874,132 A | 10/1989 | Gilead |
| 4,880,167 A | 11/1989 | Langa et al. |
| 4,900,437 A | 2/1990 | Savall |
| 4,909,411 A | 3/1990 | Uchida |
| 4,948,295 A | 8/1990 | Pramsoler |
| 4,984,739 A | 1/1991 | Allport |
| 5,022,940 A | 6/1991 | Mehoudar |
| 5,031,837 A | 7/1991 | Hanish |
| 5,040,770 A | 8/1991 | Rajster |
| 5,052,625 A | 10/1991 | Ruskin |
| 5,096,206 A | 3/1992 | Andre |
| 5,111,995 A | 5/1992 | Dumitrascu |
| 5,111,996 A | 5/1992 | Eckstein |
| 5,116,414 A | 5/1992 | Burton |
| 5,118,042 A | 6/1992 | Delmer et al. |
| 5,122,044 A | 6/1992 | Mehoudar |
| 5,123,984 A | 6/1992 | Allport |
| 5,137,216 A | 8/1992 | Hanish |
| 5,141,360 A | 8/1992 | Zeman |
| 5,163,622 A | 11/1992 | Cohen |
| 5,181,952 A | 1/1993 | Burton |
| 5,183,208 A | 2/1993 | Cohen |
| 5,192,027 A | 3/1993 | Delmer |
| 5,200,132 A | 4/1993 | Shfaram |
| 5,203,503 A | 4/1993 | Cohen |
| 5,207,386 A | 5/1993 | Mehoudar |
| 5,232,159 A | 8/1993 | Abbate, Sr. |
| 5,232,160 A | 8/1993 | Hendrickson |
| 5,236,130 A | 8/1993 | Hadar |
| 5,246,171 A | 9/1993 | Roberts |
| 5,252,162 A | 10/1993 | Delmer |
| 5,253,807 A | 10/1993 | Newbegin |
| 5,271,786 A | 12/1993 | Gorney |
| 5,279,462 A | 1/1994 | Mehoudar |
| 5,282,578 A | 2/1994 | DeFrank |
| 5,282,916 A | 2/1994 | Bloom |
| 5,283,916 A | 2/1994 | Haro |
| 5,310,438 A | 5/1994 | Ruskin |
| 5,314,116 A | 5/1994 | Krauth |
| 5,318,657 A | 6/1994 | Roberts |
| 5,324,371 A | 6/1994 | Mehoudar |
| 5,324,379 A | 6/1994 | Eckstein |
| 5,327,941 A | 7/1994 | Bitsakis |
| 5,330,107 A | 7/1994 | Karathanos |
| 5,332,160 A | 7/1994 | Ruskin |
| 5,333,793 A | 8/1994 | DeFrank |
| 5,337,597 A * | 8/1994 | Peake .................. G01M 3/10 73/45.5 |
| 5,353,993 A | 10/1994 | Rosenberg |
| 5,364,032 A | 11/1994 | DeFrank |
| 5,399,160 A | 3/1995 | Dunberger |
| 5,400,973 A | 3/1995 | Cohen |
| 5,441,203 A | 8/1995 | Swan |
| 5,442,001 A | 8/1995 | Jones |
| 5,443,212 A | 8/1995 | Dinur |
| 5,449,250 A | 9/1995 | Burton |
| 5,465,905 A | 11/1995 | Elder |
| 5,522,551 A | 6/1996 | DeFrank |
| 5,531,381 A | 7/1996 | Ruttenberg |
| 5,535,778 A | 7/1996 | Zakai |
| 5,584,952 A | 12/1996 | Rubenstein |
| 5,586,727 A | 12/1996 | Shekalim |
| 5,591,293 A | 1/1997 | Miller |
| 5,601,381 A | 2/1997 | Hadar |
| 5,609,303 A | 3/1997 | Cohen |
| 5,615,833 A | 4/1997 | Robillard et al. |
| 5,615,838 A | 4/1997 | Eckstein et al. |
| 5,620,143 A | 4/1997 | Delmer |
| 5,628,462 A | 5/1997 | Miller |
| 5,634,594 A | 6/1997 | Cohen |
| 5,636,797 A | 6/1997 | Cohen |
| 5,641,113 A | 6/1997 | Somaki |
| 5,651,999 A | 7/1997 | Armentrout |
| 5,673,852 A | 10/1997 | Roberts |
| 5,676,897 A | 10/1997 | Dermitzakis |
| 5,695,127 A | 12/1997 | Delmer |
| 5,711,482 A | 1/1998 | Yu |
| 5,722,601 A | 3/1998 | DeFrank |
| 5,727,733 A | 3/1998 | Ruttenberg |
| 5,732,887 A | 3/1998 | Roberts |
| 5,744,423 A | 4/1998 | Voris |
| 5,744,779 A | 4/1998 | Buluschek |
| 5,785,785 A | 7/1998 | Delmer |
| 5,813,603 A | 9/1998 | Kurtz |
| 5,820,028 A | 10/1998 | Dinur |
| 5,820,029 A | 10/1998 | Marans |
| 5,829,685 A | 11/1998 | Cohen |
| 5,829,686 A | 11/1998 | Cohen |
| 5,855,324 A | 1/1999 | DeFrank et al. |
| 5,865,377 A | 2/1999 | DeFrank |
| 5,871,325 A | 2/1999 | Schmidt |
| 5,875,815 A | 3/1999 | Ungerecht |
| 5,898,019 A | 4/1999 | VanVoris |
| 5,944,260 A | 8/1999 | Wang |
| 5,957,391 A | 9/1999 | DeFrank et al. |
| 5,972,375 A | 10/1999 | Truter |
| 5,988,211 A | 11/1999 | Cornell |
| 6,015,102 A | 1/2000 | Daigle |
| 6,026,850 A | 2/2000 | Newton |
| 6,027,048 A | 2/2000 | Mehoudar |
| 6,039,270 A | 3/2000 | Dermitzakis |
| 6,062,245 A | 5/2000 | Berglind |
| 6,095,185 A | 8/2000 | Rosenberg |
| 6,109,296 A | 8/2000 | Austin |
| 6,116,523 A | 9/2000 | Cabahug |
| 6,120,634 A | 9/2000 | Harrold |
| 6,179,949 B1 | 1/2001 | Buluschek |
| 6,180,162 B1 | 1/2001 | Shigeru |
| 6,206,305 B1 | 3/2001 | Mehoudar |
| 6,213,408 B1 | 4/2001 | Shekalim |
| 6,238,081 B1 | 5/2001 | Sand |
| 6,250,571 B1 | 6/2001 | Cohen |
| 6,280,554 B1 | 8/2001 | Lambert et al. |
| 6,302,338 B1 | 10/2001 | Cohen |
| 6,308,902 B1 | 10/2001 | Huntley |
| 6,334,958 B1 | 1/2002 | Ruskin |
| 6,343,616 B1 | 2/2002 | Houtchens |
| D455,055 S | 4/2002 | Roberts |
| 6,371,390 B1 | 4/2002 | Cohen |
| 6,382,530 B1 | 5/2002 | Perkins |
| 6,394,412 B2 | 5/2002 | Zakai et al. |
| 6,403,013 B1 | 6/2002 | Man |
| 6,449,872 B1 | 9/2002 | Olkku |
| 6,460,786 B1 | 10/2002 | Roberts |
| 6,461,468 B1 | 10/2002 | Cohen |
| 6,461,486 B2 | 10/2002 | Lorincz et al. |
| 6,464,152 B1 | 10/2002 | Bolinis |
| 6,499,687 B2 | 12/2002 | Bryant |
| 6,499,872 B2 | 12/2002 | Sand |
| 6,513,734 B2 | 2/2003 | Bertolotti |
| 6,543,509 B1 | 4/2003 | Harrold |
| 6,557,819 B2 | 5/2003 | Austin |
| 6,561,443 B2 | 5/2003 | Delmer |
| 6,568,607 B2 | 5/2003 | Boswell et al. |
| 6,581,262 B1 | 6/2003 | Myers |
| 6,581,854 B2 | 6/2003 | Eckstein et al. |
| 6,581,902 B2 | 6/2003 | Michau |
| 6,620,278 B1 | 9/2003 | Harrold |
| 6,622,427 B2 | 9/2003 | Breitner |
| 6,622,946 B2 | 9/2003 | Held |
| 6,691,739 B2 | 2/2004 | Rosenberg |
| 6,736,337 B2 | 5/2004 | Vildibill et al. |
| 6,750,760 B2 | 6/2004 | Albritton |
| 6,764,029 B2 | 7/2004 | Rosenberg |
| 6,817,548 B2 | 11/2004 | Krauth |
| 6,821,928 B2 | 11/2004 | Ruskin |
| 6,827,298 B2 | 12/2004 | Sacks |
| 6,830,203 B2 | 12/2004 | Neyestani |
| 6,875,491 B2 | 4/2005 | Miyamoto |
| 6,886,761 B2 | 5/2005 | Cohen |
| 6,894,250 B2 | 5/2005 | Kertscher |
| 6,896,758 B1 | 5/2005 | Giuffre |
| 6,920,907 B2 | 7/2005 | Harrold |
| 6,933,337 B2 | 8/2005 | Lang |

(56) References Cited

U.S. PATENT DOCUMENTS

| | | |
|---|---|---|
| 6,936,126 B2 | 8/2005 | DeFrank |
| 6,945,476 B2 | 9/2005 | Giuffre |
| 6,996,932 B2 | 2/2006 | Kruer |
| 6,997,402 B2 | 2/2006 | Kruer |
| 7,007,916 B2 | 3/2006 | Lee |
| 7,048,010 B2 | 5/2006 | Golan |
| 7,108,205 B1 | 9/2006 | Hashimshony |
| 7,175,113 B2 | 2/2007 | Cohen |
| 7,241,825 B2 | 7/2007 | Koga |
| 7,270,280 B2 | 9/2007 | Belford |
| 7,300,004 B2 | 11/2007 | Sinden |
| 7,363,938 B1 | 4/2008 | Newton |
| 7,392,614 B2 | 7/2008 | Kruer |
| 7,410,108 B2 | 8/2008 | Rabinowitz |
| 7,445,021 B2 | 11/2008 | Newton |
| 7,445,168 B2 | 11/2008 | Ruskin |
| 7,455,094 B2 | 11/2008 | Lee |
| 7,530,382 B2 | 5/2009 | Kertscher et al. |
| 7,648,085 B2 | 1/2010 | Mavrakis |
| 7,681,805 B2 | 3/2010 | Belford |
| 7,681,810 B2 | 3/2010 | Keren |
| 7,695,587 B2 | 4/2010 | Kertscher |
| 7,735,758 B2 | 6/2010 | Cohen |
| 7,775,237 B2 | 8/2010 | Keren |
| 7,802,592 B2 | 9/2010 | McCarty |
| 7,887,664 B1 | 2/2011 | Mata |
| 7,954,732 B2 | 6/2011 | Shekalim |
| 7,988,076 B2 | 8/2011 | Mamo |
| 8,002,496 B2 | 8/2011 | Giuffre |
| 8,033,300 B2 | 10/2011 | McCarty |
| D648,191 S | 11/2011 | Thayer |
| 8,079,385 B2 | 12/2011 | Hatton |
| 8,091,800 B2 | 1/2012 | Retter |
| 8,096,491 B2 | 1/2012 | Lutzki |
| 8,136,246 B2 | 3/2012 | So |
| 8,141,589 B2 | 3/2012 | Socolsky |
| D657,638 S | 4/2012 | Einav |
| 8,267,115 B2 | 9/2012 | Giuffre' |
| 8,286,667 B2 | 10/2012 | Ruskin |
| 8,302,887 B2 | 11/2012 | Park |
| 8,317,111 B2 | 11/2012 | Cohen |
| 8,372,326 B2 | 2/2013 | Mamo |
| 8,381,437 B2 | 2/2013 | Ciudaj |
| 8,439,282 B2 | 5/2013 | Allen |
| 8,454,786 B2 | 6/2013 | Guichard |
| 8,469,294 B2 | 6/2013 | Mata |
| 8,475,617 B2 | 7/2013 | Kertscher |
| 8,511,585 B2 | 8/2013 | Keren |
| 8,511,586 B2 | 8/2013 | Einav |
| 8,628,032 B2 | 1/2014 | Feith |
| 8,663,525 B2 | 3/2014 | Mamo |
| 8,689,484 B2 | 4/2014 | Ruskin |
| 8,714,205 B2 | 5/2014 | Loebinger |
| 8,763,934 B2 | 7/2014 | Patel |
| 8,870,098 B2 | 10/2014 | Lutzki |
| 8,882,004 B2 | 11/2014 | Gorney |
| 8,998,112 B2 | 4/2015 | Cohen |
| 8,998,113 B2 | 4/2015 | Keren |
| 9,022,764 B2 | 5/2015 | Wisler |
| 9,027,856 B2 | 5/2015 | DeFrank |
| D740,940 S | 10/2015 | Fregoso |
| 9,192,108 B2 | 11/2015 | Kertscher |
| 9,253,950 B1 | 2/2016 | Clark |
| 9,258,949 B2 | 2/2016 | Nourian |
| 9,258,950 B2 | 2/2016 | Kidachi |
| 9,291,276 B2 | 3/2016 | Keren |
| 9,307,705 B2 | 4/2016 | Akritanakis |
| 9,345,205 B2 | 5/2016 | Kidachi |
| 9,380,749 B2 | 7/2016 | Akritanakis |
| 9,386,752 B2 | 7/2016 | Einav |
| 9,433,157 B2 | 9/2016 | Dermitzakis |
| 9,439,366 B2 | 9/2016 | Kidachi |
| 9,485,923 B2 | 11/2016 | Ensworth |
| D781,115 S | 3/2017 | Einav |
| 9,695,965 B2 | 7/2017 | Hadas |
| 9,814,189 B1 | 11/2017 | Clark |
| 9,872,444 B2 | 1/2018 | Turk |
| 9,877,440 B2 | 1/2018 | Ensworth |
| 9,877,441 B2 | 1/2018 | Ensworth |
| 9,877,442 B2 | 1/2018 | Kim |
| D811,179 S | 2/2018 | Ensworth |
| 9,894,851 B2 | 2/2018 | Desarzens |
| 9,949,448 B2 | 4/2018 | Cohen |
| D816,439 S | 5/2018 | Crook |
| 10,010,030 B2 | 7/2018 | Motha |
| 10,070,595 B2 | 9/2018 | Loebinger |
| 10,107,707 B2 | 10/2018 | DeFrank |
| 2002/0064935 A1 | 5/2002 | Honda |
| 2002/0070297 A1 | 6/2002 | Bolinis |
| 2002/0074434 A1 | 6/2002 | Delmer |
| 2002/0088877 A1 | 7/2002 | Bertolotti |
| 2002/0104902 A1 | 8/2002 | Eckstein et al. |
| 2002/0104903 A1 | 8/2002 | Eckstein et al. |
| 2002/0113147 A1 | 8/2002 | Huntley |
| 2003/0029937 A1 | 2/2003 | Dermitzakis |
| 2003/0042335 A1 | 3/2003 | Krauth |
| 2003/0050372 A1 | 3/2003 | Stanhope |
| 2003/0057301 A1 | 3/2003 | Cohen |
| 2003/0089409 A1 | 5/2003 | Morimoto |
| 2003/0090369 A1 | 5/2003 | Albritton |
| 2003/0092808 A1 | 5/2003 | Stanhope |
| 2003/0140977 A1 | 7/2003 | Berton |
| 2003/0150940 A1 | 8/2003 | Vildibill |
| 2003/0226913 A1 | 12/2003 | Brunnengraeber et al. |
| 2004/0018263 A1 | 1/2004 | Hashimshony |
| 2004/0164185 A1 | 8/2004 | Giuffre |
| 2005/0029231 A1 | 2/2005 | Kertscher |
| 2005/0077396 A1 | 4/2005 | Rabinowitz |
| 2005/0103409 A1 | 5/2005 | Weber |
| 2005/0133613 A1 | 6/2005 | Mayer |
| 2005/0224607 A1 | 10/2005 | Dinur et al. |
| 2005/0224962 A1 | 10/2005 | Akamatsu |
| 2005/0258278 A1 | 11/2005 | Cohen |
| 2005/0258279 A1 | 11/2005 | Harrold |
| 2005/0279866 A1 | 12/2005 | Belford |
| 2005/0284966 A1 | 12/2005 | DeFrank |
| 2006/0032949 A1 | 2/2006 | Lo |
| 2006/0043219 A1 | 3/2006 | Raanan |
| 2006/0144965 A1 | 7/2006 | Keren |
| 2006/0163388 A1 | 7/2006 | Mari |
| 2006/0186228 A1 | 8/2006 | Belford et al. |
| 2006/0202381 A1* | 9/2006 | Bach .............. B29C 47/0023 264/178 R |
| 2006/0237561 A1 | 10/2006 | Park et al. |
| 2006/0255186 A1 | 11/2006 | Ruskin |
| 2007/0095950 A1 | 5/2007 | Kim |
| 2007/0108318 A1 | 5/2007 | Mamo |
| 2007/0138323 A1 | 6/2007 | Lee |
| 2007/0187031 A1 | 8/2007 | Kertscher |
| 2007/0194149 A1 | 8/2007 | Mavrakis |
| 2008/0041978 A1 | 2/2008 | Keren |
| 2008/0067266 A1 | 3/2008 | Cohen |
| 2008/0099584 A1 | 5/2008 | Raanan |
| 2008/0105768 A1 | 5/2008 | Kertscher |
| 2008/0190256 A1 | 8/2008 | So |
| 2008/0237374 A1 | 10/2008 | Belford |
| 2008/0257991 A1 | 10/2008 | Einav et al. |
| 2008/0265064 A1 | 10/2008 | Keren |
| 2009/0020634 A1 | 1/2009 | Schweitzer |
| 2009/0145985 A1 | 6/2009 | Mayer |
| 2009/0159726 A1 | 6/2009 | Thompson |
| 2009/0165879 A1 | 7/2009 | Socolsky |
| 2009/0173811 A1 | 7/2009 | Gorney et al. |
| 2009/0243146 A1 | 10/2009 | Retter |
| 2009/0261183 A1 | 10/2009 | Mavrakis |
| 2009/0266919 A1 | 10/2009 | Mavrakis |
| 2009/0283613 A1 | 11/2009 | Barkai |
| 2009/0302127 A1 | 12/2009 | Lutzki |
| 2009/0314377 A1 | 12/2009 | Giuffre |
| 2009/0320932 A1 | 12/2009 | Giuffre |
| 2010/0023717 A1 | 1/2010 | Jinno |
| 2010/0096478 A1 | 4/2010 | Mamo |
| 2010/0096479 A1 | 4/2010 | Mamo |
| 2010/0108785 A1 | 5/2010 | Lee |

(56) References Cited

U.S. PATENT DOCUMENTS

| | | |
|---|---|---|
| 2010/0126974 A1 | 5/2010 | Kertscher |
| 2010/0155508 A1 | 6/2010 | Keren |
| 2010/0163651 A1 | 7/2010 | Feith |
| 2010/0175408 A1* | 7/2010 | Korda .................. F16N 31/002 62/291 |
| 2010/0219265 A1 | 9/2010 | Feld |
| 2010/0237170 A1 | 9/2010 | Rosenberg |
| 2010/0244315 A1 | 9/2010 | Mamo |
| 2010/0252126 A1 | 10/2010 | Roes |
| 2010/0252127 A1 | 10/2010 | Gross |
| 2010/0282873 A1 | 11/2010 | Mattlin |
| 2011/0186652 A1 | 8/2011 | Cohen |
| 2011/0226354 A1 | 9/2011 | Thordarson |
| 2012/0012678 A1 | 1/2012 | Gregory |
| 2012/0012682 A1 | 1/2012 | Einav |
| 2012/0074345 A1 | 3/2012 | Hatton |
| 2012/0097196 A1 | 4/2012 | Cohen |
| 2012/0097254 A1 | 4/2012 | Cohen |
| 2012/0097769 A1 | 4/2012 | Zavoli |
| 2012/0104648 A1 | 5/2012 | Yiflach |
| 2012/0126036 A1 | 5/2012 | Patel |
| 2012/0199673 A1 | 8/2012 | Cohen |
| 2012/0267454 A1 | 10/2012 | Einav |
| 2012/0305676 A1 | 12/2012 | Keren |
| 2013/0181066 A1 | 7/2013 | Dermitzakis |
| 2013/0248616 A1 | 9/2013 | Ensworth |
| 2013/0248622 A1 | 9/2013 | Kim |
| 2013/0341431 A1 | 12/2013 | Ensworth |
| 2014/0027539 A1 | 1/2014 | Kim |
| 2014/0034753 A1 | 2/2014 | Mavrakis |
| 2014/0110506 A1 | 4/2014 | Mavrakis |
| 2014/0246520 A1 | 9/2014 | Einav |
| 2015/0014446 A1 | 1/2015 | Cohen |
| 2015/0041563 A1 | 2/2015 | Ensworth |
| 2015/0041564 A1 | 2/2015 | Ensworth |
| 2015/0090815 A1 | 4/2015 | Akritanakis |
| 2015/0090816 A1 | 4/2015 | Akritanakis |
| 2015/0107777 A1 | 4/2015 | Zakarian |
| 2015/0144717 A1 | 5/2015 | Turk |
| 2015/0181816 A1 | 7/2015 | Desarzens |
| 2015/0181820 A1 | 7/2015 | Crook |
| 2015/0201568 A1 | 7/2015 | Einav |
| 2015/0223414 A1 | 8/2015 | Kidachi |
| 2015/0250111 A1 | 9/2015 | Kidachi |
| 2015/0296723 A1 | 10/2015 | Jain |
| 2015/0319940 A1 | 11/2015 | Kidachi |
| 2015/0351333 A1 | 12/2015 | Eberle |
| 2016/0057947 A1 | 3/2016 | Ensworth |
| 2016/0075070 A1 | 3/2016 | Verelis |
| 2016/0076965 A1 | 3/2016 | Edris |
| 2016/0088806 A1 | 3/2016 | Haub |
| 2016/0095285 A1 | 4/2016 | Loebinger |
| 2016/0198643 A1 | 7/2016 | Cohen |
| 2016/0219802 A1 | 8/2016 | Ensworth |
| 2016/0219803 A1 | 8/2016 | Keren |
| 2016/0223092 A1 | 8/2016 | Hadas |
| 2016/0278311 A1 | 9/2016 | Kidachi |
| 2016/0286741 A1 | 10/2016 | Kidachi |
| 2016/0286743 A1 | 10/2016 | Einav |
| 2016/0309669 A1 | 10/2016 | Kidachi |
| 2016/0330917 A1 | 11/2016 | Kidachi |
| 2017/0035005 A1 | 2/2017 | Kidachi |
| 2017/0035006 A1 | 2/2017 | Kim |
| 2017/0112078 A1 | 4/2017 | Ensworth |
| 2017/0118927 A1 | 5/2017 | Loebinger |
| 2017/0142916 A1 | 5/2017 | Shamshery |
| 2017/0205013 A1 | 7/2017 | Smith |
| 2017/0292646 A1 | 10/2017 | Hadas |
| 2018/0027756 A1 | 2/2018 | Kidachi |
| 2018/0098514 A1 | 4/2018 | Socolsky |
| 2018/0110191 A1 | 4/2018 | Keren |
| 2018/0116134 A1 | 5/2018 | Ensworth |
| 2018/0168116 A1 | 6/2018 | Morikoshi |
| 2018/0168117 A1 | 6/2018 | Noguchi |
| 2018/0177145 A1 | 6/2018 | Morikoshi |
| 2018/0199524 A1 | 7/2018 | Socolsky |
| 2018/0228097 A1 | 8/2018 | Alkalay |
| 2018/0266576 A1 | 9/2018 | Balet |
| 2018/0317406 A1 | 11/2018 | Tsouri |
| 2018/0328498 A1 | 11/2018 | Rulli |
| 2018/0338434 A1 | 11/2018 | Wlassich |

FOREIGN PATENT DOCUMENTS

| | | |
|---|---|---|
| CN | 1627994 | 6/2005 |
| CN | 102057823 | 5/2011 |
| CN | 201821716 | 5/2011 |
| CN | 201871438 | 6/2011 |
| CN | 202617872 | 12/2012 |
| CN | 102933071 | 2/2013 |
| DE | 112706 | 5/1975 |
| DE | 112706 A5 | 5/1975 |
| DE | 3525591 | 1/1986 |
| EP | 0160299 A2 | 11/1985 |
| EP | 0344605 A2 | 12/1989 |
| EP | 0353982 | 2/1990 |
| EP | 0444425 A1 | 9/1991 |
| EP | 0480632 A2 | 4/1992 |
| EP | 0491115 A1 | 6/1992 |
| EP | 0549515 A1 | 6/1993 |
| EP | 636309 A1 | 2/1995 |
| EP | 0709020 A1 | 5/1996 |
| EP | 0730822 A2 | 9/1996 |
| EP | 0872172 A1 | 10/1998 |
| EP | 1701147 | 9/2006 |
| EP | 2952091 A1 | 12/2015 |
| GB | 1498545 | 1/1978 |
| GB | 2057960 A | 4/1991 |
| IL | 42705 A | 3/1976 |
| IL | 53463 A | 3/1983 |
| IL | 97564 A | 7/1996 |
| IT | 1255120 | 10/1995 |
| JP | 2000228417 | 8/2000 |
| RU | 2240682 | 1/2005 |
| RU | 2275791 | 3/2006 |
| RU | 2415565 | 4/2011 |
| WO | 9205689 A1 | 4/1992 |
| WO | 9221228 A1 | 12/1992 |
| WO | 9427728 A1 | 12/1994 |
| WO | 1995029761 | 11/1995 |
| WO | 9614939 | 5/1996 |
| WO | 9810635 A1 | 3/1998 |
| WO | 9902273 A1 | 1/1999 |
| WO | 9918771 A1 | 4/1999 |
| WO | 9955141 A1 | 11/1999 |
| WO | 0001219 A1 | 1/2000 |
| WO | 0010378 A1 | 3/2000 |
| WO | 0030760 | 6/2000 |
| WO | 200136106 A1 | 5/2001 |
| WO | 0156768 A1 | 8/2001 |
| WO | 2001064019 | 9/2001 |
| WO | 0204130 A1 | 1/2002 |
| WO | 2002015670 | 2/2002 |
| WO | 2003045577 A1 | 6/2003 |
| WO | 2003066228 A1 | 8/2003 |
| WO | 2004028778 A1 | 4/2004 |
| WO | 2007046105 | 10/2005 |
| WO | 2006030419 A2 | 3/2006 |
| WO | 2006038246 | 4/2006 |
| WO | 2007068523 A1 | 6/2007 |
| WO | 2010022471 | 3/2010 |
| WO | 2010048063 | 4/2010 |
| WO | 2011092557 | 8/2011 |
| WO | 2012015655 A1 | 2/2012 |
| WO | 2012160121 | 11/2012 |
| WO | 2013148672 | 10/2013 |
| WO | 2013155173 A2 | 10/2013 |
| WO | 2013192321 | 12/2013 |
| WO | 2014064452 | 5/2014 |
| WO | 2015023624 | 2/2015 |
| WO | 2015098412 | 7/2015 |
| WO | 2016156814 | 10/2016 |

(56) References Cited

FOREIGN PATENT DOCUMENTS

OTHER PUBLICATIONS

USPTO; U.S. Appl. No. 13/839,726; Notice of Allowance dated Dec. 1, 2016; 5 pages.
USPTO; U.S. Appl. No. 13/839,726; Office Action dated Mar. 20, 2017.
USPTO; U.S. Appl. No. 14/385,564; Office Action dated Mar. 10, 2017.
USPTO; U.S. Appl. No. 14/475,435; Office Action dated Jan. 26, 2017.
USPTO; U.S. Appl. No. 13/964,903; Office Action dated Oct. 31, 2016; 22 pages.
Duke, K. et al., 'Sewer Line Chemical Root Control with Emphasis on Foaming Methods Using Metam-Sodium and Dichiobenil', EPA United States Environmental Protection Agency, Sep. 1995.
Eason, Audra, et al., "Integrated modeling environment for state-wide assessment of groundwater vulnerability from pesticide use in agriculture", Pest Manag Sci, 60:739-745 (online:2004).
EPO Office Action for EPO Application No. 10 160 675.4-2313 dated Mar. 27, 2012.
EPO search report, EPO Application No. 10160675.4, dated Aug. 6, 2010.
European Patent Office, Extended European Search Report issued in Application No. 13770084.5, Feb. 11, 2016, 7 pp.
Fitch, Even, Tabin & Flannery; Letter, Apr. 23, 2008, 1 p.
Giles-Parker, C, EPA, Pesticide Fact Sheet, pp. 1-4.
http://aasystems.eu/products11.html; Advanced Automation Systems Ltd., (1 p., dated Jun. 20, 2013).
http://metzerplas.com/en-US/50/845/; Meterplas Cooperative Agricultural Organization Ltd., (2 pp., dated Jun. 20, 2013).
Jaffe, E., Netafim, Ltd., Patent Dept.; Letter with attached invoice May 7, 2008, 2 pages.
Jaffe, E., Netafim Ltd., Patent Dept.; Letter w/attached claim charts, Feb. 4, 2008, 6 pp.
Jaffe, E., Netafim Ltd., Patent Dept.; Letter w/attachment, Feb. 4, 2008, 7 pp.
Jaffe, E., Netafim Ltd., Patent Dept.; Letter w/attachment, May 7, 2008, 2 pp.
Jaffe, E., Netafim Ltd., Patent Dept.; Letter with attached claim charts, Jul. 12, 2009, 4 pages.
Jaffe, E. Netafim Ltd., Patent Dept., Letter with attached Appendices A-B, Aug. 1, 2010, 35 pages.
Jiang, W. et al., 'Effects of Copper on Root Growth, Cell Division, and Nucleolus of Zea mays', Biologia Plantarum, 44(1), 2001, pp. 105-109.
Kuhns, L. et al., 'Copper Toxicity in Woody Ornamentals', Journal of Arboriculture, Apr. 1976. dd. 68-78.
Mastin, BJ, et al., "Toxicity and bioavailability of copper herbicides (Clearigate, Cutrine-Plus, and copper sulfate) to freshwater animals", Arch Environ Contam Toxicol, 39:445-451, (2000).
Murray-Gulde, CL, et al., "Algicidal effectiveness of Clearigate, Cutrine-Plus, and copper sulfate and margins of safety associated with their use", Arch Environ Contam Toxicol 42:19-27, (2002).
Nanda K. Alapati, Letter dated Mar. 30, 2012 with appendices.
Netafim International—Netafim USA—Internet site, 2003, 5 pages.
Netafim Letter dated Mar. 30, 2012 with appendices.
Netafim Ltd., Appendix A, images of Netafim's Drip Net product, 1 page.
Netafim Ltd., Appendix A, marked-up images of Netafim's Ram product, 1 p.
Netafim Ltd., Appendix B, Invoice, Jan. 31, 1991, 1 p.
Netafim Ltd., Appendix C, Netafim RAM Catalog, Jan. 2000, 4 pages.
Netafim Ltd., Appendix D, Englarged, marked-up excerpts from Netafim RAM Catalog, Jan. 2000, 1 page.
Netafim Ltd., Inhibition of root penetration in subsurface driplines by impregnating the drippers with copper oxide particles.
Netafim RAM Catalog Figures.
Netafim USA, Triton X Heavywall Dripperline Catalog, May 2007, 8 pages.
Office Action, U.S. Appl. No. 12/495,178, dated Feb. 3, 2010.
Office Action, U.S. Appl. No. 12/347,266, dated Mar. 7, 2011.
Office Action, U.S. Appl. No. 12/347,266, dated Nov. 17, 2010.
Office Action, U.S. Appl. No. 12/347,266, dated Sep. 7, 2010.
Office Action, U.S. Appl. No. 12/367,295, dated Feb. 11, 2011.
Office Action, U.S. Appl. No. 12/367,295, dated Jul. 15, 2011.
Office Action, U.S. Appl. No. 12/495,193, dated May 11, 2011.
Office Action, U.S. Appl. No. 11/394,755, dated Feb. 7, 2008.
Office Action, U.S. Appl. No. 11/394,755, dated Mar. 31, 2009.
Office Action, U.S. Appl. No. 11/394,755, dated May 12, 2011.
Office Action, U.S. Appl. No. 11/394,755, dated Jul. 17, 2007.
Office Action, U.S. Appl. No. 11/394,755, dated Jul. 17, 2009.
Office Action, U.S. Appl. No. 11/394,755, dated Aug. 14, 2008.
Office Action dated Apr. 18, 2014 for U.S. Appl. No. 12/495,178.
Office Action dated Apr. 18, 2014 for U.S. Appl. No. 12/495,193.
Office Action dated Jun. 12, 2012, for U.S. Appl. No. 12/495,178, filed Jun. 30, 2009.
Patent Cooperation Treaty, International Search Report issued in International Application No. PCT/US2013/046603, Sep. 19, 2013, 2 pp.
Patent Cooperation Treaty, International Searching Authority, Notification of Transmittal of the International Search Report and the Written Opinion of the International Searching Authority, or the Declaration, issued in International Application No. PCT/US2013/033866, dated Jun. 17, 2013, 10 pp.
Patent Cooperation Treaty, International Searching Authority, Notification of Transmittal of the International Search Report and the Written Opinion of the International Searching Authority, or the Declaration, issued in International Application No. PCT/US2014/050623, dated Nov. 20, 2014, 17 pp.
Patent Cooperation Treaty, International Searching Authority, Written Opinion of the International Searching Authority, issued in International Application No. PCT/US2013/046603, dated Sep. 19, 2013, 4 pp.
PCT; App. No. PCT/US2013/033866; International Search Report and Written Opinion dated Jun. 19, 2013.
PCT Application No. PCT/US13/33866 dated Mar. 26, 2013.
Rain Bird Corporation, Drip Watering System 1994 Catalog, 1993, 16 pages.
Rain Bird Corporation, Landscape Irrigation Products 1993-1994 Catalog, p. 120, Feb. 1993, 3 pages.
Rain Bird Corporation, Landscape Irrigation Products 2001-2002 Catalog, pp. 181-184, Mar. 2001, 6 pages.
Rain Bird Corporation, Landscape Irrigation Products 2005-2006 Catalog, pp. 230-232; 247-250, Jun. 2004, 10 pages.
Rain Bird Corporation, Landscape Irrigation Products 2006-2007 Catalog, p. 222-224; 238-242, Jul. 2005, 11 pages.
Rain Bird Corporation, PC Dripline Pressure Compensating Inline Emitter Tubing Catalog, Oct. 1998, 16 pages.
Rain Bird Corporation, Turf Irrigation Equipment 1985 Catalog, p. 73, 1985, 3 pages.
RAM Invoice Jan. 31, 1991.
Smiley, E. T., 'Root Growth Near Vertical Root Barriers', International Society of Arboriculture, 1995, pp. 150-152.
Spera, G., et al., Subsurface drip irrigation with micro-encapsulated trifluralin. Trifluralin residues in soils and cultivations. Commun Agric Appl Biol Sci 71:161-170, (2006).
State Intellectual Property Office, First Office Action issued in Chinese Application No. 201380016629.9, dated Nov. 4, 2015, 16 pp.
The Clean Estuary Partnership, 'Copper Sources in Urban Runoff and Shoreline Activities', TDC Environmental, LLC, 2004, pp. 1-72.
U.S. Appl. No. 11/359,181, filed Feb. 22, 2006 and dated Jan. 19, 2010 as U.S. Pat. No. 7,648,085, entitled 'Drip Emitter'.
U.S. Appl. No. 12/347,266, filed Dec. 31, 2008, entitled 'Low Flow Irrigation Emitter'.
U.S. Appl. No. 12/367,295, filed Feb. 6, 2009, entitled 'Low Flow Irrigation Emitter'.
U.S. Appl. No. 12/436,394, filed May 6, 2009, entitled 'Drip Emitter and Methods U.S. of Assembly and Mounting'.

(56) References Cited

OTHER PUBLICATIONS

U.S. Appl. No. 12/495,178, filed Jun. 30, 2009, entitled 'Drip Emitter'.
U.S. Appl. No. 13/430,249 dated Mar. 26, 2012.
U.S. Appl. No. 13/964,903 dated Aug. 12, 2013.
U.S. Appl. No. 14/139,217 dated Dec. 23, 2013.
U.S. Appl. No. 11/394,755, filed Mar. 31, 2006, entitled "Drip Emitter".
U.S. Appl. No. 12/495,193, filed Jun. 30, 2009, entitled 'Drip Emitter,' which a continuation of U.S. Appl. No. 11/359,181.
United States Patent and Trademark Office, Non-final Office Action issued in U.S. Appl. No. 13/800,354, dated Sep. 25, 2014, 13 pp.
USPTO; U.S. Appl. No. 12/495,178; Office Action dated Mar. 11, 2015.
USPTO; U.S. Appl. No. 12/495,178; Office Action dated Nov. 18, 2014.
USPTO; U.S. Appl. No. 12/495,193; Office Action dated Jan. 15, 2015.
USPTO; U.S. Appl. No. 12/495,178; Office Action dated Oct. 6, 2015.
USPTO; U.S. Appl. No. 13/430,249; Office Action dated Mar. 24, 2015.
USPTO; U.S. Appl. No. 13/430,249; Office Action dated Oct. 26, 2015.
USPTO; U.S. Appl. No. 13/964,903; Office Action dated Jun. 3, 2015.
USPTO; U.S. Appl. No. 13/964,903;Office Action dated Mar. 7, 2016.
USPTO; U.S. Appl. No. 14/047,489; Office Action dated Jun. 29, 2015.
USPTO; U.S. Appl. No. 14/047,489; Office Action dated Oct. 7, 2015.
USPTO; U.S. Appl. No. 14/139,217; Office Action dated Apr. 8, 2015.
USPTO; U.S. Appl. No. 14/139,217; Office Action dated Sep. 18, 2015.
USPTO; U.S. Appl. No. 12/495,178; Office Action dated Apr. 18, 2014.
USPTO; U.S. Appl. No. 12/495,193; Office Action dated Apr. 18, 2014.
USPTO; U.S. Appl. No. 12/495,193; Office Action dated Oct. 1, 2015.
USPTO; U.S. Appl. No. 13/430,249; Notice of Allowance dated Apr. 14, 2016.
USPTO; U.S. Appl. No. 14/385,564; Office Action dated Aug. 10, 2016.
USPTO; U.S. Appl. No. 14/475,435; Office Action dated Jul. 20, 2016.
USPTO Advisory Action in U.S. Appl. No. 12/495,193 dated Sep. 5, 2013.
USPTO Office Action in U.S. Appl. No. 12/495,193, dated Jan. 6, 2012.
USPTO Office Action in U.S. Appl. No. 11/394,755, dated Dec. 19, 2011.
USPTO Office Action in U.S. Appl. No. 12/367,295, dated Jun. 8, 2012.
USPTO Office Action in U.S. Appl. No. 12/495,178, dated Jun. 21, 2012.
USPTO Office Action in U.S. Appl. No. 12/495,193 dated Jun. 18, 2013.
Wagar, et al., "Effectiveness of Three Barrier Materials for Stopping Regenerating Roots of Established Trees", Journal of Arboriculture, 19(6), Nov. 1993, pp. 332-338.
Westgate, P., 'Preliminary Report on Copper Toxicity and Iron Chlorosis in Old Vegetable Fields', Florida State Horticultural Society, 1952, pp. 143-146.
USPTO; U.S. Appl. No. 13/430,249; Notice of Allowance dated Sep. 19, 2016.
USPTO; U.S. Appl. No. 12/495,193; Notice of Allowance dated Oct. 14, 2016.

Alam, M. et al., 'Subsurface Drip Irrigation for Alfalfa', Kansas State University, 2009, pp. 1-8.
Arduini, I. et al., 'Influence of Copper on Root Growth and Morphology of *Pinus pinea* L. and *Pinus pinaster* Ait. Seedlings', Tree Physiology, 15, 1995, pp. 411-415.
Bernard, H., et al., Assessment of herbicide leaching risk in two tropical soils of Reunion Island (France), J Environ Qual 34:534-543, (2005).
Beverage, K., 'Drip Irrigation for Row Crops', New Mexico State University, 2001, pp. 1-43.
Borkow, G., et al., "A Novel Anti-Influenza Copper Oxide Containing Respiratory Face Mask", PLoS One, www.plosone.org, Jun. 2010, vol. 5, Issue 6, pp. 1-8.
Borkow, G., et al., "Copper as a Biocidal Tool", Current Medicinal Chemistry, 2005, 12, 2163-2175.
Borkow, G., et al., "Endowing Textiles with Permanent Potent Biocidal Properties by Impregnating Them with Copper Oxide", ResearchGate, Jan. 2006.
Borkow, G., et al., "Putting copper into action:copperimpregnated products with potent biocidal activities", FASEB J, 18:1728-1730, (2004).
Coder, K., 'Tree Root Growth Control Series: Root Control Barriers', The University of Georgia, Mar. 1998, pp. 1-7.
Crawford, M., 'Copper-Coated Containers and Their Impact on the Environment', Spin Out, 2003, pp. 76-78.
Crawford, M., 'Update on Copper Root Control', Spin Out, 1997.
Diver, S. et al., 'Sustainable Small-Scale Nursery Production', ATTRA, Nov. 2001, pp. 1-31.
State Intellectual Property Office of People's Republic of China, First Office Action issued in Application No. 201480045002.0, dated Apr. 16, 2018, 20 pp.
USPTO; U.S. Appl. No. 14/036,881; Notice of Allowance dated May 9, 2018 (pp. 1-5).
USPTO; U.S. Appl. No. 14/518,774; Notice of Allowance dated Jan. 4, 2018; (pp. 1-4).
USPTO; U.S. Appl. No. 14/910,573; Office Action dated Feb. 13, 2018; (pp. 1-10).
USPTO; U.S. Appl. No. 14/036,881; Notice of Allowability dated Dec. 26, 2017; (pp. 1-2).
USPTO; U.S. Appl. No. 14/385,564; Notice of Allowability dated Dec. 26, 2017; (pp. 1-2).
USPTO; U.S. Appl. No. 15/331,407; Corrected Notice of Allowability dated Dec. 28, 2017; (pp. 1-2).
USPTO; U.S. Appl. No. 15/344,843; Corrected Notice of Allowability dated Dec. 28, 2017; (pp. 1-2).
Patent Cooperation Treaty, Notification of Transmittal of the International Search Report and the Written Opinion of the International Searching Authority, or the Declaration, Issued in International Application No. PCT/US2017042378, dated Oct. 26, 2017, 7 pp.
USPTO; U.S. Appl. No. 13/839,726; Notice of Allowance dated Sep. 14, 2017; (pp. 1-5).
USPTO; U.S. Appl. No. 13/964,903; Notice of Allowance dated Sep. 18, 2017; (pp. 1-7).
USPTO; U.S. Appl. No. 14/036,881; Notice of Allowability dated Nov. 29, 2017; (pp. 1-2).
USPTO; U.S. Appl. No. 14/385,564; Notice of Allowability dated Nov. 29, 2017; (pp. 1-2).
USPTO; U.S. Appl. No. 14/475,435; Office Action dated Sep. 27, 2017; (pp. 1-9).
USPTO; U.S. Appl. No. 14/518,774; Notice of Allowance dated Oct. 26, 2017; (pp. 1-7).
USPTO; U.S. Appl. No. 15/331,407; Notice of Allowability dated Nov. 30, 2017; (pp. 1-2).
USPTO; U.S. Appl. No. 15/331,407; Notice of Allowance dated Oct. 27, 2017; (pp. 1-9).
USPTO; U.S. Appl. No. 15/344,843; Notice of Allowability dated Nov. 30, 2017; (pp. 1-2).
USPTO; U.S. Appl. No. 15/344,843; Notice of Allowance dated Oct. 16, 2017; (pp. 1-7).
ASME 2015 International Design Engineering Technical Conferences & Computers and Information in Engineering Conference, K. Taylor et al, "A Mathematical Model for Pressure Compensating Emitters", Aug. 2-5, 2015, Boston, Massachusetts, USA, 10 pp.

(56) References Cited

OTHER PUBLICATIONS http://aasystems.eu/dripper/; Advanced Automation Systems Ltd., Dec. 18, 2015, 12 pp.
USPTO; U.S. Appl. No. 13/964,903; Notice of Allowance dated Apr. 5, 2018 (pp. 1-5).
DIG® Irrigation Product Catalog, <www.digcorp.com>, 2018, 72 pages.
DIG® Irrigation Product Catalog, <www.digcorp.com>, 2012, 32 pages.
DIG® Irrigation Product Catalog, <www.digcorp.com>, 2016, 72 pages.
Irritec® on Line Drippers iDrop®, Drritec S.p.A, <www.irritec.com>, available prior to May 15, 2017, 2 pages.
Irritec® Product Catalog and Price List, Irritec USA Inc., <www.irritec.com>, 2016, 66 pages.
Irritec™ USA iDrop™ PCDS, Irritec USA Inc., <www.irritecusa.com>, available prior to May 15, 2017, 2 pages.
Jain® Button Emitters, Jain Irrigation Inc., <www.jainsusa.com>, available prior to May 15, 2017, 2 pages.
Jain® Emission Devices, Jain Irrigation Systems Ltd., <www.jainsusa.com>, available prior to May 15, 2017, pp. 171-182.
Jain® Landscape Catalog , Jain Irrigation, Inc., <www.jainsusa.com>, 2016, 102 pages.
Jain® Online Emitters, Jain Irrigation Systems Ltd., <www.jainsusa.com>, available prior to May 15, 2017, 2 pages.
Netafim™ Non-Pressure Compensating Drippers, Netafim USA, <www.netafimusa.com>, available prior to May 15, 2017, 2 pages.
Netafim™ Point Source Emitters, Netafim USA, <www.netafimusa.com>, available prior to May 15, 2017, 4 pages.
Netafim™ Pressure Compensating (PC) Spray Stakes, Netafim USA,<www.netafimusa.com>, as of Apr. 2016, 12 pages.
Netafim™ Pressure Compensating Drippers, Netafim USA, <www.netafimusa.com>, Apr. 2016, 2 pages.
Netafim™ Pressure Compensating Drippers, Netafim USA, <www.netafimusa.com>, Jun. 2018, 2 pages.
Patent Cooperation Treaty, International Searching Authority, Notification of Transmittal of the International Search Report and the Written Opinion of the International Searching Authority, or the Declaration, issued in International Application No. PCT/US2018/015516, dated Jun. 28, 2018, 8 pp.
Photograph of DIG® Product No. PCA-003CV, available prior to May 15, 2017, 1 page.
Photograph of Irritec® Product No. A6-WPC2BB, available prior to May 15, 2017, 1 page.
Photograph of Irritec® Product No. A6-WPC3BB, available prior to May 15, 2017, 1 page.
Photograph of Jain® Product No. CTTPC2-CNL, available prior to May 15, 2017, 1 page.
Photograph of Jain® Product No. CTTPC4-CNL, available prior to May 15, 2017, 1 page.
Photograph of Netafim™Product No. SPCV10, available prior to May 15, 2017, 1 page.
Photograph of Netafim™ Product No. Techflow Emitter WPC20, available prior to May 15, 2017, 1 page.
Photograph of Netafim™ Product No. WPC10, available prior to May 15, 2017, 1 page.
Photograph of Netafim™ Woodpecker Junior Product No. 01WPCJL4, available prior to May 15, 2017, 1 page.
Photograph of Toro® Product No. A6-WPC2BB, available prior to May 15, 2017, 1 page.
Price Book, Oct. 2015, Rivulis Irrigation, Oct. 2015 (Revised Apr. 2016), <rivulis.com>, 116 pages.
Toro® NGE® AL Anti-Drain Pressure Compensating Emitter, The Toro Company, <www.toro.com>, 2012, 2 pages.
Toro® NGE® Emitters, The Toro Company, <www.toro.com>, 2018, 2 pages.
Toro® NGE® New Generation Emitters, The Toro Company, <www.toro.com>, 2013, 2 pages.
Toro® NGE® SF Self-flushing Pressure Compensating Emitter, The Toro Company, <www.toro.com>, 2012, 2 pages.
Toro® Turbo-SC® Plus Pressure-compensating Emitter, The Toro Company, <www.toro.com>, 2009, 2 pages.
USPTO; U.S. Appl. No. 14/036,881; Corrected Notice of Allowability dated May 21, 2018, 2 pages.
USPTO; U.S. Appl. No. 15/650,379; Office Action dated May 18, 2018, 8 pages.
USPTO; U.S. Appl. No. 13/964,903; Notice of Allowance dated Sep. 26, 2018; (pp. 1-5).
USPTO; U.S. Appl. No. 14/036,881; Notice of Allowance dated Aug. 30, 2018; (pp. 1-6).
USPTO; U.S. Appl. No. 14/910,573; Office Action dated Sep. 26, 2018; (pp. 1-11).
USPTO; U.S. Appl. No. 15/650,379; Notice of Allowance dated Feb. 19, 2019; (pp. 1-5).
Brazilian Patent and Trademark Office, Search Report dated Nov. 19, 2018 for Brazilian Patent Application No. BR 11 2014 023843-0, 2 pages.
Brazilian Patent and Trademark Office, Technical Examination Report dated Nov. 19, 2018 for Brazilian Patent Application No. BR 11 2014 023843-0, 9 pages.
CETESB and SINDIPLAST, Environmental Guide of the Plastic Materials Recycling and Processing Industry [electronic resource], Technical elaboration: Gilmar do Amaral et al., Collaborators: Andre H.C. Botto e Souza et al., 2011. Retrieved from the Internet: <URL:http://file.sindiplast.org.br/download/guia_ambiental_internet.pdf>, 91 pages.
Dixieline Lumber & Home Centers Catalog, DIG Irrigation Products Drip Tubing, 2003, p. 13.
Eurodrip U.S.A., Inc., 2009 Irrigation Products Catalog, p. 4-5, 4 pages.
Eurodrip U.S.A., Inc., Products Guide, copyright date Nov. 2007, 2 pages.
European Patent Application No. 18172143.2, Extended European Search Report, dated Oct. 15, 2018, 9 pages.
European Patent Office, Communication Pursuant to Article 94(3) EPC issued in European Application No. 13 768 209.2, Jan. 4, 2019, 5 pp.
Hunter Industries, Drip Design Guide, Dec. 2012, 32 pages.
Jain Irrigation Inc., 2009 Product Catalog, pp. 12-13, copyright date 2009 (revised Oct. 2008), 4 pages.
Lady Bug Emitter, Rain Bird Sales, Inc., <https://web.archive.org/web/19980121011011/http://www.rainbird.com:80/rbturf/products/xeri/emission/ladybug.htm>, dated Dec. 1997, 2 pages.
metzerplas.com, OEM Drippers, Sep. 29, 2013, [online]. Retrieved from the Internet via the Internet Archive: Wayback Machine: <URL: http://metzerplas.com/en-US/48/865/> on Dec. 10, 2018, 2 pages.
Multi-Outlet Xeri-Bug™, Rain Bird Sales, Inc., <https://web.archive.org/web/19980121010952/http://www.rainbird.com:80/rbturf/products/xeri/emission/moutlet.htm>, 1997, 2 pages.
NDS Inc., AGRIFIM Drip and Micro Irrigation Catalog, Jan. 2004, 3 pages.
Nietafim USA, Landscape & Turf Division Product Catalog, Aug. 2004, 36 pages.
Nietafim, RAM Pressure Compensating Dripperline brochure, Feb. 1997, 4 pages.
Photographs of an in-line cylindrical drip emitter on sale or publicly disclosed more than a year before the filing of the instant application, 2 pages.
Pressure-Compensating Modules, Rain Bird Sales, Inc., <https://web.archive.org/web/19980121011024/http://www.rainbird.com:80/rbturf/products/xeri/emission/prescmp.htm>, 1997, 2 pages.
Rain Bird Corporation, Rain Bird PC Dripline brochure, copyright date Nov. 2000, 12 pages.
Rain Bird Multi-Outlet Xeri-Bug, 1998, 1 page.
Rain Bird Pressure-Compensating Module, 1998, 1 page.
Rain Bird Xeri-Bug, 1998, 3 pages.
Rain Bird® Consumer Products Catalog, Tubing, D33305-11, copyright date 2010, p. 48.
Rain Bird® Landscape Irrigation Products 1997-1998 Catalog, Component and Emmision Device, D48301, copyright date Aug. 1997, pp. 128-129.

(56) References Cited

OTHER PUBLICATIONS

Rain Bird® Landscape Irrigation Products 1999-2000 Catalog, Emission Devices, D37200, copyright date Aug. 1998, pp. 136-137.
Rain Bird® Landscape Irrigation Products 2004 New Products Catalog, D37200D, copyright date Oct. 2003, pp. 41-42.
Rain Bird® Landscape Irrigation Products 2008-2009 Catalog, D37200H, copyright date Sep. 2007, pp. 180-187.
Rain Bird® Landscape Irrigation Products, Rain Bird Dripline Series, RBE-03-TE-10, copyright date Aug. 2003, pp. 106-107.
Rain Bird® Nursery Equipment Catalog 1986-1987, D32304, copyright date 1986, p. 13.
Rain Bird® XF Series Dripline | Design, Installation and Maintenance Guide, D40024A, copyright date Feb. 2012, 48 pages.
Rain Bird® XFCV Dripline with Heavy-Duty Check Valve, D40215, copyright date Oct. 2012, 2 pages.
Rain Bird® XFD Dripline with Greater Flexiblity, D39994B, copyright date Jan. 2012, 2 pages.
Rain Bird® XFS Dripline with Copper Shield™ Technology, D39978B, copyright date Jan. 2012, 2 pages.
Rain Tape Design Guide, Rain Bird®, D35252, document was published more than a year before the filing date of the Instant application, 5 pages.
Siplast/Irritec Multibar Pressure Compensated Coextruded Dripline, Jul. 22, 2005, 4 pages.
The Toro Company, 2000-2001 Irrigation Products Catalog, p. 28, copyright date Oct. 1999, 3 pages.
The Toro Company, Drip in Classic Turbulent Flow Dripline brochure, Jun. 2014, 4 pages.
The Toro Company, Drip in PC Brown Dripline brochure, 2015, 2 pages.
USPTO; U.S. Appl. No. 13/964,903; Notice of Allowance dated Dec. 14, 2018; (pp. 1-5).
USPTO; U.S. Appl. No. 15/595,427; Office Action dated Dec. 17, 2018; (pp. 1-6).
USPTO; U.S. Appl. No. 15/650,379; Notice of Allowance dated Oct. 24, 2018; (pp. 1-7).

* cited by examiner

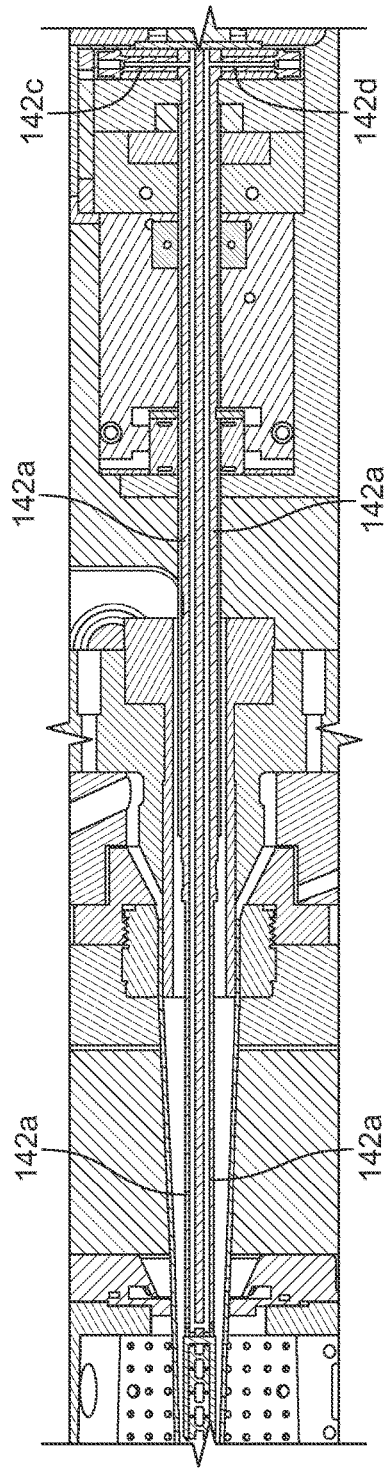
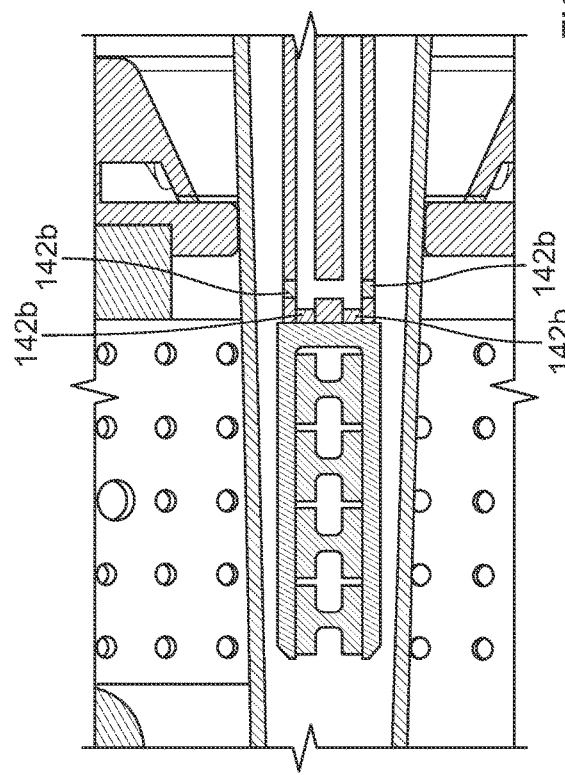

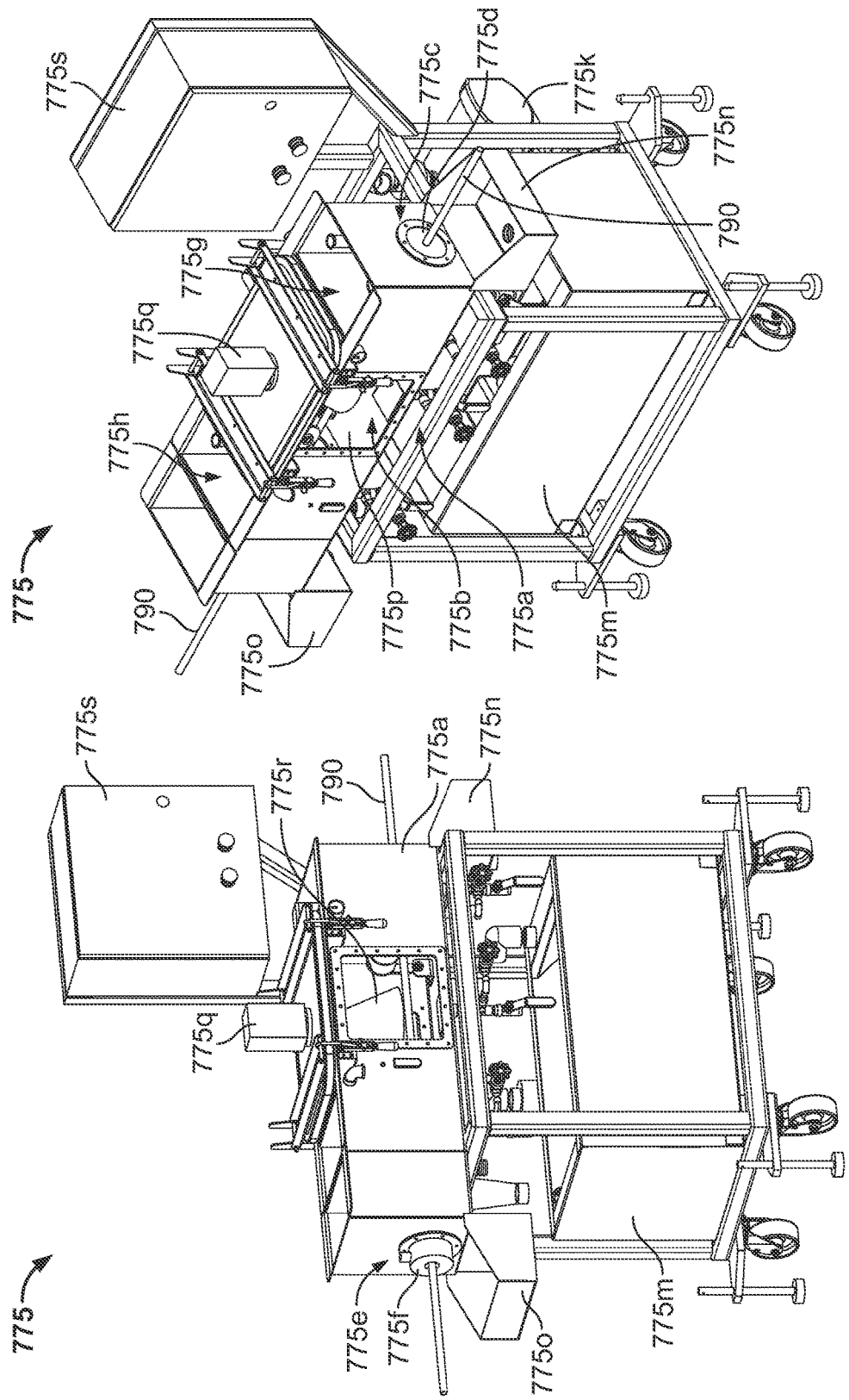

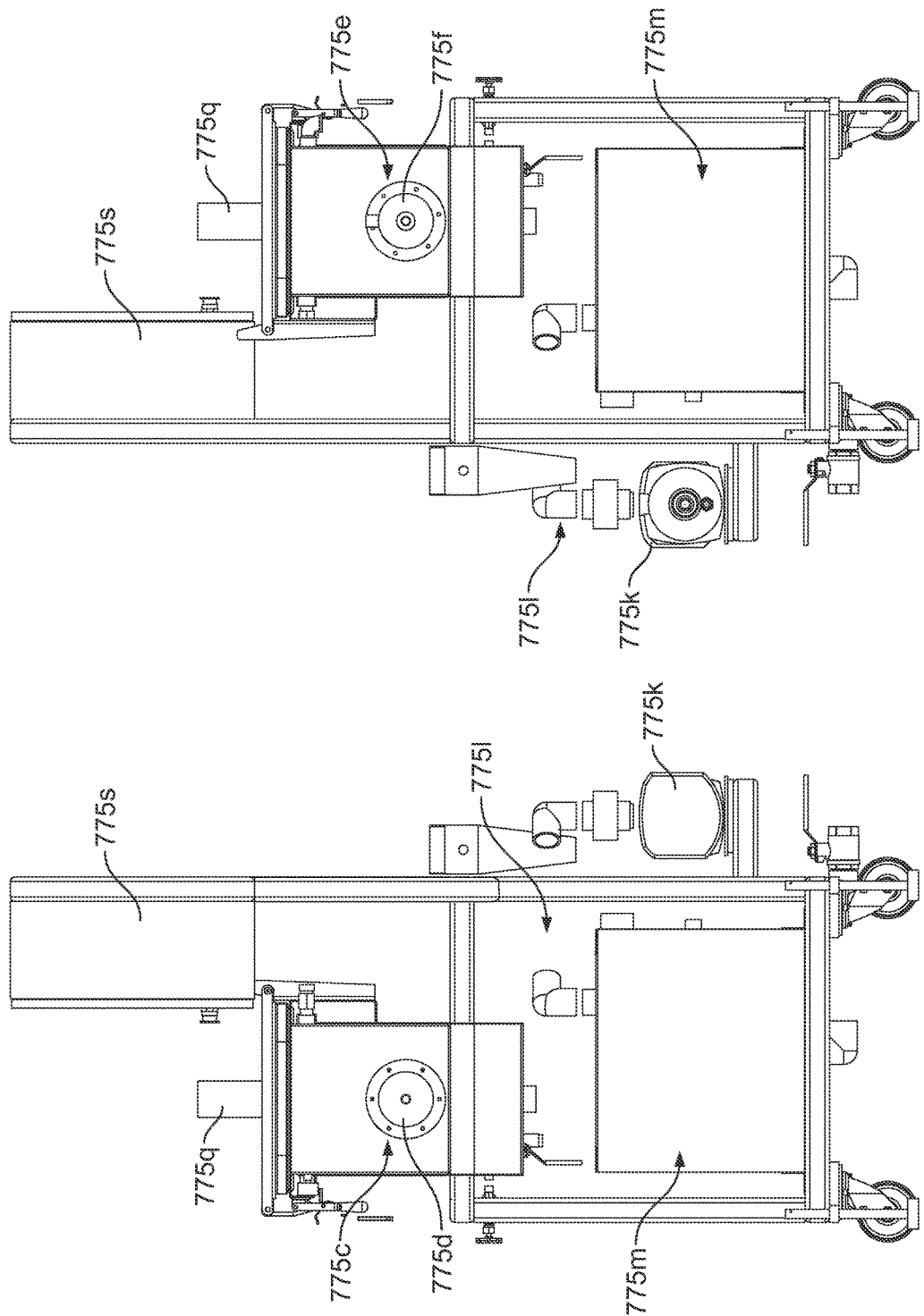

METHODS AND APPARATUS FOR CHECKING EMITTER BONDS IN AN IRRIGATION DRIP LINE

CROSS REFERENCE TO RELATED APPLICATIONS

This application claims the benefit of similarly titled U.S. Provisional Application No. 62/049,327, filed Sep. 11, 2014, which is incorporated herein by reference in its entirety.

FIELD

The present invention relates to methods and apparatus for checking emitter bonds in an irrigation drip line, and more particularly, to methods and apparatus for manufacturing drip line in a manner that allows the bond between the in-line emitter and surrounding tubing to be checked.

BACKGROUND

Irrigation drip emitters are commonly used in irrigation systems to convert fluid flowing through a supply tube or drip line at a relatively high flow rate to a relatively low flow rate at the outlet of each emitter. Such emitters are typically used in landscaping (both residential and commercial) to water and/or treat (e.g., fertilize) trees, shrubs, flowers, grass and other vegetation, and in agricultural applications to water and/or treat crops. Typically, multiple drip emitters are positioned on the inside or outside of a water supply line or tube at predetermined intervals to distribute water and/or other fluids at precise points to surrounding land and vegetation. The emitter normally includes a pressure reducing passageway, such as a zigzag labyrinth or passage, which reduces high pressure fluid entering the drip emitter into relatively low pressure fluid exiting the drip emitter. Generally, such drip emitters are formed in one of three common manners: (1) separate structures connected to a supply tube either internally (i.e., in-line emitters) or externally (i.e., on-line emitters or branch emitters); (2) drip strips or tape either connected to an inner surface of a supply tube or in-between ends of a material to form a generally round supply tube or conduit; and (3) stamped into a surface of a material that is then folded over upon itself or that overlaps itself to form a drip line with an enclosed emitter.

With respect to the first type of common drip emitter, the emitter is constructed of a separate housing that is attached to the drip line. The housing is normally a multi-piece structure that when assembled defines the pressure reducing flow path that the fluid travels through to reduce its pressure. Some examples of in-line emitters that are bonded to an inner surface of the supply line or tube are illustrated in U.S. Pat. No. 7,648,085 issued Jan. 19, 2010 and U.S. Patent Application Publication No. 2010/0282873, published Nov. 11, 2010, and some examples of on-line emitters which are connected to an exterior surface of the supply line or tube (usually by way of puncture via a barbed end) are illustrated in U.S. Pat. No. 5,820,029 issued Oct. 13, 1998. Some advantages to in-line emitters are that the emitter units are less susceptible to being knocked loose from the fluid carrying conduit and the conduit can be buried underground if desired (i.e., subsurface emitters) which further makes it difficult for the emitter to be inadvertently damaged (e.g., by way of being hit or kicked by a person, hit by a lawnmower or trimmer, etc.).

With respect to the second type of emitter, (i.e., drip strips or tape), the emitter is typically formed at predetermined intervals along a long stretch of material which is either bonded to the inner surface of the supply line or connected between ends of a material to form a generally round conduit or supply line with the strip or tape running the longitudinal length of the conduit. Some examples of drip strips or tape type emitters are illustrated in U.S. Pat. No. 4,726,520 issued Feb. 23, 1988.

With respect to the third type of emitter, (i.e., folded or overlapping tube emitters), the emitter is typically formed by stamping a pressure reducing flow path on one surface of a tube making material at or near an end thereof which is then folded back over on itself or which is wrapped such that the opposite end of the tube making material overlaps the end with the stamped flow path to form an enclosed pressure-reducing passageway. Some examples of folded or overlapping tube emitters are illustrated in U.S. Pat. No. 4,726,520 issued Feb. 23, 1988, and International Patent Application Publication No. WO 00/01219 published Jan. 13, 2000.

In addition, many if not all of the above mentioned emitters can be manufactured with a pressure compensating mechanism that allows the emitters to adjust or compensate for fluctuations in the fluid pressure within the supply line. For example, some of the above emitters include separate elastomeric diaphragms which are positioned adjacent the pressure reducing passageway and help reduce the cross-section of the passageway when an increase in supply line fluid pressure occurs and increase the cross-section of the passageway when a decrease in the supply line fluid pressure occurs.

While each of these forms of emitters has its own advantage, they each require either multiple pieces to be assembled, aligned and carefully bonded to the supply line or intricate stamping and folding or overlapping to be performed in order to manufacture the emitter and ensure that the emitter operates as desired. Thus, these emitters often require more time and care to assemble which needlessly can slow down the production of the drip line and/or emitter and can increase the cost of the drip line and/or emitter as well. Thus, there is a need for a simpler emitter construction that can be manufactured faster and using fewer parts and without wasting as much time, energy and materials related to aligning and assembling multiple parts of the emitter and/or folding or overlapping materials.

In addition, some of the above-mentioned emitters introduce structures (sometimes even the entire emitter body) into the main lumen of the supply line or tube which can cause turbulence and result in later emitters or emitters further downstream not working as well or efficiently as earlier emitters or upstream emitters. For example, in some of the non-pressure compensated emitters the introduction of too much turbulence from emitter structures located upstream can reduce the pressure of the fluid further downstream and result in the downstream emitters trickling water at a different flow rate than upstream emitters. This is not normally desirable as in most applications it would be desirable that the emitters of the drip line saturate their respective surrounding area at a common flow rate rather than having one portion of the drip line saturate one area more than another portion of the drip line saturates another area.

In other in-line emitters, large cylindrical structures are used which interfere with the flow of the fluid traveling through the drip line or tube and introduce more turbulence to the fluid or system due to the fact they cover and extend inward from the entire inner surface of the drip line or tube. The increased mass of the cylindrical unit and the fact it extends about the entire inner surface of the drip line or tube also increases the likelihood that the emitter will get clogged with grit or other particulates (which are more typically present at the wall portion of the tube or line than in the middle of the tube or line) and/or that the emitter itself will form a surface upon which grit or particulates can build-up on inside the drip line and slow the flow of fluid through the drip line or reduce the efficiency of the fluid flowing there through. Thus, there is also a need to reduce the size of in-line emitters and improve the efficiency of the systems within which these items are mounted.

New forms of emitters have been designed to overcome many of these problems and are disclosed in U.S. Published Patent Application No. 20130248616, published Sep. 26, 2013 and International Patent Application Publication No. WO2013148672, published Oct. 3, 2013. These emitters are made of a elastomeric body that integrally defines an inlet for receiving pressurized fluid from a fluid supply source, an outlet area for discharging the fluid from the elastomeric emitter body, a pressure reducing flow path extending between the inlet and the outlet for reducing the pressure and flow of fluid received at the inlet and discharged through the outlet area, and a pressure compensating portion for automatically adjusting the pressure and flow reducing effect of the flow channel in response to a change in pressure of the fluid supply source. While such an emitter overcomes the problems discussed above, the elastomeric material that makes-up the emitter can make it difficult to transport and insert the emitter into drip line or tubing using conventional insertion equipment due to the higher coefficient of friction that exists between the elastomeric material and the insertion equipment or tooling used to insert the emitter body into drip line tubing.

In addition to the above, it is difficult to confirm the sufficiency or integrity of the bond made between in-line emitters and the surrounding tubing within which they are mounted using conventional manufacturing processes. This is due primarily to the fact this bond is made blindly within the main lumen of the conduit and, thus, cannot be easily inspected. Another complicating factor is the speed at which it is desired to manufacture such drip line or tubing (e.g., typically it is desirable to manufacture such drip line at speeds well over 100 feet/minute).

If a sufficient bond is not made between the in-line emitters and the surrounding tubing, the emitters will likely not work as intended. For example, emitters that have a poor bond to the surrounding tubing will typically drip fluid at a faster rate than nearby emitters that have a better bond with the surrounding tubing. In some instances, emitters with poor bonds will also fail to compensate for fluctuations in fluid pressure within the surrounding tubing or drip line as well as their well bonded counterparts. The result of either of these situations is that the surrounding area of one emitter may get more fluid than the surrounding area of another emitter, which at a minimum is not desired and, in some instances, can even cause damage to the vegetation (e.g., plants, crops, landscaping, etc.) of the surrounding area.

Accordingly, it has been determined that a need exists for new methods and apparatus for checking emitter bonds in an irrigation drip line, and more particularly, new methods and apparatus for manufacturing drip line in a manner that allows the bond between the in-line emitter and surrounding tubing to be checked, and to form an irrigation assembly or system that overcome the aforementioned limitations and which further provide capabilities, features and functions, not available in current methods and apparatus relating to the manufacture of drip lines or emitters.

BRIEF DESCRIPTION OF THE DRAWINGS

The above and other aspects, features and advantages of several embodiments of the present invention will be more apparent from the following more particular description thereof, presented in conjunction with the following drawings.

FIGS. 10A-B are partial cross-section views of the guide bar of FIGS. 1A-G taken along line 10-10 in FIG. 1C illustrating an optional coolant system that may be used in conjunction with the guide bar, with FIG. 10B being an enlarged view of the distal end of the guide bar assembly;

FIGS. 19A-H are left front perspective, right front perspective, front elevation, cross-sectional, rear elevation, top plan, right side elevation and left side elevation views, respectively, of an in-line vacuum tester for checking the bond between emitters and the surrounding tubing during the manufacture of drip line, the cross-sectional view of FIG. 19D being taken along line 19D-19D in FIG. 19F.

Figure 1A:
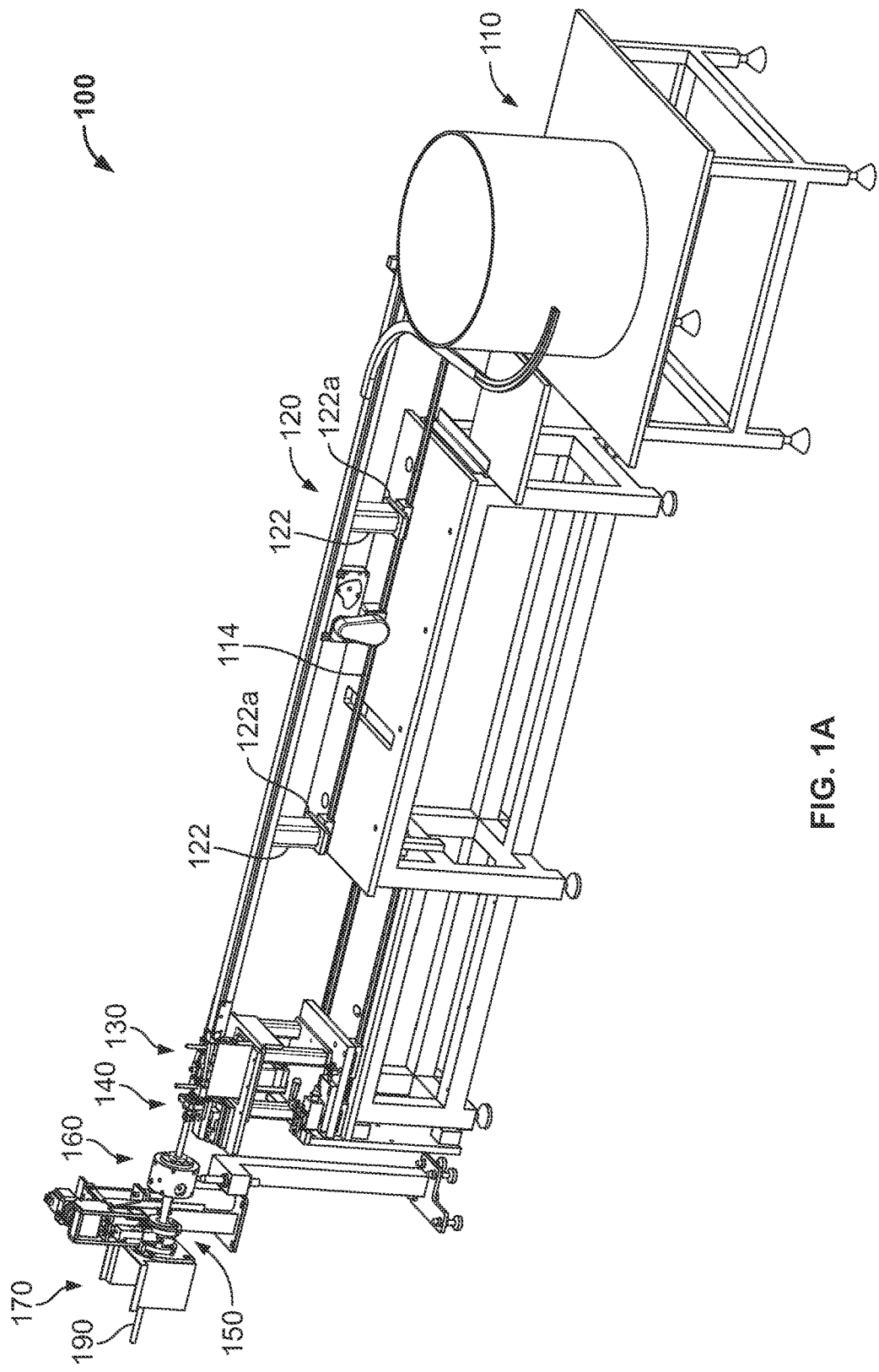
FIGS. 1A-B are perspective views of an apparatus for transporting or inserting elastomeric emitters and/or manufacturing drip line using such elastomeric emitters embodying features of the present invention, illustrating the apparatus from left and right sides, respectively.
Figure 1B:
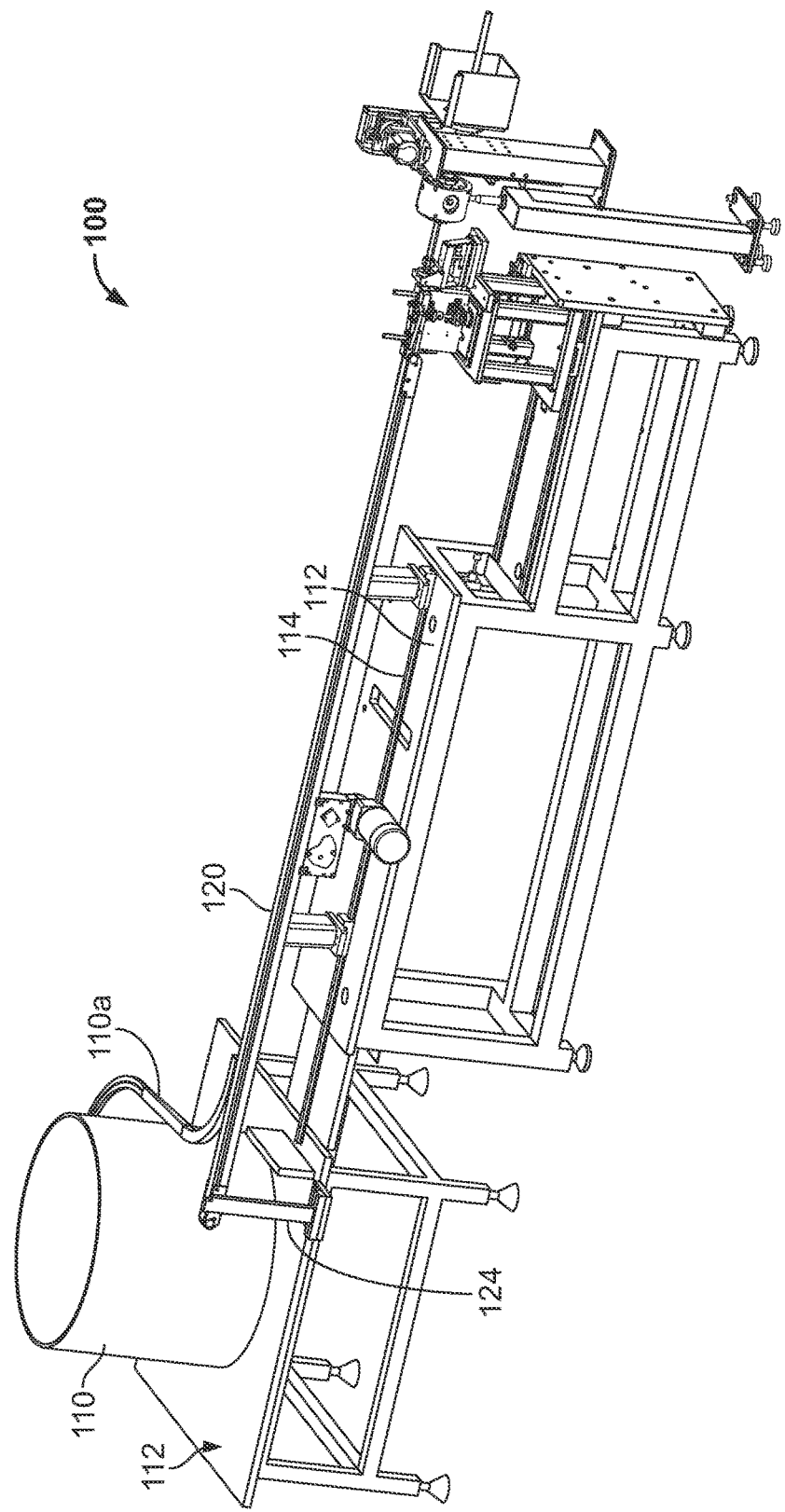
Figure 1C:
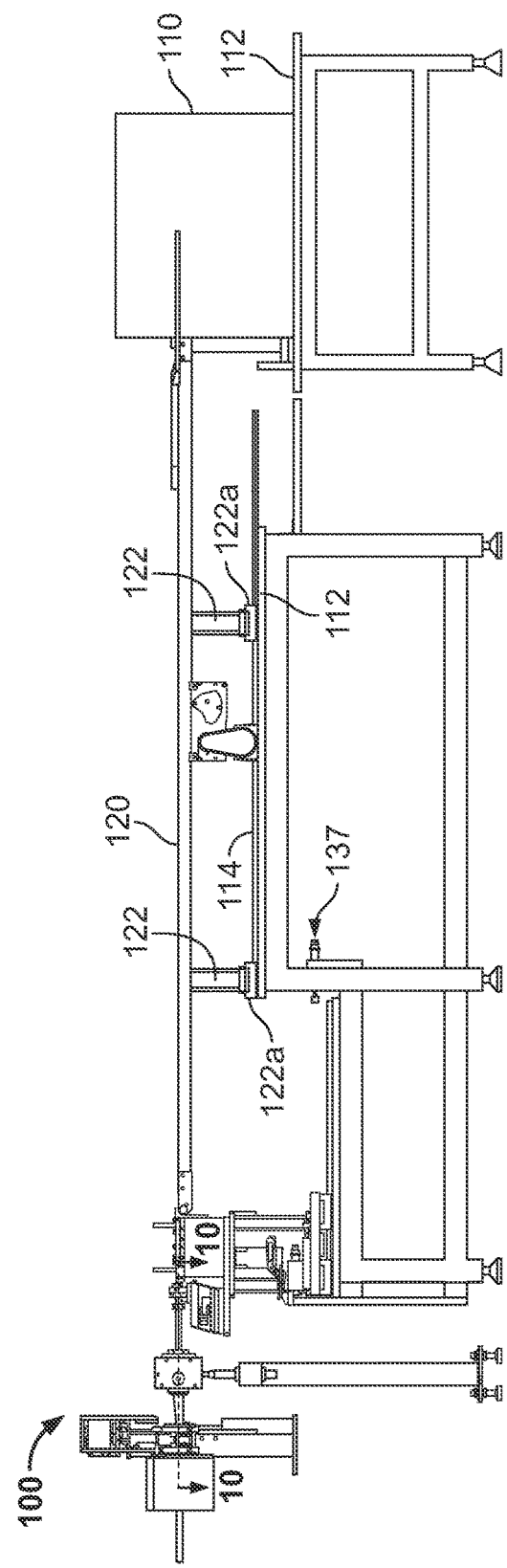
FIGS. 1C-G are left side elevation, right side elevation, top plan, front end and rear end elevation views, respectively, of the apparatus of FIGS. 1A-B, illustrating various components of the apparatus.
Figure 1D:
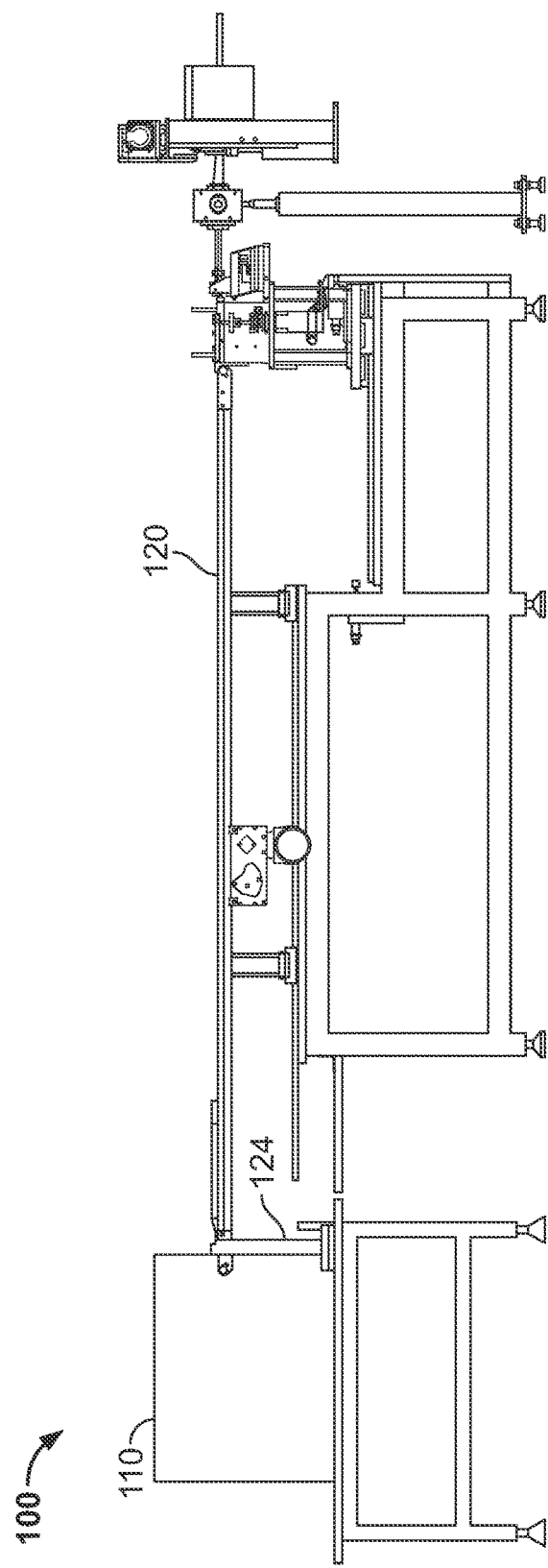

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DESCRIPTION OF THE PREFERRED EMBODIMENTS

As shown in FIGS. 1A-G, an apparatus for transporting or inserting elastomeric emitters and/or manufacturing drip line using elastomeric emitters is illustrated and referenced generally by reference numeral 100. The apparatus 100 includes a dispensing container or feeder, such as vibratory bowl 110, a conveyor 120, an emitter drive mechanism, such as escapement 130, an inserter or guide 140 and a bonding machine, such as tractor assembly 150. This insertion tooling 100 may be used in conjunction with other tubing manufacturing components, such as extruder 160 and water tank 170 to produce drip line tubing 190 for use in irrigation applications. In the form illustrated, the apparatus 100 is setup to insert flat elastomeric emitters into tubing to form irrigation drip line.

Examples of flat elastomeric emitters that may be used in conjunction with apparatus 100 are illustrated in U.S. Published Patent Application No. 20130248616, published Sep. 26, 2013, and International Patent Application Publication No. WO2013148672, published Oct. 3, 2013, the disclosures of which are incorporated herein by reference in their entirety. It should be understood, however, that in alternate embodiments, the apparatus 100 may be used to insert other types of emitters. For example, other types of elastomeric emitters (e.g., round or cylindrical emitters, tape emitters, etc.). In other examples, this apparatus 100 may be used to insert emitters that are not entirely made of elastomeric material (e.g., hybrid emitters made of rigid polymers and elastomeric materials) or even emitters that do not have any elastomeric material (e.g., purely rigid polymer structures), if desired. A system for manufacturing drip line is disclosed in U.S. Provisional Patent Application No. 61/894,296, filed Oct. 22, 2013, which is also incorporated herein by reference in its entirety.

In the form illustrated in FIGS. 1A-G, the apparatus is shown using a dispensing container or feeder, such as centrifugal bowl feeder 110, which is generally cylindrical in shape and is capable of holding or storing large quantities of emitters and consistently feeding such parts to conveyor 120 in a predetermined orientation. In a preferred form, the bowl feeder 110 orientates the emitters in the same direction via vibration and gravity and, preferably, with the emitter inlet being positioned forward or in the front when looking in the direction of travel for the emitter (or downstream) and the outlet positioned rearward. In addition, the feeder 110 will preferably include optical sensors and a controller which are used to monitor and control, respectively, the number of emitters being fed by the bowl feeder 110 onto conveyor 120. This allows the bowl feeder 110 to be used separate and apart from the other components of apparatus 100, (e.g., conveyer 120, escapement 130, guide bar 140), to control the flow of emitters through the system or apparatus. Thus, if more emitters are needed on the conveyor 120, the bowl feeder 110 can speed-up to increase the number of emitters provided to the conveyor 120. Conversely, if a pileup or logjam starts to occur downstream (e.g., where the emitters are placed onto the conveyor 120, where the emitters transition from conveyor 120 to escapement 130, or from the escapement 130 to the guide bar 140), the bowl feeder 110 can be shut down or slowed until the problem is resolved.

In a preferred form, the bowl feeder 110 will also have an access panel or door that allows for rapid removal of any remaining product in the bowl feeder 110 so that the apparatus 100 may be changed over to transport and/or manufacture drip line using emitters of a different type (e.g., emitters with different drip rates, emitters with different configurations, such as round or cylindrical emitters, emitters made of different materials such as rigid polymers, etc.). The vibratory nature of bowl feeder 110 helps reduce the friction between the elastomeric emitters and the insertion tooling 100 and keep the elastomeric emitters moving through the system 100 despite the increased coefficient of friction that normally exists between the elastomeric material of the emitter and the surfaces of the insertion tooling that the elastomeric material comes into contact with during operation of the insertion tooling 100. As mentioned above, the vibration of feeder 110 is also used to help place the emitters into a desired orientation.

In addition, the bowl feeder 110 may further include a lubricant applied to the surfaces of the bowl feeder 110 that the emitters will contact, such as a synthetic fluoropolymer of tetrafluoroethylene like polytetrafluoroethylene (PTFE) (e.g., TEFLON brand lubricants produced by DuPont Co.). Thus, the PTFE coated surfaces reduce the friction between the elastomeric emitters and the feeder 110 so that the emitters move more easily through the feeder 110 and the feeder track or arm channel 110*a* that delivers the emitters to conveyor 120. In a preferred form, feeder 110 is a vibratory feeder that vibrates the emitters into a properly orientated line of emitters that can be fed onto conveyor 120. Vibratory emitters can be set to a frequency that will position the bulk product being fed by the feeder into a desired orientation and a single file line if desired.

In the form illustrated in FIGS. 1A-G, a pneumatic conveyor, such as an air conveyor, is used for conveyor 120 in order to further reduce the effects of the increased coefficient of friction that would normally exist between the elastomeric material of the emitters and the insertion tooling surfaces the elastomeric material comes into contact with during operation of the tooling 100. The air that passes through the air conveyor at least partially levitates (if not fully levitates) the emitter to reduce friction between the emitter and its surrounding environment. Generally constant back pressure is applied to the entire system (e.g., conveyor 120 and feeder 110) to keep the emitters moving through the conveyor 120 and toward the escapement 130. In a preferred form, forward facing air jets will be mounted at various intervals through the conveyor to keep the emitters moving in a desired direction and at a desired pace.

As may best be seen in FIGS. 2A-3B, the conveyor 120 is movable between a first position wherein the insertion tooling is inserted into or engaged with the extruder 170 (FIG. 2A) so that the insertion tooling can be used to insert emitters into drip line tubing 190 as it is extruded, and a second position wherein the insertion tooling is retracted or disengaged from the extruder 170 (FIG. 2B) so that the extruder can produce tubing without inserted emitters. In the form illustrated, the conveyor 120 helps accomplish this by being moveably mounted to the surrounding work surface, which in this case is a table 112 but in alternate forms could be other work surfaces such as a shop floor, etc. In a preferred form, the table has a rail 114 to which posts or stanchions 122 are moveably connected on one end and that are connected on the opposite end to portions of conveyor 110. In FIGS. 1A-G, the stanchions 122 are spaced along the conveyor 120 to ensure sufficient support for the conveyor 120 and rest on slides 122a that move along the rail 114 as the conveyor 120 moves between the first and second positions. Longer conveyor runs may require additional stanchions and, conversely, fewer stanchions may be required for shorter runs. In the form illustrated, the system 100 includes a fixed stanchion or support 124 on a distal end of the conveyor 120 that the conveyor 120 moves with respect to when moved between the first and second positions. The feeder arm or channel 110a of vibratory feeder bowl 110 also remains stationary while the conveyor is moved between the first and second positions. In the form illustrated, the feeder arm and shuttle cover are positioned in a top-loading position above the conveyor 120 in order to allow for the conveyor movement between the first and second positions.

It should be understood, that in alternate embodiments the moveable connection between the conveyor 120 and table 112 may be achieved via alternate types of moveable connection. For example, instead of connecting the conveyor stanchions 122 to a rail 114, the stanchions could connect to a channel connected to the table 112 (e.g., recessed in a surface of table 112, extending up from a surface of table 112, etc.). In yet other forms, the stanchions 122 may be mounted on one or more wheels to allow for movement of the conveyor 120 between the first and second positions. In still other forms, the stanchions 122 may be fixed with respect to the table and the conveyor 120 may be designed to move with respect to the opposite end of the stanchion 122 (e.g., the conveyor-end of the stanchions may be equipped with rollers, a rail, etc.).

Movement of the conveyor 120 may be motorized if desired. For example, motor 126 may be used to drive the conveyor back and forth along the rail 114 between the conveyor's first and second positions. In such instances, the motor 126 may be equipped to provide fine and coarse adjustments so that the majority of travel of the conveyor 120 to and from the second position can be handled at a faster pace, while the portion of travel to and from the first position can be handled at a slower pace that allows for fine adjustment of the guide bar 140 being inserted into the extruder 160. In alternate embodiments wherein a more traditional belt or roller conveyor system is used, motor 126 may be used for moving the belt and/or rollers and may be connected to rail 114 to simply assist with sliding the conveyor between the first and second positions. In still other forms, the motor 126 may be used to do both (i.e., moving the conveyor 120 and a belt or roller of the conveyor, etc.).

In the form illustrated, the conveyor 120 is capable of being connected to a shop air system to utilize compressed air that is available on site and therefore not requiring an additional air compressor or tank. In alternate embodiments, however, system 100 may further include a separate air compressor and air tank to allow for operation of the air conveyor. These additional components could be mounted to the rail 114 to allow for movement of the components along with the conveyor as it moves between the first and second positions. Alternatively, these components could be placed in a static position (e.g., along, on or under table 112) and simply be connected to the conveyor 120 in such a way as to allow for conveyor movement between the first and second positions (e.g., via flexible air or pneumatic lines that have enough slack for accommodating conveyor movement, etc.).

The conveyor depicted in FIGS. 1A-G further shows a generally horizontal conveyor 120, however, it should be understood that in alternate embodiments an angled conveyor may be positioned. For example, the conveyor 120 may be configured to utilize gravity to help move the emitters from the vibratory bowl 110 to the escapement 130. Thus, the vibratory bowl end of the conveyor may be positioned higher than the escapement end of the conveyor, which may also require the vibratory bowl to be positioned higher with respect to the remainder of the insertion tooling components.

Figure 4:
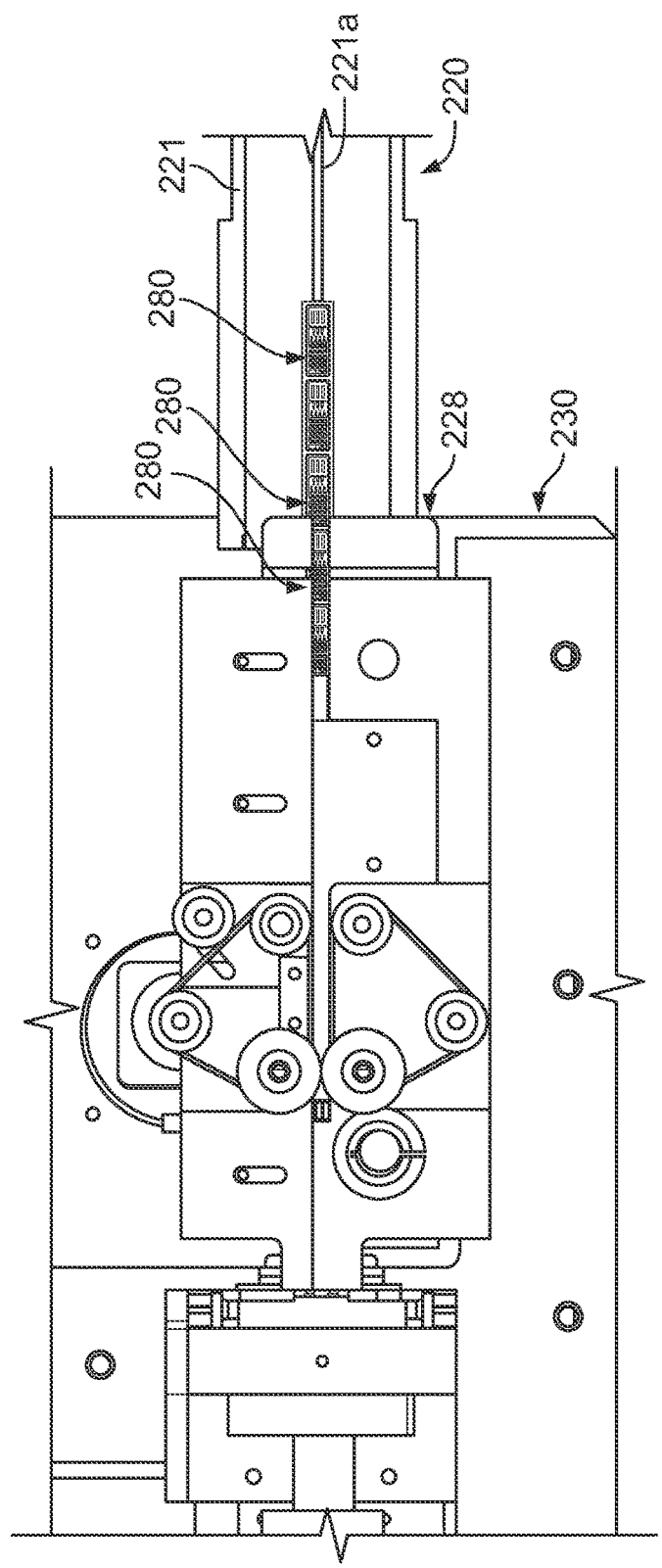
FIG. 4 is a partial top plan view of an alternate slotted belt conveyor system embodying features of the present invention.

While an air conveyor has been described for conveyor 120, it should be appreciated that in alternate embodiments different types of conveyors may be used in connection with insertion tooling 100. For example, in FIG. 4 an alternate slotted belt conveyor is illustrated. For convenience, features of this embodiment that are similar with those discussed above will use the same latter two-digit reference numeral but include the prefix "2" merely to distinguish one embodiment from the other. Thus, in FIG. 4 the conveyor is referenced by reference numeral 220 and the escapement by reference numeral 230. In this embodiment, the conveyor 220 includes a belt 221 that carries the emitters 280 from the vibratory feeder bowl 210 to the escapement 230. In this embodiment, the belt 221 defines a recess, such as slot 221a, for receiving the inlet protrusion of emitter 280 so that the emitter rests generally flush on the upper surface of the belt 221.

Figure 17A:
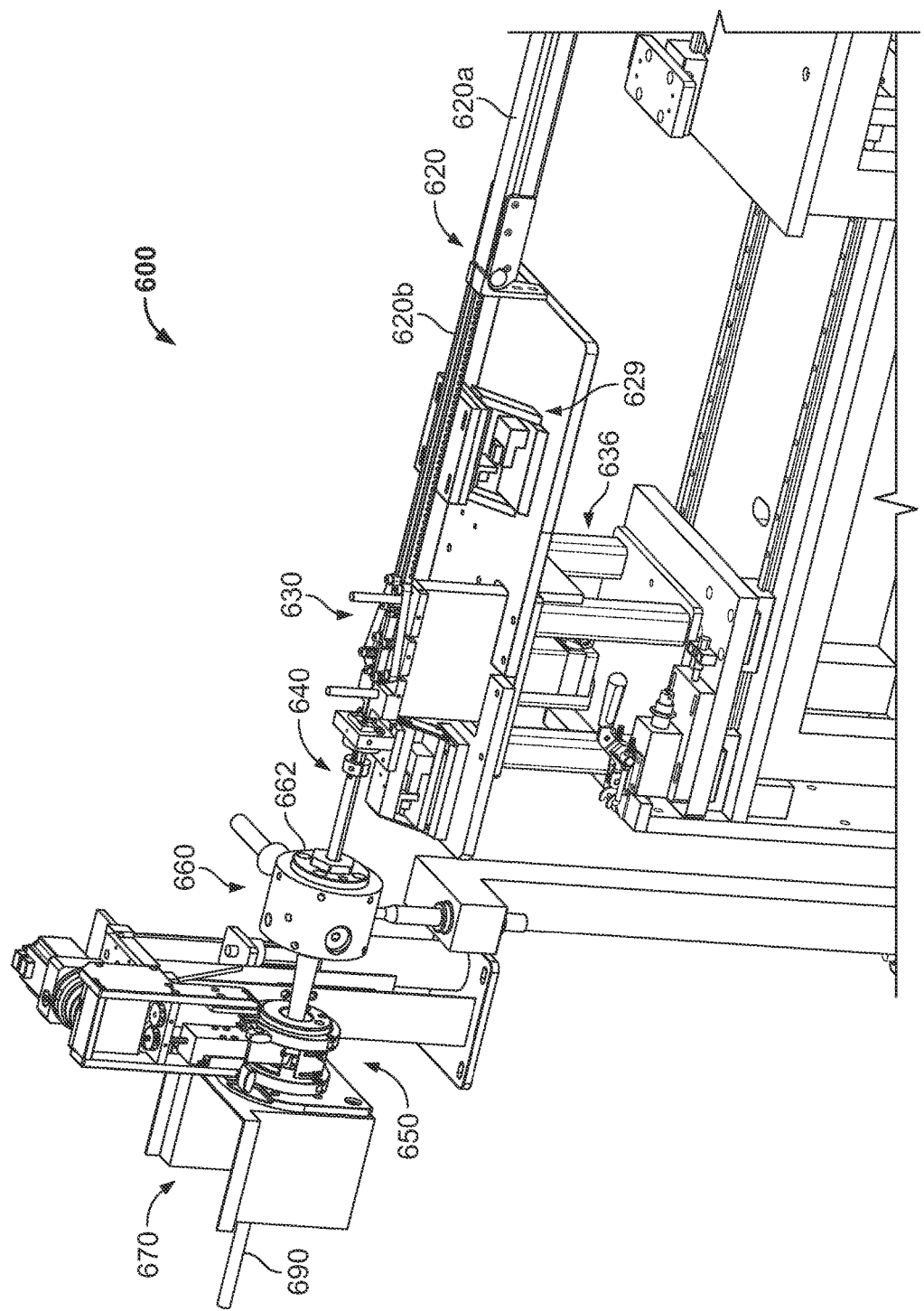
FIGS. 17A-B are perspective views of another insertion tool in accordance with the present invention illustrating a system having first and second conveyors for delivering emitters to the escapement, with FIG. 17B being an enlarged view of the second conveyor and second vibratory drive associated with same.
Figure 17B:
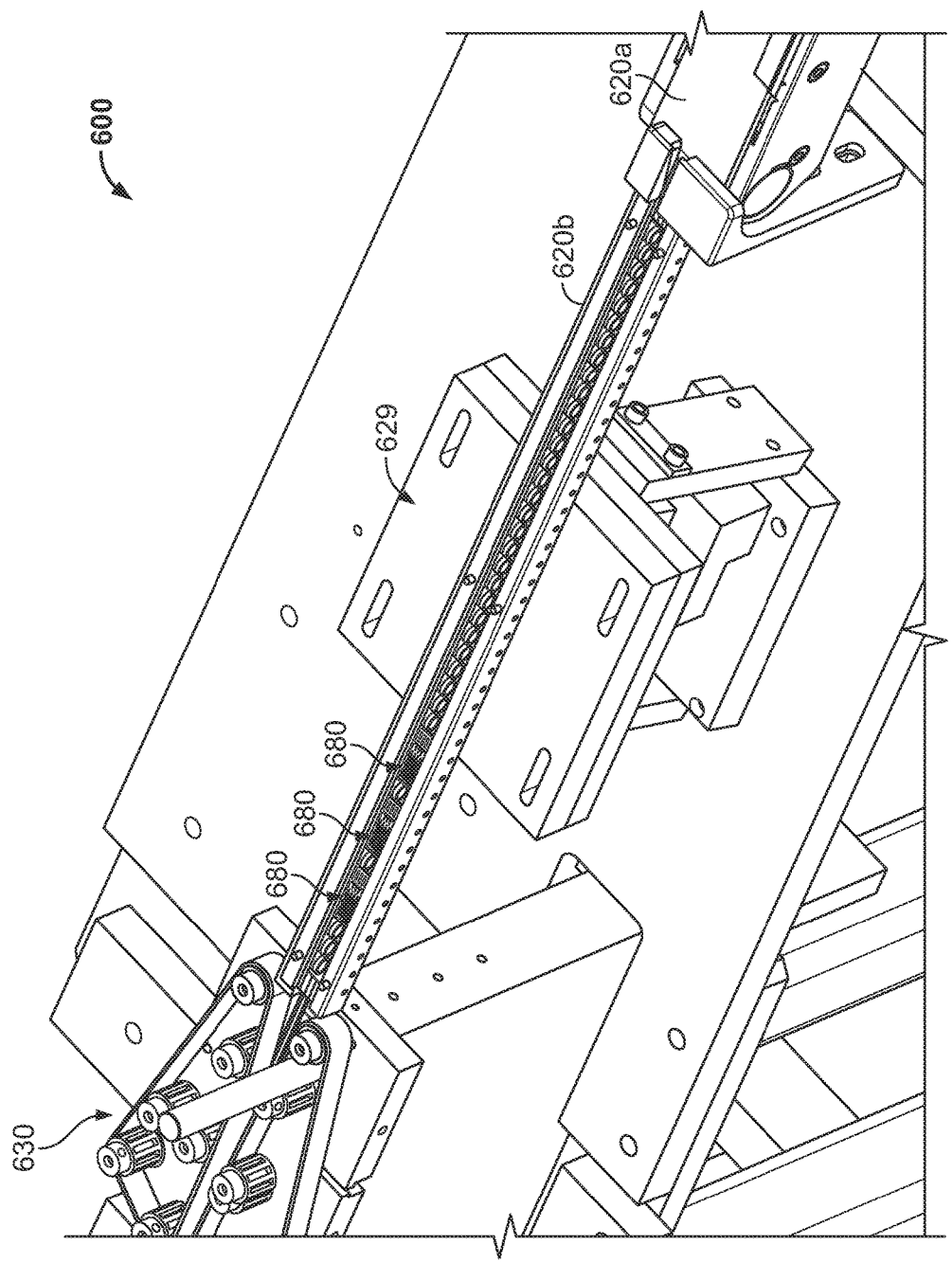

In lieu of belt 221, a roller conveyor could alternatively be used (see, e.g., FIGS. 17A-B). In a preferred form, the rollers of the roller conveyor will similarly include or define a slot or recess within which the inlet protrusion of emitter 280 may be disposed to allow the emitter to rest generally flush on the uppermost surface of the rollers. The slot may be defined by a notch in rollers that otherwise run the width of the conveyor 230, or alternatively, separate arrays of rollers may be positioned parallel to one another but spaced sufficiently apart from one another to create a slot, such as a gap or opening between the rollers, within which the inlet protrusion of emitter 280 can be disposed so that the emitter rests generally flush on the uppermost surface of the rollers. In a preferred form, such a roller conveyor system would include some rollers that are motor driven to maintain the ability to drive emitters down the conveyor and/or the ability to control how the emitters are driven down the conveyor so that the conveyor remains separately controllable from the bowl feeder and the escapement. In addition, the roller conveyor system would be angled downward so that the bowl inserter end of the conveyor is positioned higher than the escapement end of the conveyor to utilize the effects of gravity to assist in moving the emitters down the conveyor. Alternatively, the roller conveyor may include a vibratory drive for driving emitters along the roller conveyor (see, e.g., FIGS. 17A-B).

Figure 5:
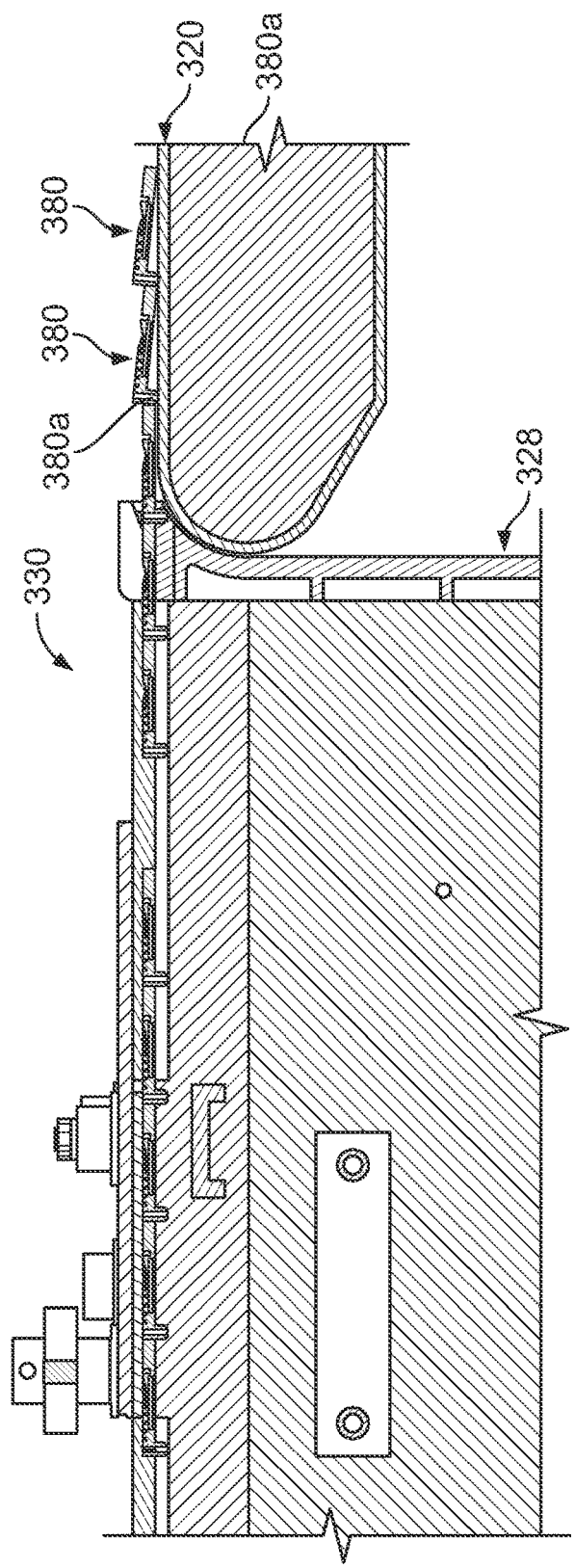
FIG. 5 is a partial cross-section of an alternate belt conveyor system embodying features of the present invention illustrating the conveyor from a side elevation view.

In yet other embodiments, a plain belt conveyor may be used such as that depicted in FIG. 5. In keeping with the above practice, items in this figure that are similar to those discussed above will be referenced using the same latter two-digit reference numeral, but having the prefix "3" to distinguish one embodiment from others. Thus, in FIG. 5, the conveyor is referenced generally by reference numeral 320 and the escapement is referenced by reference numeral 330. In this embodiment, a conventional flat conveyor belt is illustrated which causes the emitters 380 to sit-up or rest on their respective inlet protrusions 380*a*. As the emitters approach the escapement 330, the curvature of the belt lowers the emitter 380 so that each emitter 380 aligns with the channel defined by the escapement 330 and, in particular, the conveyor bridge 328 located between the curved end of conveyor 320 and escapement 330. In a preferred form, the conveyor bridge 328 defines a channel with a T-shaped cross-section that aligns the emitter 380 with a similarly shaped channel defined by escapement 330, with the vertical portion of the T-shaped channel accommodating the inlet protrusion 380*a* of emitter 380. The channel defined by the conveyor bridge 328 may further be tapered or bell-mouthed at its opening on the conveyor side of the conveyor bridge 328 in order to account for emitters 380 that are slightly askew or out of alignment so that the emitters 380 transition from the conveyor 320 to the escapement 330 with ease. In the form illustrated, this tapering or bell mouthing accounts for vertical and horizontal misalignment of the emitters 380 and positions the emitters 380 so that the lower shoulders of the T-shaped channel support the lower side surfaces of the emitters 380 and position the emitters 380 to be grabbed and driven by the escapement 330.

Any of the conveyors used in connection with apparatus 100 may utilize vibration to assist with transporting the elastomeric emitters from one end of the conveyor 120 (e.g., the vibratory bowl end) to the other end of the conveyor 120 (e.g., the escapement end). For example, in the form illustrated in FIGS. 1A-B, an electromagnetic vibrator may be coupled to the conveyor bridge 128 or conveyor 120 near the conveyor bridge 128 and/or escapement 130 in order to reduce the friction between the elastomeric emitter and the insertion tooling to continue to move the emitters from the conveyor 120 to the escapement 130 without problem. In addition, any of the conveyors discussed herein could be setup so that the conveyor can continue to run even when emitters are stacked end-to-end waiting to enter the conveyor bridge or escapement 130. For example, with the slotted conveyor belt of FIG. 4, the belt may be configured to allow for the belt to slip under the emitter or emitters once a series of emitters are aligned end-to-end entering the escapement 130. This allows system 100 to stack several emitters in a single file line on the conveyor 120 ready to enter escapement 130 and, eventually, guide bar 140. In still other forms, a chute may be used in place of a conveyor that either uses angles and gravity or vibration to move the emitters from feeder 110 to escapement 130. For example, a non-moving conveyor may advance emitters via vibration only if desired.

Another embodiment of insertion tooling 100 is illustrated in FIGS. 17A-B, which utilizes more than one type of conveyor to advance emitters from the feeder to the escapement. In keeping with the above practice, items of FIGS. 17A-B which are similar to those discussed elsewhere in the application will be referenced using the same latter two-digit reference numeral, but using the prefix "6" to distinguish one embodiment from others. Thus, in FIGS. 17A-B, the insertion tooling is referred to generally using reference numeral 600 and includes a vibratory bowl feeder (not shown), a conveyor 620, emitter drive mechanism 630, and inserter 640. The vibratory bowl feeder deposits emitters 680 onto a first conveyor, such as belt conveyor 620*a*, which in turn delivers the emitters 680 to a second conveyor, such as roller conveyor 620*b*. The roller conveyor 620*b* defines a channel between rollers within which the emitter inlet protrusion is disposed and aligns the emitters to transition from the roller conveyor 620*b* to the emitter drive mechanism 630.

In addition, system 600 illustrated in FIGS. 17A-B includes a stimulator, such as electric vibratory drive 629, which urges emitters 680 to travel from the belt conveyor end of roller conveyor 620*b* toward the emitter drive mechanism 630. The vibratory drive 629 gently vibrates the roller conveyor 620*b* at a high frequency to at least partially levitate or lift the emitters 680 within emitter channel 142 and reduce the amount of friction present between the elastomeric emitters 680 and the roller conveyor 620*b* which, in turn, makes it easier to move the elastomeric emitters through the conveyor 620*b*. In the form illustrated, the vibratory drive 629 is connected to the same base 636 as the emitter drive mechanism 630 and inserter 640 so that the conveyor 620*b* and vibratory drive 629 remain moveable between the first and second positions along with the belt conveyor 620*a* of conveyor assembly 620. As mentioned above, in the first position the conveyor 620 (e.g., both first and second conveyor members 620*a*, 620*b*), emitter drive mechanism 630 and inserter 640 are positioned to allow the inserter 640 to be inserted or engaged with the extruder 660 so that emitters 680 can be bonded to extruded tubing via bonding mechanism 650 to form drip line 690 and in the second position the conveyor 620, emitter drive mechanism 630 and inserter 640 are moved to a second/different position so that inserter 640 is removed or retracted from the extruder 660. In a preferred form, the vibratory drive 629 is not operable as the guide bar 640 is moved toward the first position and inserted through the extruder die head 662, however, the vibratory drive 629 would be setup such that even if it were operational during movement of the guide bar 640 toward the first position the vibration induced in the inserter or guide bar 640 would not be sufficient to risk damaging the guide bar 640 on the extruder 660 or vice versa.

In the form illustrated, vibratory drive 629 is similar to the electric vibratory drives used in connection with the vibratory drum feeder. However, it should be understood that in alternate embodiments alternate forms of vibratory drives may be used for any of the vibratory drives disclosed herein (e.g., rotary vibrators, electromagnetic vibrators, piston vibrators, pneumatic vibrators, etc.). Further and as stated above, vibratory drives may be added to any of the components of apparatus 600 (e.g., bowl feeder, first conveyor 620a, emitter drive mechanism 630 and inserter 640) in order to assist in transporting the elastomeric emitters through the system as desired (as will be discussed further below). Thus, in some forms, only the bowl feeder and inserter 640 may be equipped with vibratory drives. In other forms, the bowl feeder, conveyor 620 and guide bar 640 may all be equipped with vibratory drives. In still other forms, only the guide bar 640 or bowl feeder may be equipped with vibratory drives. In addition, various components of the system may be mounted to a common frame that is itself connected to a vibratory drive to induce vibration into the connected components so that more than one vibratory drive is not needed. For example, the bowl feeder, conveyor 620, emitter drive mechanism 630 and guide bar 640 could all be mounted to a common frame which is itself connected to a vibratory drive to induce vibration throughout the system 600 if desired. In other forms, other components may be connected to one another (but not all other components) and vibrated via a common vibratory drive to at least reduce the number of vibratory drives necessary for apparatus 600.

Turning back to FIGS. 1A-3B, the apparatus 100 preferably includes an escapement 130 that includes an emitter drive mechanism, such as belt drive 132 that grasps the emitters being fed into the escapement from the conveyor 120 and drives the emitters toward the guide bar 140. As mentioned above, and best shown in FIG. 6, the escapement 130 preferably defines a T-shaped channel that aligns with both the conveyor 120 and guide bar 140, with the lower vertical portion of the T-shaped channel being sized to accommodate or fit the inlet protrusion of the emitter. In a preferred form, the belt drive 132 is positioned to engage at least the sides of the emitter and drive the emitter through the escapement 130 and into the guide bar 140. As more emitters are driven into the guide bar 140, the guide bar begins to fill-up until emitters are stacked single file and end-to-end along the guide bar 140 and into the escapement 130. Thus, advancement of an emitter will force all emitters loaded into the guide bar 140 to advance. When the guide bar 140 is filled with emitters, advancement of another emitter through the escapement drive mechanism 132 will cause the emitter furthest from the escapement 130 on guide bar 140 to advance onto the distal end or bonding position of the guide bar 140 at which point the emitter will be bonded to the extruded tubing via the bonding mechanism or machine 150.

A controller, such as a programmable logic controller (PLC), may be used to control the operation of the drive mechanism 132 of escapement 130 in order to drive emitters through the escapement 130 and into and out of guide bar 140 at predetermined and/or desired intervals and/or to ensure that the emitters are spaced apart from one another at desired intervals in tubing 190. In addition, optical sensors may be used in conjunction with the escapement 130 to ensure that a sufficient number of emitters are lined-up and ready for insertion via insertion tooling 100. As mentioned above, in a preferred form the escapement 130 will be independently operable separate and apart from the conveyor 120 and vibratory bowl inserter 110 so that a desired or proper number of emitters may be maintained in each portion of the apparatus 100 at all times. Optical sensors may also be placed about the escapement channel and/or the guide bar assembly to ensure that a sufficient number of emitters are present in system 100 and that the PLC controller is maintaining the desired insertion pace and/or distance between emitters.

Figure 6:
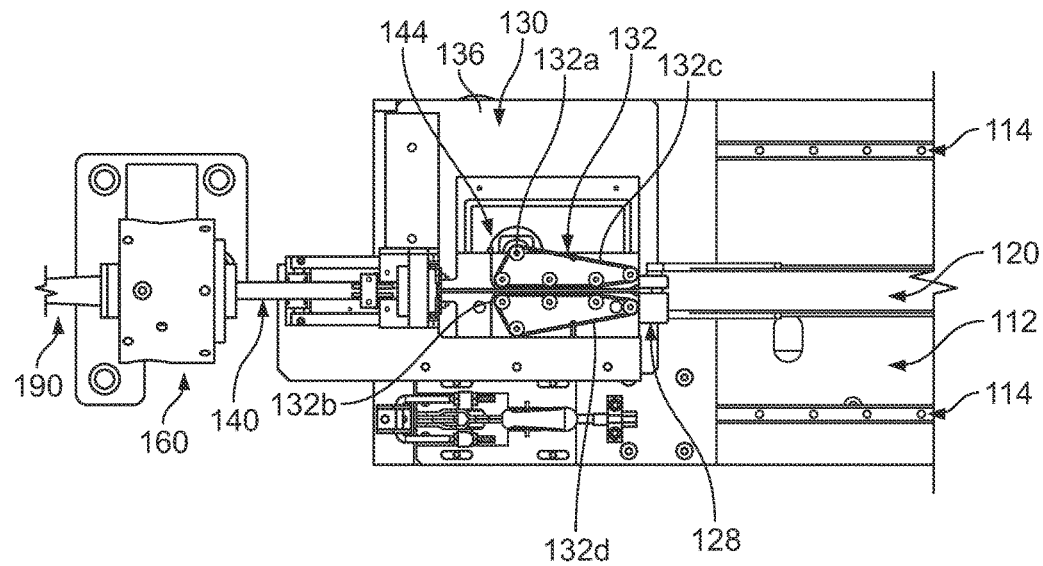
FIG. 6 is a partial top plan view of the escapement of FIGS. 1A-G illustrating a tapered belt system that accommodates for misaligned emitters and/or assists in aligning the emitter before driving same into a guide bar.

In the form illustrated in FIG. 6, the belt drive 132 is tapered so that a larger opening or ingress is provided where the emitter is received into the escapement 130 which then tapers down to a narrower opening at the exit or egress where the emitter leaves the escapement drive mechanism 132. Like the tapered shape of the conveyor bridge 128, the tapered shape of belt drive 132 allows the insertion tooling to account for misaligned emitters and/or slight variances in the alignment or positioning of the emitters as the emitters transition from the conveyor 120 to the escapement 130 and then tapers the belt to properly align the emitter for the guide bar 140. In alternate forms, the escapement 130 may be provided with a drive mechanism that does not utilize such a tapering feature such as that shown in FIG. 4, if desired.

In the form illustrated in FIGS. 1A-3B and 6, the belt drive 132 of escapement 130 uses a toothed synchronous belt that is driven by motor 144 and drive wheel or cog 132a. More particularly, motor 144, such as a stepping MPL low inertia servo motor, turns a motor output shaft connected to drive wheel 132a in response to the controller (e.g., PLC), which in turn drives the sprocket wheels or ribbed rollers 132b connected to ribbed drive wheel 132a via belt 132c. This causes the emitters entering escapement 130 to move through the escapement and results in the corresponding freewheeling belt 132d moving along with the emitter and belt 132c as the emitter is passed through escapement 130 at the speed set by the controller and first belt 132c. The stepping motor 144 can be adjusted to provide for a displacement of one emitter at a time through the escapement 130. This ensures proper spacing and provides a non-slip surface between the emitter and drive belt 132c. Although in the form illustrated only one belt (i.e., belt 132c) is driven, it should be understood that in alternate embodiments motor 144 could also drive a second drive wheel connected to the second belt 132d, if desired. Similarly, belt tensioning mechanisms could be provided to adjust the tension of each belt in belt drive 132 if desired. For example, the apparatus 100 may be equipped to move one of the wheels of each belt to increase or decrease tension. In alternate forms, movable pins may be provided that the belts travel along in order to adjust tension for each belt. In still other forms, a single belt could be used to drive both sides of the emitter passing through a network of sprockets that transfer the belt from one side of the escapement 130 to the other so that the belt engages both sides of emitters entering into the escapement 130.

While the drive mechanism of escapement 130 is positioned or oriented horizontally and drives opposite sides of the emitters, it should be understood that in alternate embodiments the drive mechanism of escapement 130 may be positioned in different orientations to drive the emitter. For example, in one alternate form, the drive mechanism could be rotated ninety degrees (90°) to drive opposite top and bottom surfaces of the emitter. Such an embodiment would likely be used in conjunction with emitters that do not have inlet protrusions, however, it is possible to use such a configuration even with emitters having inlet protrusions. For example, two vertically oriented drive mechanisms could be positioned on opposite sides of the emitter with each drive mechanism driving a portion of the upper and lower surface of the emitter, but being spaced apart from one another sufficiently to allow for the inlet protrusion to pass between the drive mechanisms. In other forms, the drive mechanism may only engage a single surface of the emitter to drive the emitter toward guide bar assembly 140.

Figure 7:
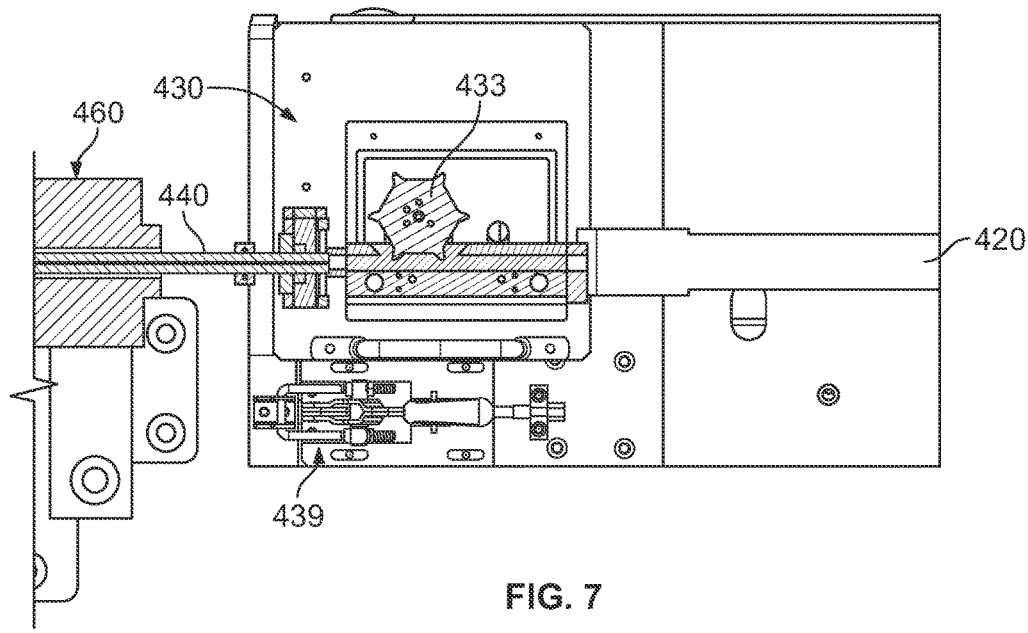
FIG. 7 is a partial cross-section of an alternate escapement drive system embodying features of the present invention, illustrating the drive system from a top plan view but in cross section so that the star gear that rests below a cover member is visible.

It should also be understood that alternate forms of drive mechanisms may be used to drive the emitters via escapement 130. For example, in FIG. 7, an alternate geared system is illustrated that utilizes a star gear for driving emitters through the escapement and into and out of the guide bar at desired or predetermined intervals. In keeping with the above practice, items depicted in this embodiment that are similar to those discussed above will use the same latter two-digit reference numeral but utilizing a prefix of "4" to distinguish this embodiment from others. In the form illustrated, conveyor 420 feeds emitters into a channel within escapement 430, which preferably has a T-shaped cross-section. As the emitters fill the channel of the escapement, a controller such as a PLC is used to drive a gear, such as star wheel 433, which has teeth positioned to drive or advance one emitter toward the guide bar 440. As the guide bar fills, rotation of the star wheel 433 eventually results in advancement of an emitter toward the guide bar 140 which, in turn, forces the emitter on the guide bar 440 furthest from escapement 430 to be inserted into and bonded to tubing extruded from extruder 460. In yet other embodiments, other forms of drive mechanism may be used such as drive wheels, shuttles, pneumatics, flat belts, V-belts, etc.

The channels defined by conveyor bridge 128 and escapement 130 may be coated with a lubricant such as a synthetic fluoropolymer of tetrafluoroethylene, (e.g., a polytetrafluoroethylene (PTFE) like DuPont's TEFLON brand lubricants) in order to help move or transport the elastomeric emitter through system 100 and, specifically, conveyor bridge 128 and escapement 130. A vibratory drive could also be used (either in addition to or in lieu of the lubricant) to vibrate the escapement 130 and emitters disposed therein to at least partially levitate or lift the emitter and reduce the friction between the emitter and the escapement 130.

Turning back to FIGS. 1A-3B and 6, the escapement 130 is preferably moveably between first and second positions like conveyor 120 (e.g., moveable between a first position wherein the guide bar is inserted and/or engaged with the extruder 160 and a second position wherein the guide bar is removed or extracted from the extruder 160). In the form illustrated, the escapement 130 is connected to work surface 112 via base 136 and slides 138 which are connected to rails 114 on work surface 112. Thus, the rails 114 and slides 138 allow the escapement 130 to be moved back and forth between the first and second positions along with conveyor 120.

In the form illustrated, the escapement 130 further includes shock absorbers 135, 137 and a locking mechanism 139 for locking the escapement 130 in either the first or second position. The shock absorbers 135, 137 are used to slow the base 136 of escapement 130 as it moves toward a limit of travel so that no jarring takes place. This is particularly important when moving the escapement into the first position so that the guide bar 140 enters the extruder 160 carefully and smoothly. In the form illustrated, the lock 139 is in the form of a clasp or cam toggle clamp type fastener and is capable of locking the escapement 130 into at least the first position. This helps ensure that the escapement 130 and guide bar 140 do not move once the guide bar 140 is inserted into the extruder 160. In alternate forms, the lock 139 may be configured to lock the escapement 130 into both the first and second positions if desired.

As illustrated in FIGS. 1A-3B and 6, the apparatus 100 further includes inserter or guide bar assembly 140. In a preferred form, the guide bar 140 includes an emitter channel 142 surrounded by a lower shell or shield 144 and an upper shell or shield 146. In a preferred form, the lower and upper shells are made of a polymer such as a thermoplastic Polyether ether ketone (PEEK) material and are used to shield the emitters traveling through the emitter channel 142 from the excessive heat that is given off by the extruder 160 as the emitters pass through the portion of the guide bar 140 disposed within the extruder head 162. The shields 144, 146 are made of a length sufficient to cover all emitters that pass through or are positioned near the extruder 160. However, in a preferred form and as illustrated in FIGS. 2A-B, the shields 144, 146 are made even longer than necessary so that there is more shield surface area to dissipate heat over making the shields operate much like heat sinks for guide bar assembly 140.

In a preferred form, the guide bar 140 also includes a brake or brake mechanism 148 positioned downstream from the extruder 160, adjacent or proximate to the bonding mechanism 150. The brake 148 prevents emitters from moving into the bonding mechanism 150 until driven into the bonding mechanism for connection to the extruded tube via the escapement drive mechanism 132. Thus, the brake 148 works in conjunction with the escapement 130 to space the emitters at predetermined or desired intervals within the extruded tube to form drip line 190 having emitters placed at regularly spaced intervals and prevents more than one emitter from being released at a time for bonding with tubing 190.

Figure 8:
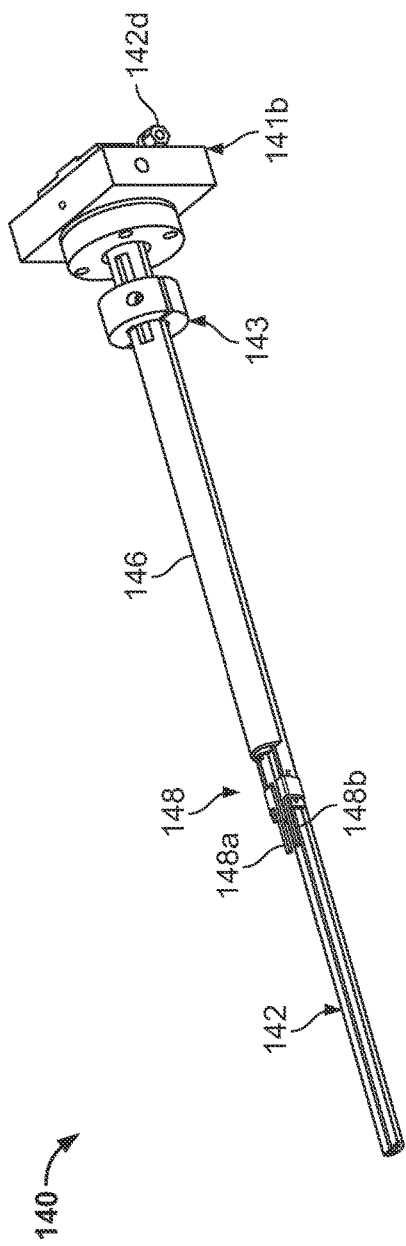
FIG. 8 is a perspective view of the guide bar of FIGS. 1A-G illustrating a brake or brake mechanism that may be used to assist in controlling movement of emitters through the insertion tooling and, specifically, the guide bar.
Figure 9:
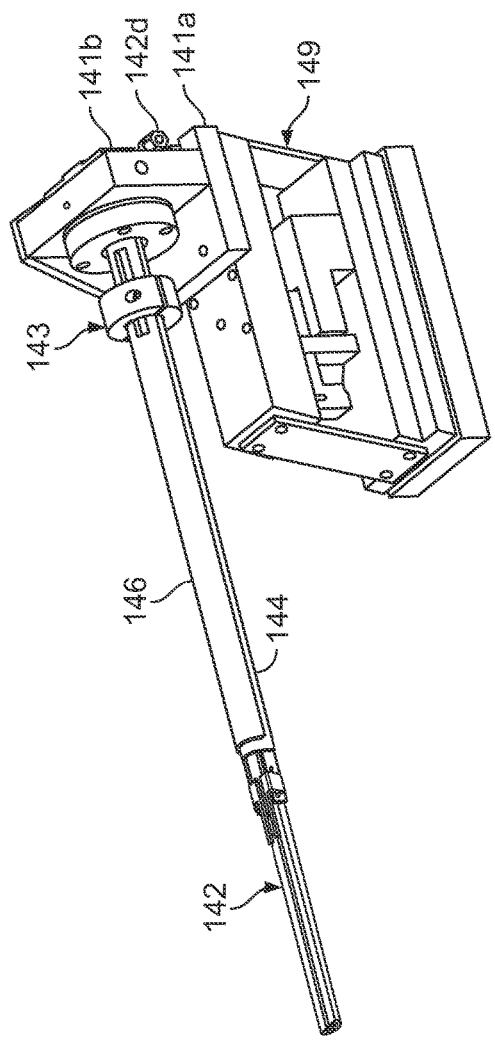
FIG. 9 is a perspective view of the guide bar of FIGS. 1A-G connected to a vibratory drive assembly to assist with transporting elastomeric emitters through the guide bar and inserting same into drip line tubing.

As best illustrated in FIGS. 8 and 9, brake 148 comprises a generally U-shaped or C-shaped bracket that extends about the emitter channel 142 and has two spring levers 148a, 148b that extend out over the emitter channel 142 that engage any emitter present in the emitter channel below at least a portion of the spring levers 148a, 148b to prevent the emitter from moving further downstream in the emitter channel 142 unless driven further downstream in the emitter channel 142 via the escapement drive mechanism 132. More particularly, when the guide bar 140 is loaded with emitters stacked end-to-end along the emitter channel 142, advancement of another emitter via the escapement drive mechanism 132 causes the emitter positioned within the brake mechanism 148 to be driven further downstream and out of engagement with the brake mechanism 148. This action causes the brake levers 148a, 148b to deflect upwards to allow the emitter to move downstream and then return toward their normally biased position to brake or stop the next emitter in the emitter channel 142 from going further downstream in the emitter channel 142 until driven by escapement 130. The clip or bracket of brake mechanism 148 in FIGS. 8 and 9 wraps around the bottom and sides of the emitter channel 142 in a curved pattern and extends partially over the top surfaces of the emitter channel 142 in the form of flat ends. The levers 148a, 148b extend from these flat end members and out over at least a portion of the emitter that is to be held by brake mechanism 148. A protrusion, such as a bend or notch, may be formed in a portion of the levers 148a, 148b to extend the levers 148a, 148b toward the emitter if further frictional engagement is desired between the brake levers 148a, 148b and the emitter to be held by brake mechanism 148. In the form illustrated, the outer surface of the emitter channel 142 defines a recess or notched channel within which the brake mechanism 148 is to be disposed in order to assist with positioning or alignment of the brake mechanism 148 on the guide bar 140.

Although a clip with spring steel levers 148a, 148b is shown as the brake mechanism 148, it should be appreciated that any other brake structure capable of retaining emitters in emitter channel 142 may be used. For example, a ball and detent mechanism may be used that provides enough friction to hold an emitter proximate to the brake mechanism 148 until the escapement 130 drives the emitter further downstream and moves another emitter into engagement with the brake mechanism 148. In other embodiments, another form of friction fitting may be used between the emitter and the emitter channel 142 or brake mechanism 148, such as ribs, textured surfaces, etc.

Turning back to FIGS. 8 and 9, the guide bar 140 preferably includes a fastener, such as clamp 143, which is used to secure at least one of the lower and upper shields 144, 146 to the emitter channel 142. A base member 141 is also positioned proximate the clamp 143 for securing one end of the guide bar 140 and positioning same adjacent the escapement 130 so that emitters traveling through tooling apparatus 100 move smoothly from the escapement 130 to the guide bar 140. In a preferred form, the emitter channel 142 has the same cross-sectional shape (e.g., T-shape) as the emitter channel defined by escapement 130 and defined by conveyor bridge 128. The base 141 preferably includes a horizontal portion 141a for securing the guide bar 140 to apparatus 100 and a vertical portion 141b which anchors the emitter channel 142 to the horizontal base portion 141a and apparatus 100. In the form shown, the vertical member 141b defines a circular opening through which the emitter channel 142 is disposed and held in alignment with the emitter channel of escapement 130.

To further assist apparatus 100 in transporting elastomeric emitters through the insertion tooling, the guide bar 140 may be coated with a synthetic fluoropolymer of tetrafluoroethylene, such as a polytetrafluoroethylene (PTFE) (e.g., like the DuPont Co. brand TEFLON). In addition or in lieu of the PTFE, the apparatus 100 will preferably be connected to a vibratory drive, such as electric vibrating drive 149, so that the guide bar 140 may be gently vibrated at a high frequency to at least partially levitate or lift the emitters within emitter channel 142 and reduce the amount of friction present between the elastomeric emitters and the emitter channel 142 which, in turn, makes it easier to move the elastomeric emitters through the emitter channel 142 of guide bar 140. In the form illustrated, the horizontal portion 141a of guide bar base 141 is connected to vibratory drive 149 and the vibratory drive 149 is connected to base 136 so that the guide bar assembly 140 remains moveable between the first and second positions along with the escapement 130 and conveyor 120. As mentioned above, in the first position the guide bar 140 is inserted or engaged with the extruder 160 so that emitters can be bonded to extruded tubing via bonding mechanism 150 and is removed or retracted from the extruder 160 in the second position. In a preferred form, the vibratory drive 149 is not operable as the guide bar 140 is moved toward the first position and inserted through the extruder die head 162, however, the vibratory drive 149 would be setup such that even if it were operational during movement of the guide bar 140 toward the first position the vibration induced in the guide bar 140 and specifically the emitter channel 142 would not be sufficient to risk damaging the guide bar 140 on the extruder 160 or vice versa.

In the form illustrated, vibratory drive 149 is similar to the electric vibratory drives used in connection with drum feeder 110. However, it should be understood that in alternate embodiments alternate forms of vibratory drives may be used for any of the vibratory drives disclosed herein (e.g., rotary vibrators, electromagnetic vibrators, piston vibrators, pneumatic vibrators, etc.). Further and as stated above, vibratory drives may be added to any of the components of apparatus 100 (e.g., bowl feeder 110, conveyor 120, escapement 130 and guide bar 140) in order to assist in transporting the elastomeric emitters through the system as desired. Thus, in some forms, only the bowl feeder 110 and guide bar 140 may be equipped with vibratory drives. In other forms, the bowl feeder 110, conveyor 120 and guide bar 140 may be equipped with vibratory drives. In still other forms, only the guide bar 140 or bowl feeder 110 may be equipped with vibratory drives. In addition, various components of the system may be mounted to a common frame that is itself connected to a vibratory drive to induce vibration into the connected components so that more than one vibratory drive is not needed. For example, the bowl feeder 110, conveyor 120, escapement 130 and guide bar 140 could all be mounted to a common frame which is itself connected to a vibratory drive to induce vibration throughout the system 100 if desired. In other forms, other components may be connected to one another and vibrated via a common vibratory drive to reduce the number of vibratory drives necessary for apparatus 100.

In addition to vibratory drives, in a preferred form, guide bar 140 will include a system for cooling the guide bar 140 or emitters disposed therein. FIGS. 10A-B are partial cross-section views of the guide bar 140 of FIGS. 1A-3B, 6 and 8-9, taken along lines 10-10 in FIG. 1C. In this form, the coolant system 142a is built into emitter channel 142 and comprises conduit or piping that is either drilled into or cast into the body of emitter channel 142. A coolant or heat transfer fluid is passed through the conduit 142a in order to cool emitter channel 142 and/or transfer heat away from emitter channel 142 as the guide bar 140 is moved into and held in the first position wherein the guide bar 140 is disposed within extruder 160. In a preferred form, the emitter channel 142 is made of a good thermal conductor so that heat transfer can readily take place throughout the guide bar 140 and within lower and upper shields 144, 146, respectively. Typically the coolant is a liquid or vapor that can readily be circulated into and out of the guide bar assembly 140. In a preferred form, the system 100 will have a temperature controller and temperature sensors, such as thermocouples, that the temperature controller can use to maintain the heat within the shields 144, 146 and/or proximate emitter channel 142 at a desired temperature or temperature range. As temperatures build beyond a desired threshold, the temperature controller can circulate more coolant through coolant system 142a or at a faster pace, and as temperatures lower below a desired threshold, the temperature controller can circulate less coolant through coolant system 142a or at a slower pace.

As best illustrated in FIG. 10B, the conduit of coolant system 142a may be drilled or bored into the emitter channel 142 from the front and sides of the emitter channel 142 and then plugs, such as set screws 142b, may be inserted into the bore openings to seal the conduit 142a and leave only inlet and outlet ports 142c, 142d, respectively, free for fluid connection to the coolant system controlled by the temperature controller. It should be understood that the temperature controller could be configured as its own standalone control unit, or incorporated into the controller used in connection with any of the other components of system 100 (e.g., escapement PLC controller, conveyor controller, drum feeder controller, etc.).

Figure 1E:
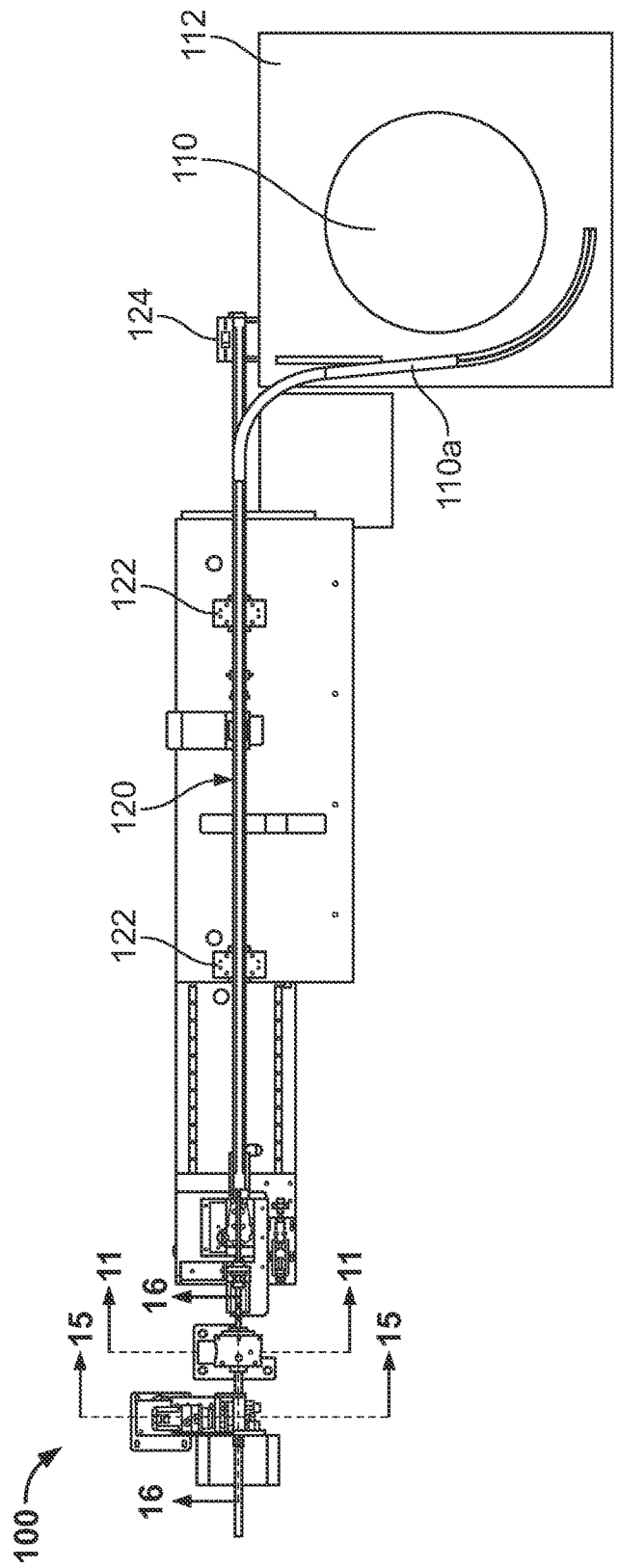
Figure 1F:
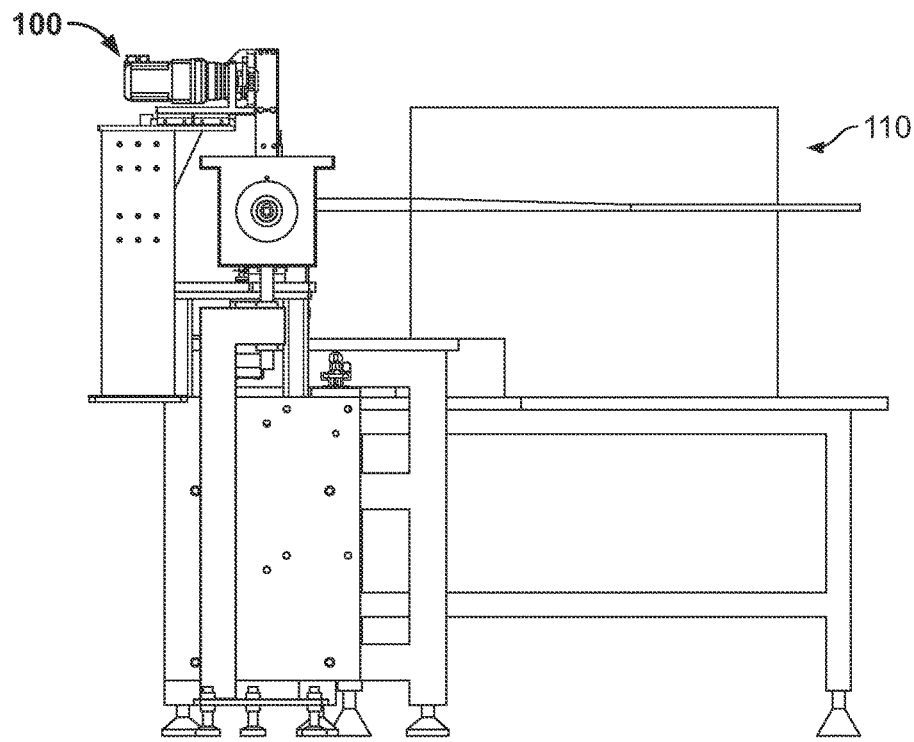
Figure 1G:
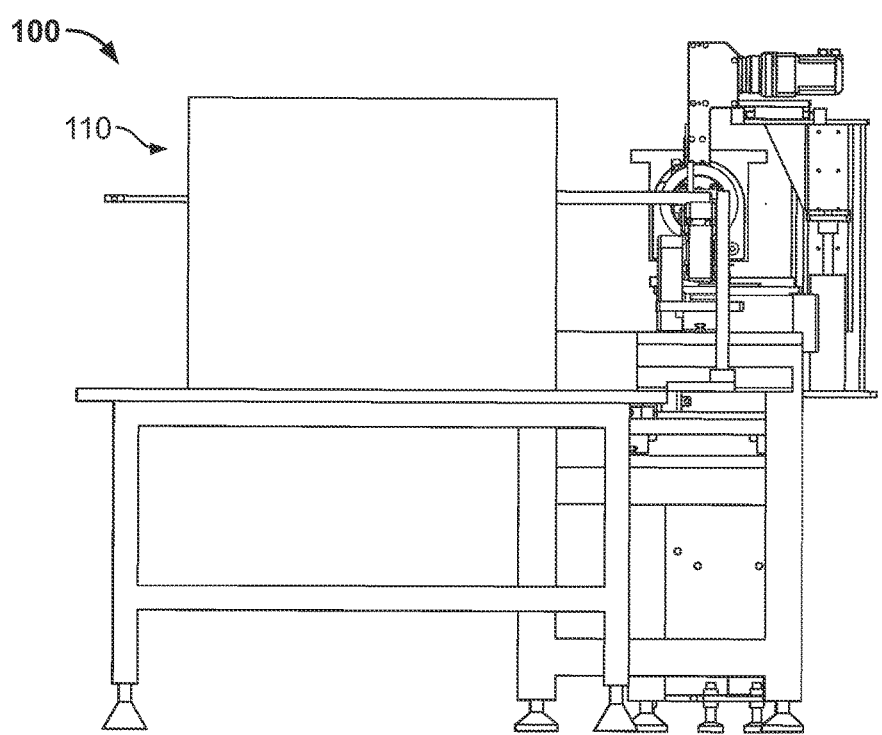
Figure 2A:
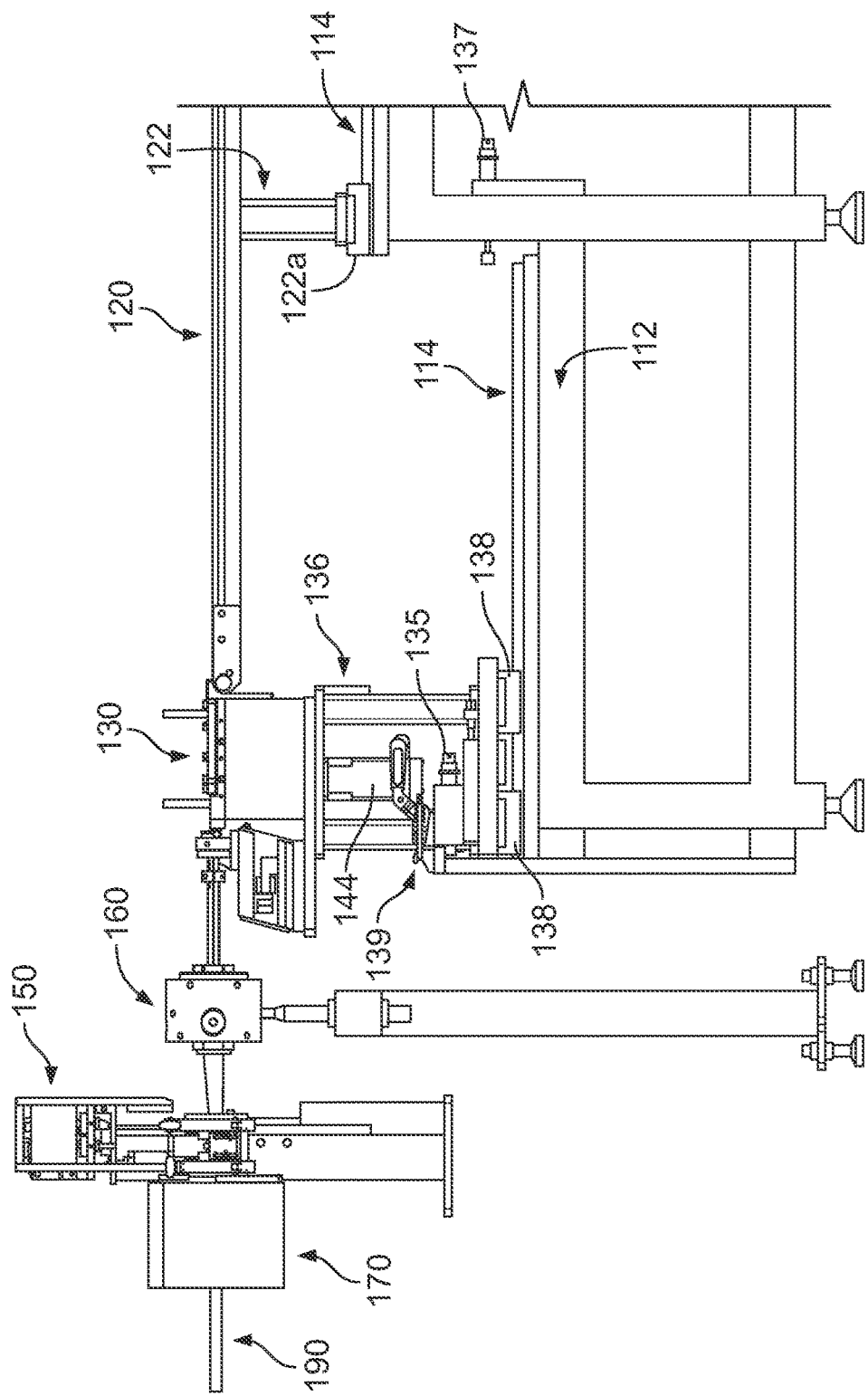
FIGS. 2A-B are partial left side elevation views of the apparatus of FIGS. 1A-G illustrating the emitter insertion tooling engaged with and disengaged or retracted from an extrusion die head, respectively.
Figure 2B:
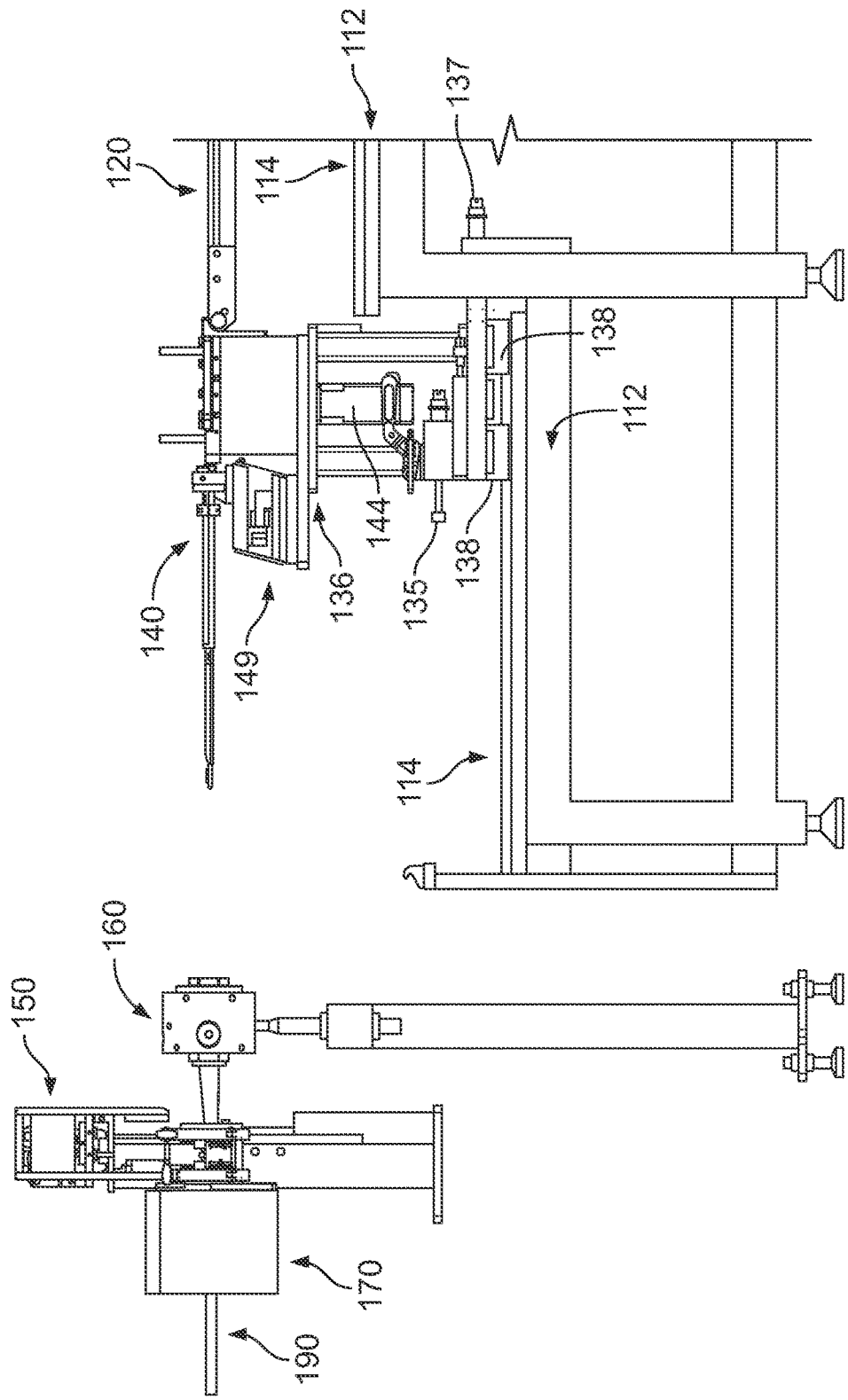
Figure 3A:
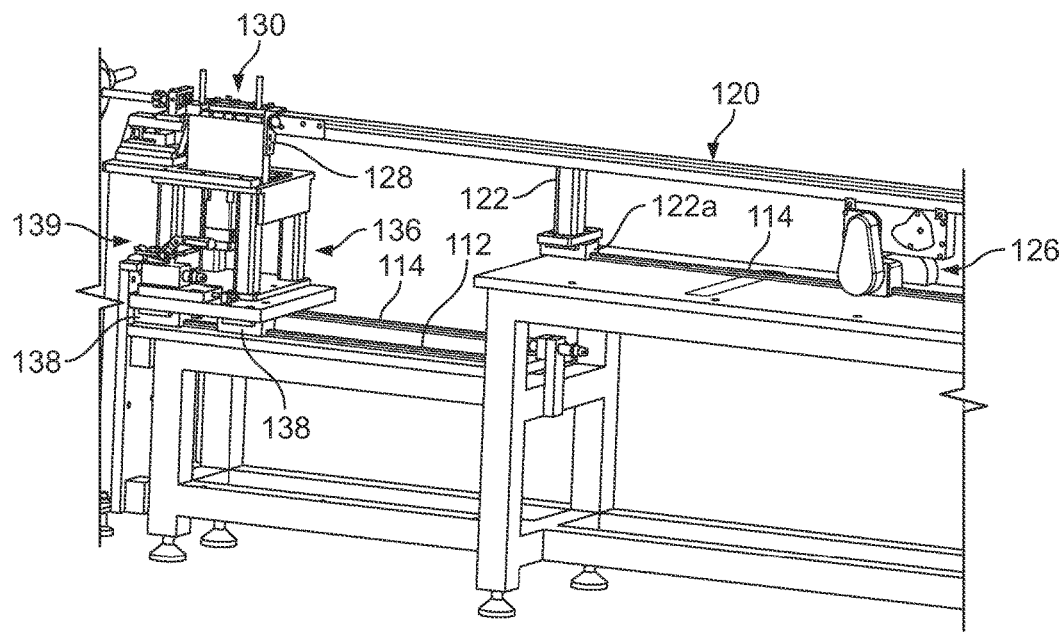
FIGS. 3A-B are partial perspective and side elevation views, respectfully, of the conveyor system of FIGS. 1A-G.
Figure 3B:
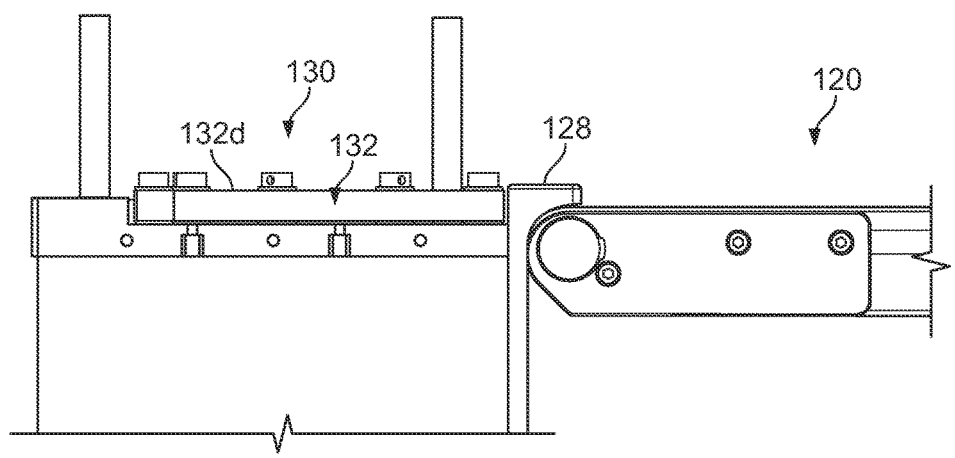
Figure 11:
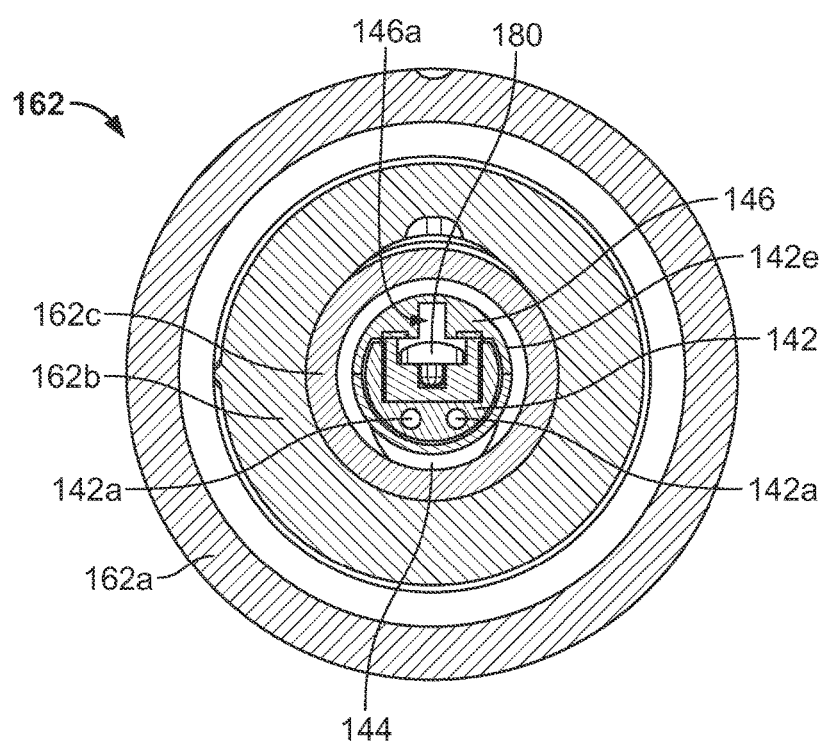
FIG. 11 is a cross section taken along lines 11-11 in FIG. 1E illustrating a guide bar assembly engaged with a extruder die head embodying features of the present invention.
Figure 12:
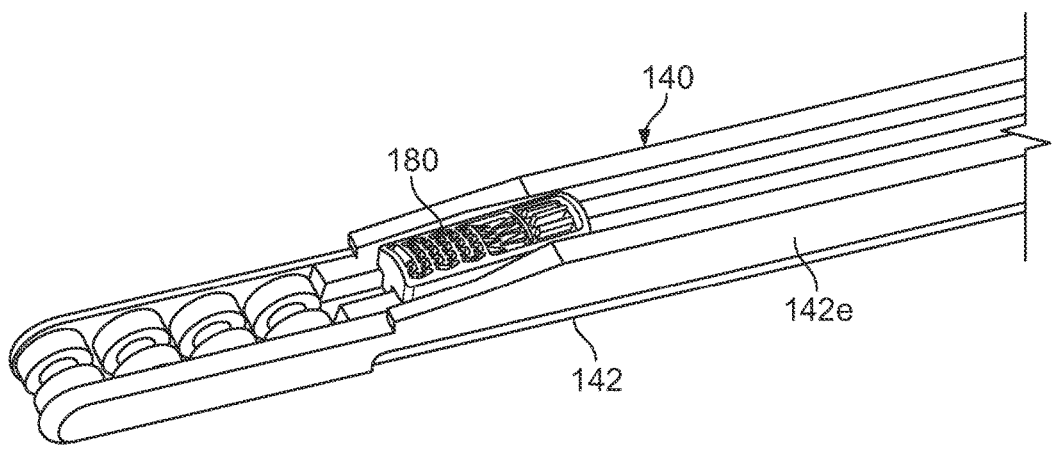
FIG. 12 is a perspective view of the roller tipped guide bar of FIGS. 1A-G.

In FIG. 11, a partial cross-sectional view is illustrated taken along lines 11-11 in FIG. 1E, which is essentially taken through the die head 162 of extruder 160. As this figure illustrates, the die head 162 includes an outer housing 162a, an extrusion element 162b that heats and extrudes the material being extruded, and a mandrel 162c that spaces the extrusion element and extruded material from the guide bar 140 to prevent heat from the die head 162 from damaging the guide bar 140. The mandrel 162c tapers in shape as the extruded material moves down stream to further assist in forming the material into tubing as the material approaches the bonding mechanism 150 (see FIGS. 1A-3B). The lower and upper shields 144, 146 further assist in protecting the emitters 180 in emitter channel 142 from the heat generated by die head 162. Similarly, the coolant system 142a works to protect the emitters 180 in emitter channel 142 from the heat generated by die head 162.

In the form illustrated, the guide bar assembly 140 further includes an insert 142e which is positioned in and makes-up at least a portion of emitter channel 142. In this form, it is the insert 142e that forms the channel for the inlet protrusion of emitter 180. One benefit to using such an insert is that the insertion tooling 100 can be used to transport and manufacture drip line using different types of emitters. Thus, insert 142e may be used in conjunction with tooling 100 to transport elastomeric emitters and manufacture drip line using elastomeric emitters of the type disclosed in U.S. Published Patent Application No. 20130248616, published Sep. 26, 2013, and International Patent Application Publication No. WO2013148672, published Oct. 3, 2013. In other forms, insert 142e may be removed and/or replaced with a different insert in order to manufacture self-contained emitters having housing members such as those disclosed in U.S. Pat. No. 7,648,085, issued Jan. 19, 2010, U.S. Pat. No. 8,302,887, issued Nov. 6, 2012, U.S. Published Patent Application No. 20090266919, published Oct. 29, 2009, and U.S. Published Patent Application No. 20090261183, published Oct. 22, 2009, and U.S. Published Patent Application No. 20100282873, published Nov. 11, 2010, all of which are incorporated herein by reference in their entirety. In each of these embodiments, greater room is needed in the emitter channel 142 due to the fact that additional structures such as housings and/or elastomeric membranes are present. In addition, upper shield 146 defines an upwardly extending recess 146a to accommodate an outlet chimney that is utilized in several of the emitters mentioned above. Thus, by allowing the guide bar 140 to be adjusted in this manner the guide bar 140 and entire system 100 may be utilized to transport and/or insert emitters of different types and/or manufacture drip lines of different types.

It should be understood, however, that in alternate forms, the guide bar 140 may be configured to transport and/or insert only one specific type of emitter if desired, such as elastomeric emitter 180. In such a case, the guide bar assembly 140 could likely be made of smaller diameter and/or other features could be adjusted to cater specifically to the type of emitter being inserted. For example, a single emitter channel could be 142 formed that provides the T-shaped channel of insert 142e and coolant system 142a of emitter channel 142, but all integrated into a single structure and, preferably, one that is smaller in shape. In addition, the recess 146a of upper shield 146 could be eliminated and, if desired, the thickness of shields 144, 146 could be increased in order to provide better thermal shielding of the emitters 180. By reducing the size of guide bar assembly 140, system 100 may be made capable of producing drip lines of smaller diameter (both inner and outer diameter) and/or drip lines with conventional diameters but with smaller, less invasive emitters that cause less turbulence to fluid flowing through the tubing and provide less surface area for debris, such as grit, to build-up on inside the tubing.

Figure 13:
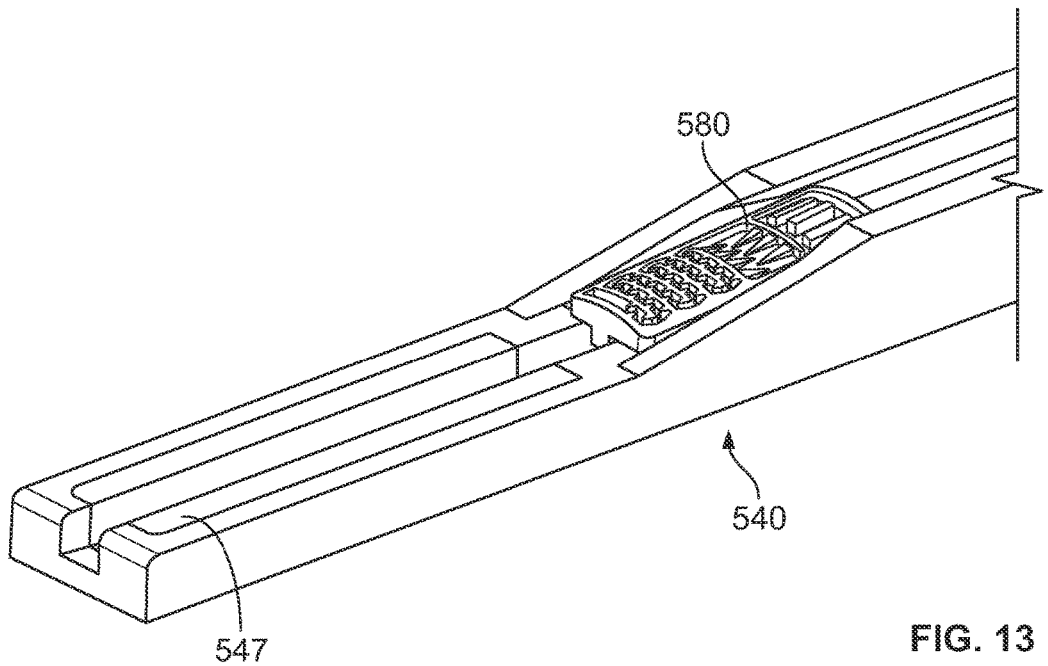
FIG. 13 is a perspective view of an alternate insert tipped guide bar embodying features of the present invention.
Figure 14:
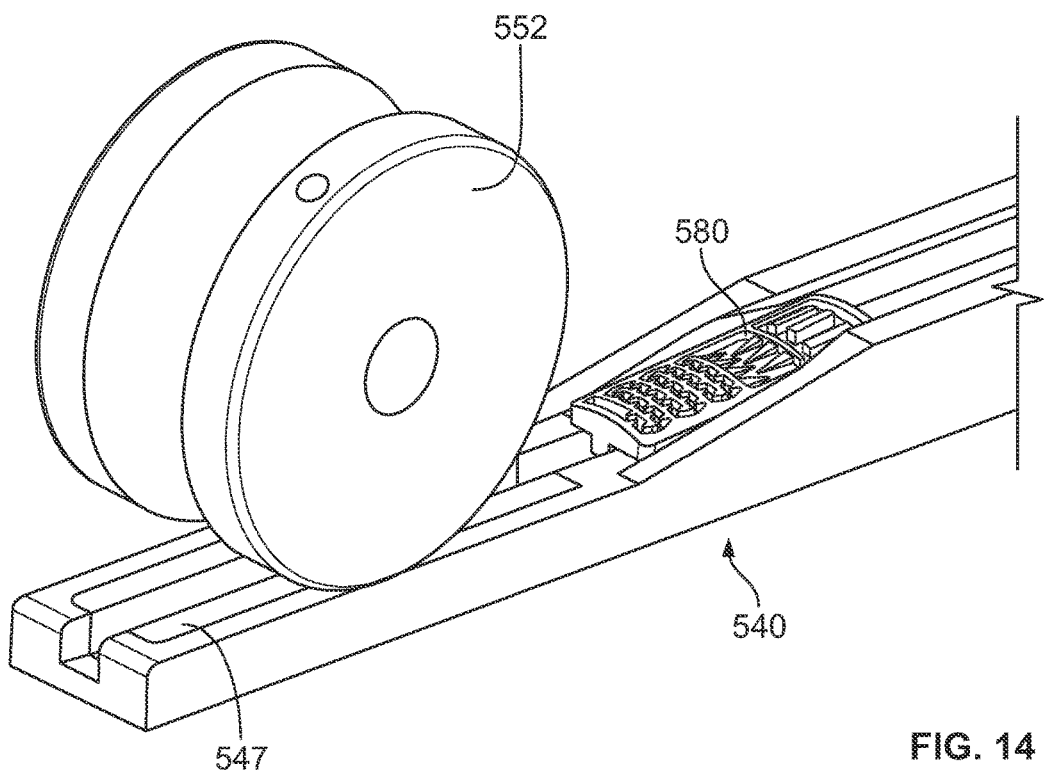
FIG. 14 is a perspective view of a tractor assembly wheel aligned with the insert tipped guide bar of FIG. 13 and embodying features of the present invention.

In FIGS. 1A-3B, 6, 8-9 and 12, the apparatus 100 is illustrated with a guide bar 140 having a roller tip assembly 145. The rollers 145 allow the emitter 180 to smoothly move out from the brake mechanism 148 and to pass into position under the tractor wheel 152 of bonding mechanism 150 without pinching or causing the emitter 180 to crease which could negatively affect the system's ability to form a solid bond between the upper surface of the emitter 180 and the inner surface of the extruded tube. In alternate embodiments, however, other forms of tips may be used for guide bar assembly 140. For example, in FIGS. 13 and 14 and alternate guide bar tip is illustrated. In keeping with the above-practice, items that are similar in this embodiment will use similar latter two-digit reference numerals, but include the prefix "5". In the form illustrated, the guide bar assembly 540 includes a synthetic fluoropolymer insert of tetrafluoroethylene, such as a polytetrafluoroethylene (PTFE) like the DuPont Co. brand TEFLON. The PTFE insert 547 allows the emitter 580 to smoothly move out from the brake mechanism of the guide bar assembly 540 and to pass into position under tractor wheel 552 of the bonding mechanism. The PTFE coating reduces friction between the emitter 580 and the guide bar assembly 540. To further reduce friction between the emitter 580 and the guide bar assembly 540, an additional lubricant may be added to the insert 547, such as mineral oil. The oil will enhance the sliding of the emitter 580 on the guide bar 540 and, specifically, along the emitter channel and insert 547 of guide bar 540.

Figure 15:
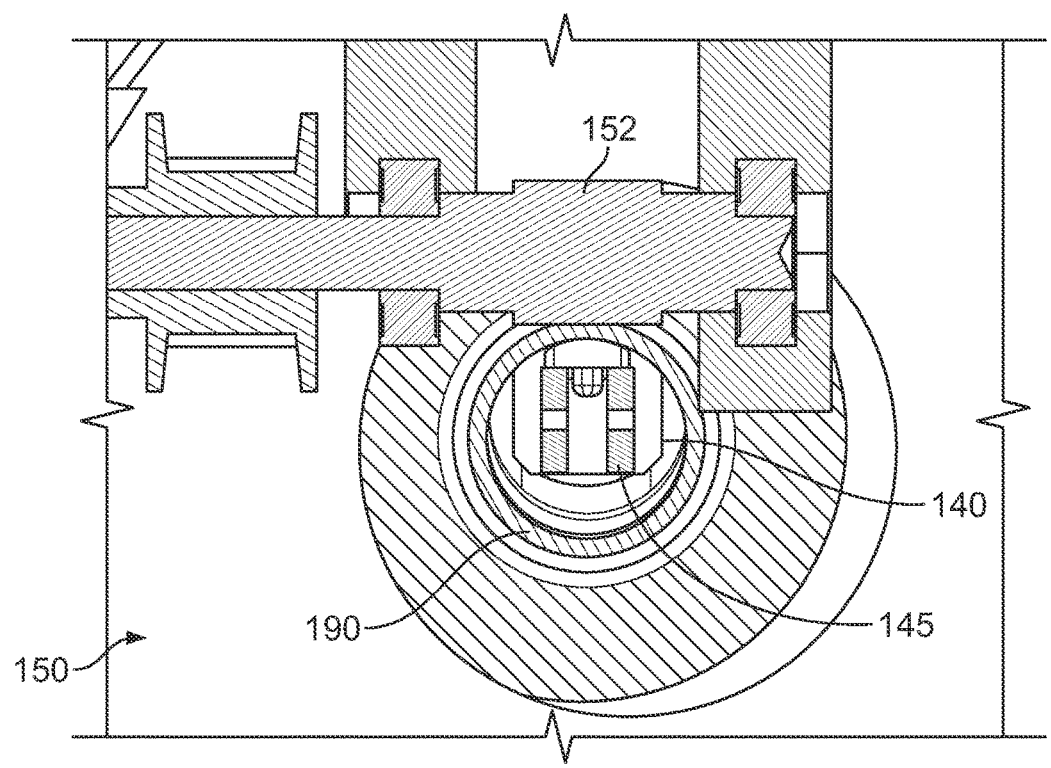
FIG. 15 is a cross section taken along lines 15-15 in FIG. 1E illustrating the tractor assembly wheel aligned with the roller tipped guide bar of FIGS. 1A-G and showing how the radius of contour does not extend beyond the width of the emitter to eliminate lines from being formed by outside edges of the tractor wheel on the exterior of the extruded tube surface.

Turning back to the embodiments of FIGS. 1A-3B, 6, 8-12, the apparatus 100 further includes a bonding mechanism 150 for bonding the emitters 180 to the extruded tubing to form drip line 190. FIG. 15 illustrates a partial cross-sectional view of the bonding mechanism 150 taken along lines 15-15 in FIG. 1E. As illustrated in this figure, the bonding mechanism 150 utilizes tractor wheel 152 to compress the exterior of the freshly extruded tube over the emitter 180 to bond emitter 180 to the inside of tube 190. In a preferred form, the tractor wheel 152 is made of hardened steel and contoured to the shape of the tube so that pressure is applied evenly over the surface of the tube 190 and constant pressure is provided on the tube 190 and emitter 180 to ensure the upper surface of emitter 180 is bonded fully to the inside surface of tube 190. The radius of contour of the tractor wheel 152 does not extend beyond the width of the emitter 180 to reduce the risk lines will be formed in the tubing by outside edges of the tractor wheel 152 on the exterior surfaces of the extruded tube surface.

Figure 16A:
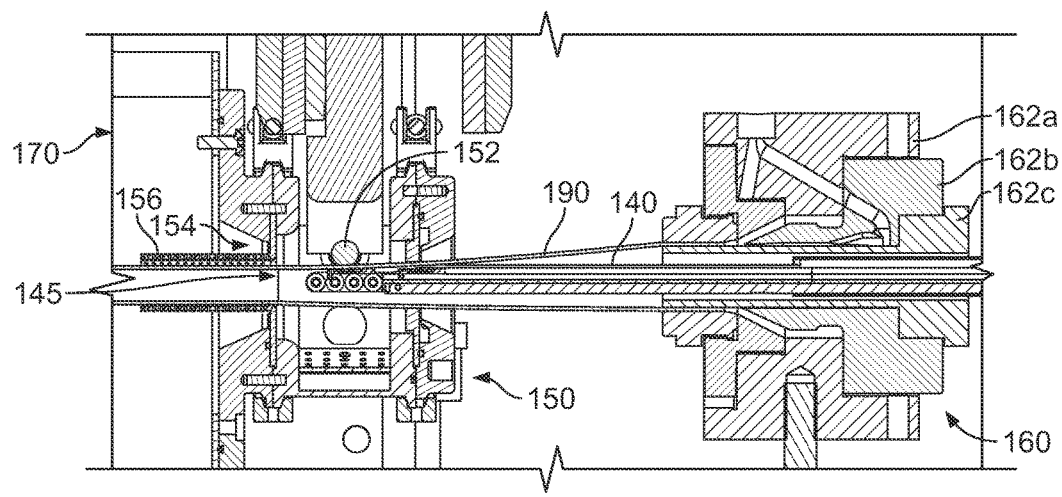
FIGS. 16A-B are cross-sections taken along line 16-16 in FIG. 1E illustrating, respectively, the insertion tooling when it is in the first position wherein the insertion tooling is engaged with an extruder and the second position wherein the insertion tooling is removed or retracted from the extruder emitter.

FIG. 16A illustrates another partial cross-sectional view of the bonding mechanism 150 bonding the emitter 180 to tubing 190 and is taken along lines 16-16 in FIG. 1E. In this illustration, the tractor wheel 152 can be seen bonding the emitter positioned on the roller tip 145 to tubing 190 and a second emitter can be seen positioned within the brake mechanism 148 of guide bar assembly 140. Although not shown, the guide bar assembly 140 would be filled with emitters behind the emitter held in brake mechanism 148. The emitters would extend end-to-end all the way back through the escapement drive mechanism 130 so that as the escapement 130 drives another emitter forward or downstream, the next emitter will be moved from the brake mechanism 148 and onto roller tip 145 to be bonded to the extruded tubing via tractor wheel 152. In a preferred form, the bonding mechanism 150 will further define an aquarium chamber or portion 154 and calibrator 156 that the freshly bonded tube 190 and emitter 180 travel through. The bonded tube and emitter 190 is immersed in fluid, such as water, in aquarium 154 to start cooling and the calibrator 156 is used to continue to form and/or size the extruded tubing into the desired tubing shape and size. The calibrator 156 preferably includes a plurality of openings therein in order to allow fluid to continue to contact the extruded tubing as it travels through the calibrator 156. From there the drip line 190 travels into a vacuum water tank 170 followed by a water cooling tank and then is run through a high speed perforator to make an emitter outlet opening in the finished drip line 190 and wound into spools of desired length. The vacuum water tank 170 allows the drip line 190 to cool and maintain the desired round tubing shape without flatting under the forces of gravity and once the drip line has cooled to a sufficient temperature where exposure to the forces of gravity will not affect the shape of the drip line 190, the tubing travels from the vacuum water tank 170 to the open-air water tank and then on to the spooling machine.

Figure 16B:
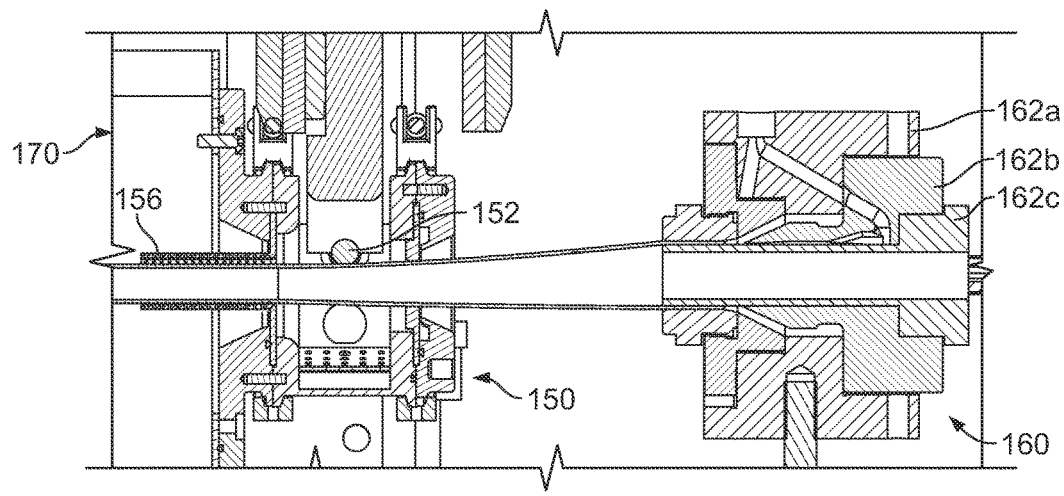

As mentioned above, the insertion tooling 100 can be removed from the extruder 160 (see FIG. 16B) so that tubing without emitters can be extruded from extruder 160 and run through tractor wheel assembly 150, vacuum water tank and water cooling tank 170 and wound via spooling machine. This allows for the same line to be used to run or manufacture drip line and regular tubing without emitters, which saves shop floor space and improves shop usage (e.g., ability to run second and third shifts), thereby making for a more efficient manufacturing setup and process. As also mentioned above, the guide bar assembly 140 may be configured to allow for setup and use with multiple types of emitters or different emitters so the same line can be used to manufacture multiple types of drip line as well as regular tubing (or non-drip/emitter tubing). This too saves shop floor space and improves shop usage and efficiency.

In addition to the above, method of transporting elastomeric emitters along tooling are disclosed herein. For example, in one form such a method comprises providing a first conveyor of a first type for transporting elastomeric emitters along tooling and a second conveyor of a second type, different than the first type of conveyor, for further transporting the elastomeric emitters along the tooling, and moving the elastomeric emitters from the first conveyor to the second conveyor to transport the elastomeric emitters further along the tooling. In other forms, the method includes providing a vibratory drive mechanism connected to at least one of the first and second conveyors, and vibrating the at least one of the first and second conveyors, to reduce friction between the elastomeric emitters and the tooling and urge movement of the emitters along the tooling in a predetermined direction. In still other forms, the first conveyor may be a belt conveyor having a motor driven belt and the second conveyor may be a roller conveyor with a vibratory drive mechanism connected to the roller conveyor, and the method further includes driving the emitters along the belt conveyor and into the second conveyor via the motor driven belt, and rolling the emitters along the roller conveyor via the vibratory drive mechanism to align the emitters with an emitter drive mechanism.

In some forms, the apparatus 100 may also include an inserter for inserting a root growth inhibiting member, such as a copper insert, proximate to the outlet bath of the emitter 180 to reduce the risk of roots growing into the outlet of the emitter 180. In a preferred form, the copper insert will correspond in size and shape to the size and shape of outlet bath of emitter 180 and is, preferably, connected to the floor of the outlet bath so that it cannot shift and block flow of fluid through the emitter 180 and out of the emitter outlet. In one form, the copper insert is formed as a plate that is fixed to the bottom of the emitter outlet bath via an adhesive (e.g., glue, epoxy, resin, cement, etc.). In the form illustrated, the copper insert 846 has a generally rectangular shape that corresponds to the shape of the emitter outlet bath and defines a plurality of openings that correspond in location to the protrusions extending up from the floor of outlet bath which prevent the outlet from collapsing under increased fluid pressure within the drip line 190. In a preferred form, the plurality of openings defined by the copper insert are sized so that the protrusions easily fit within the insert openings and the copper insert can be placed directly against the floor of the outlet bath of emitter 180.

It should be understood, however, that in alternate embodiments, the copper insert may take a variety of different shapes and sizes and may be connected or affixed to the emitter 180 in a variety of different ways. For example, with respect to size and shape, in alternate forms, the copper insert may be shaped to fit in only a portion of the outlet bath of emitter 180 (e.g., filling only a portion of the outlet bath rather than the entire floor of the outlet bath) and, thus, have a shape that does not correspond to the shape of the outlet bath of emitter 180. Thus, the copper insert may be made round, rectangular or triangular (or of any other polygonal) shape, non-polygonal in shape, and may be symmetrical or asymmetrical in shape. For example, the copper insert could be provided in a rectangular shape that defines a single opening to allow the insert to be positioned on a single protrusion extending up from the emitter outlet bath, or it may define a plurality of openings that allow the insert to be positioned on a single row of protrusions extending up from the outlet bath, two rows of protrusions, etc.

With respect to connection to the emitter 180, the copper insert may alternatively be affixed to the emitter 180 by way of another form of fastener besides adhesive, such as friction fit, tongue-and-groove (or mortise and tenon), screw, bolt, rivet, staple, hot weld, heat stake, pin, or other mating or interlocking structures, etc. For example, in one form, the openings defined by copper insert may be sized so that they create a friction or press fit engagement with the protrusions extending up from the outlet bath of the emitter 180. In yet another form, the protrusions may be shaped with a section of reduced diameter near the floor of the outlet bath so that the insert is pressed down over the protrusion until positioned within the reduced diameter section and held in place due to the adjacent protrusion portion being slightly larger in diameter than the opening defined by the insert to prevent the inset from lifting up from the floor of the outlet bath of emitter 180. In still other forms, it may be desired to position the copper insert up off of the floor of the outlet bath so that fluid flows over or along at least two sides of the insert. Thus, in one form, the openings defined by the copper insert may be sized so that insert cannot be positioned directly in contact with the floor of the outlet bath. In other forms, the protrusions may have a reduced diameter section positioned somewhere between the floor of the outlet bath and the distal end of the protrusions to capture the insert somewhere there between and spaced from both the floor and distal end. In embodiments where walls are used in place of posts for the outlet protrusions, the walls may define a notch, detent, groove or channel within which the copper insert is positioned and maintained. Alternatively, the walls may define one or more, or even a continuous, rib or shoulder or set of ribs and shoulders within which the copper insert is positioned and maintained. In still other forms, the insert may not be fastened or affixed to the emitter and may simply rest in the outlet bath.

In other forms, the root inhibitor member may be positioned in other locations about the emitter 180 either in addition to the outlet bath or in lieu of the outlet bath. For example, in some forms, the insert may extend into the flow passage and/or the inlet of emitter 180. In other forms, the root growth inhibitor member will form a sleeve punched through the tubing to form a sleeve lining the outlet opening of the emitter 180 through which fluid flows, (e.g., such as a rivet or collar inserted through the tubing at the outlet bath of the emitter). In still other forms, the root growth inhibitor may be positioned on top of the outer surface of tube 190 near the outlet opening of the emitter.

In a preferred form, the root growth inhibitor member will be installed into the emitter outlet after the elastomeric emitter is molded and prior to the emitter being deposited into a dispensing container, such as vibratory bowl feeder 110, along with other emitters for insertion using tooling 100. In this preferred form, the root growth inhibitor is a copper insert or deposit that is connected to the emitter outlet via an adhesive or friction fit/press process.

It should also be appreciated that any of the above-mentioned features with respect to each embodiment may be combined with one another to form alternate embodiments of the invention disclosed herein. For example, the root growth inhibiting member inserter may be used with a system 100 utilizing an air conveyor 120, or with a system using a slotted conveyor belt 220, or with a system using a conventional conveyor 320. In other examples, the system 100 may be setup having channels of T-shaped cross-section throughout to accommodate elastomeric emitters with inlet protrusions. Conversely, the system 100 may be setup with U-shaped channels throughout to accommodate elastomeric emitters without inlet protrusions. In some forms, system 100 may be equipped with a belt driven escapement 130 and in other forms the system may be equipped with a star gear drive mechanism for escapement 430.

In addition to the above embodiments, it should be understood that various methods have also been disclosed herein. For example, methods of transporting and inserting elastomeric emitters, methods of assembling and manufacturing drip lines with elastomeric emitters and methods for compensating for increased friction between insertion tooling and elastomeric emitters are disclosed herein. In one form, methods for transporting and/or inserting elastomeric emitters are disclosed comprising providing a feeder, a conveyor, an escapement and a guide bar assembly and vibrating at least one of the conveyor, escapement and guide bar to reduce friction between the elastomeric emitter and the insertion tooling. In another form, a method of inserting an elastomeric emitter comprising providing an insertion mechanism, disposing the insertion mechanism within an extruder and vibrating the insertion mechanism to reduce friction between the elastomeric emitter and the insertion mechanism. In still other forms, methods of assembling and/or manufacturing drip line are disclosed comprising providing an insertion mechanism, an extruder, and a bonding mechanism, and vibrating the insertion mechanism to transport the elastomeric emitter to the bonding mechanism as the extruder extrudes tubing and bonding the emitter to the extruded tube via the bonding mechanism. In other forms, methods of compensating for increased friction between insertion tooling and elastomeric emitters are disclosed comprising providing insertion tooling and an elastomeric emitter and vibrating the elastomeric emitter through at least a portion of the insertion tooling to place the elastomeric emitter in position for bonding to extruded tubing. In still other forms, methods of making a plurality of different drip lines using a plurality of different emitters including an elastomeric emitter are disclosed comprising providing an adjustable insertion tool, adjusting the insertion tooling corresponding to a first emitter to be inserted via same and using the insertion tooling to insert a first emitter into drip line extruded from an extruder and bonding the emitter to the drip line to form a first type of drip line, adjusting the insertion tooling to insert a second emitter, different from the first, to be inserted via the insertion tooling, using the insertion tooling to insert the second emitter into drip line, and bonding the second emitter to the drip line to form a second type of drip line off of the same insertion tooling line used to form the first type of drip line.

In addition to the above embodiments and methods it should be understood that these embodiments and methods may be used to produce emitters and drip lines that allow fluid to flow at different rates for different applications. For example, smaller or larger flow channel cross-sections may be provided, longer and shorter flow channels may be used, materials with different Durometer readings may be used, etc. In order to distinguish these product lines, color may also be added to the embodiments and methods of manufacturing same to distinguish one product line from another. For example, one color may be used to identify an emitter or drip line that drips at a rate of one gallon per hour (1 GPH), another color may be used to identify an emitter or drip line that drips at a rate of two gallons per hour (2 GPH), another color may be used to identify an emitter or drip line that drips at four gallons per hour (4 GPH). In addition some colors may be used to signify the source of water for a particular application. For example, the color purple is often used to indicate that reclaimed or recycled water is being used. If desired, any of the above embodiments and methods could include the addition of color for such purposes. In addition, the insertion tooling may be used to make drip lines with different spacing between emitters.

Figure 18:
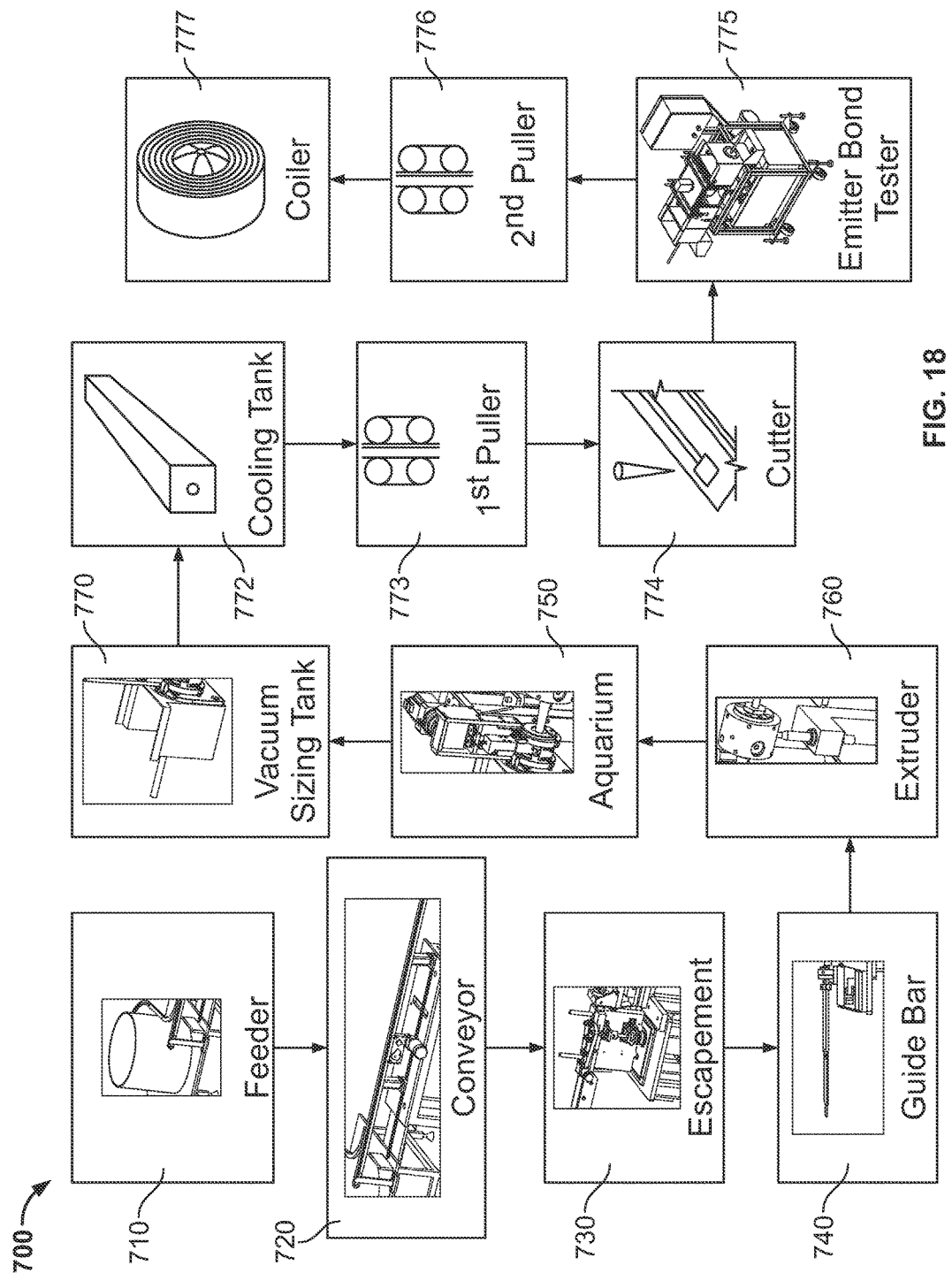
FIG. 18 is a block diagram illustrating an exemplary manufacturing process in accordance with the invention in which the bond between emitters and the surrounding tubing can be checked to ensure proper performance of the emitters and drip line.

In addition to the above embodiments and methods, new methods and apparatus are provided herein for checking emitter bonds in an irrigation drip line, and for manufacturing drip line in a manner that allows the bond between the in-line emitter and surrounding tubing to be checked. For example, an exemplary production line or system for manufacturing such drip line is illustrated in FIG. 18. In keeping with the above practices, those items that are similar to items discussed in prior embodiments will be identified using the same latter two-digit reference numeral but with the edition of the prefix "7" to distinguish this embodiment from others. Thus, the system illustrated in FIG. 18 is identified generally by reference numeral 700.

In a preferred form, system 700 includes a feeder or dispenser 710 connected to a conveyor 720 which delivers the emitters from the feeder 710 to an emitter drive mechanism, such as escapement 730. The escapement 730 aligns and guides emitters passing through the insertion tooling system 700 into inserter or guide bar 740 for delivery to the extruder 760 and the conduit extruded by extruder 760. In a manner similar to that discussed above with prior embodiments, the emitter is bound to the conduit and the conduit calibrated via aquarium assembly 750. From there, the conduit is passed through a first vacuum sizing tank 770 that is used to cool and size the conduit before continuing to cool the conduit in a cooling tank or bath 772. The extruded conduit is moved through the aquarium 750 and tanks 770, 772 via a motive mechanism, such as driver or puller 773 positioned downstream of the cooling tank 772. The puller 773 engages the conduit after it has been sized and formed so that the action on the conduit will not alter the size or shape of the conduit.

In the exemplary form illustrated, the conduit is then fed through a cutter, such as an abrader or puncturing tool 774, in order to create outlet openings in the conduit proximate to the outlet baths of the individual emitters bonded within the conduit thereby forming finished drip line. It should be understood that the perforator or cutter 774 may be any number of perforating or cutting devices, such as a punch or puncture tool, a saw or blade type cutter, a laser cutter, a drill, etc. Unlike prior embodiments, however, and unlike conventional drip line manufacturing systems, system 700 further includes an emitter bond tester 775 that checks the bond created between the emitter and the surrounding conduit to ensure that the emitter will operate as desired. In a preferred form, a second motive mechanism, such as second drive or puller 776, is used to pull the conduit through the emitter bond tester 775. In addition, an automatic reel mechanism 777 is included for coiling the conduit coming from the emitter bond tester 775 into coils of drip line that can be removed and shipped after a predetermined length of conduit has been coiled about a roll.

It should be understood, however, that one or more of these items may be removed from the line if desired. For example, in producing drip line with discrete emitters bonded to the inner surface of an extruded tube at regular intervals, it may be desirable to include all stages or steps illustrated in FIG. 18. However, in alternate forms, such drip line may be produced using fewer stages or steps or even alternate stages or steps. For example, in some alternate embodiments, a different inserter or guide bar 740 may be used. In other forms, only one puller 773 or 776 may be utilized and may be positioned forward of the coiler or realer 777, rather than having another or a second puller positioned earlier or upstream in the manufacturing product line or further back or downstream in the manufacturing product line or process. For example, in one form a system may utilize a puller such as puller 773 and rely on the coiler 777 (which may be a combination puller/coiler) to assist in collecting the finished product. In another form, the sole puller may be positioned far downstream of the process such as puller 776. Notwithstanding the fact the system or process may be setup in a variety of different ways, in a preferred form, the tester 775 will be positioned somewhere downstream of or on the latter half of the system or manufacturing product line behind the cutter or outlet opening maker/installer 774 so that the tester 775 can test the dripline tubing itself and/or the bond between the drip line and the emitters.

While the illustrated examples illustrate the system being used to manufacture and/or test drip line with discrete emitters bonded at regular intervals to only a non-circular portion of the extruded tubing (e.g., open face emitters, etc.), it should be understood that the tester 775 may be used in connection with a variety of different drip line manufacturing systems or product manufacturing lines that use any type of emitter. For example, in one form, the tester 775 may be used with a system or process setup to manufacture drip tape or driplines that have a continuous strip of tape applied thereto that forms emitters at regular intervals of the tubing. In such forms, the system or process may be setup similar to that of FIG. 18, or it may be configured with more or less stages, steps or equipment in the product manufacturing line. For example, in one form, a drip tape system or process may be configured to leave off a feeder 710, conveyor 720, escapement 730 or guide bar 740 and possibly even the vacuum or sizing tank 770, but instead include an installer, extruder 760, aquarium 750, cooling tank 772, cutter 774, tester 775, puller and/or coiler, or a puller/coiler (not necessarily in that order). Again, one or more pullers may be utilized in such a system. One common form of drip tape system or process starts with a flat section of film that the continuous tape containing emitters is bonded to and then the film is wrapped over itself or the continuous tape to form tubing. In yet other form of drip tape systems or processes, the system or process starts with a film that then has flow passages pressed, stamped or embossed into or on a surface of same and then the film is wrapped to enclose the flow passages and form emitters spaced at regular intervals (thus no separate continuous tape is added, but rather is formed into a surface of the tubing). In these forms, the product manufacturing line does not need all of the equipment illustrated in FIG. 18 and the emitter bond tester 775 may be positioned anywhere in the product manufacturing line, but preferably will be located between the cuter 774 and reeler or coiler 776.

In another example, the tester 775 may be used in a systems setup to manufacture drip line with conventional cylindrical emitters inserted at regular intervals therein which could be setup similar to the system or process of FIG. 18, but with fewer or more stages, steps or equipment in the manufacturing process. For example, such systems, could be setup similar to what is depicted in FIG. 18, but use different feeders, conveyors, escapements and guide bars or inserter mechanisms that are more suited to conventional cylindrical emitters to deliver and insert the cylindrical emitters into extruded tubing. In some forms, such systems will have the remaining components shown in FIG. 18 (e.g., an extruder, first vacuum sizing or cooling tank, second cooling tank, cutter or perforating device, emitter bond tester and puller/coiler). In other forms, a second puller may be used, other components may be combined such as by using a combination puller/coiler or reeler, etc.

Thus, it should be understood that any of the emitter drip line product manufacturing lines mentioned above (e.g., flat or open face emitter lines, cylindrical emitter lines, drip tape lines, etc.) may be equipped with an emitter bond tester as disclosed herein. In addition, any of these product manufacturing lines may be equipped with one or more controllers that control emitter insertion spacing, line speed, maintain fluid levels and constant vacuum pressure in tanks, and that monitor and react when the emitter bond tester detects a poorly bonded emitter/conduit section in the drip line. For example, in some forms the controller may mark the tubing with indicia that the coiler can detect and remove from the coiled drip line. In other forms, a separate piece of equipment may be used to perform this function. In still other forms, the timing or pace of the manufacturing line may be so well maintained that the conduit does not need to be marked to identify the poorly bonded emitter and can simply remove the section with the poorly bonded emitter by tracking the timing it takes to get from the tester to the piece of equipment that is tasked with removing the poorly bonded emitter. In lieu of removing the poorly bonded emitter, the tubing may simply be marked with indicia to indicate a defective emitter bond is present and this marking is used later on to identify the poorly bonded emitter section for removal if desired. In some forms, the product manufacturing line may be setup to remove the section containing the poorly bonded emitter and rejoin the two separated ends between which the poorly bonded emitter section was connected via a connector, such as a barbed fitting or coupler, so that the drip line halves may be rejoined and coiled or reeled into a predetermined length of continuous drip line and sold (e.g., such as coils of drip line of fifty feet (50'), one hundred feet (100'), two hundred fifty feet (250'), three hundred feet (300'), three hundred thirty feet (330'), five hundred feet (500') and one thousand feet (1000')).

In addition, some features may be combined into a single fixture or stage rather than being provided as separate items in the assembly line. For example, in the form illustrated, the vacuum sizing tank 770 and cooling tank 700 are illustrated as two separate tanks. In alternate embodiments, however, the vacuum sizing tank 770 and cooling tank 772 may be configured as a single or common tank that is either entirely run under reduced or negative pressure as compared to the outer ambient pressure. Alternatively, if desired, a common tank may be used for both the vacuum sizing tank 770 and cooling tank 772 but be divided up into these sections to reduce the portion of system that must be run at vacuum or reduced pressures.

As mentioned above, however, in a preferred form and as illustrated in FIG. 18, the vacuum sizing tank 770 and cooling tank 772 are separate fixtures in the manufacturing line. The vacuum sizing tank 770 has an enclosed chamber or vacuum chamber that reduces the pressure within the vacuum chamber below the atmospheric pressure that exists outside the tester 770 (e.g., negative pressure). The cooling tank 700, is preferably open on top and, thus, subjected to ambient pressure.

During operation, the extruded conduit or tubing is pulled through the tanks 770, 772 to form and cool the conduit, respectively, perforated via cutter 774 and then inspected via the emitter bond tester 775 to confirm that the emitters are sufficiently bonded to the conduit 790 in order to allow the emitters and drip line to function properly. An exemplary embodiment of the emitter bond tester 775 is illustrated in FIGS. 19A-H. As illustrated in these drawings, the tester 775 includes a housing 775a defining a vacuum chamber 775b capable of storing fluid within the chamber 775b for submersing the drip line 790 within a fluid medium. The housing 775a defines a first inlet opening 775c and first seal 775d between the tester 775 and conduit 790 passing through the tester 775, and a second outlet opening 775e and second seal 775f between the tester 775 and conduit 790 passing through the tester 775. Water sealed chambers 775g, 775h are positioned on each end of the vacuum chamber 775b in order to allow the center portion of the housing 775b to more efficiently reach a vacuum condition. In the form illustrated, the vacuum chamber 775b and chambers 775g, 775h are filled approximately two thirds of the way full with liquid, such as water.

Figure 19C:
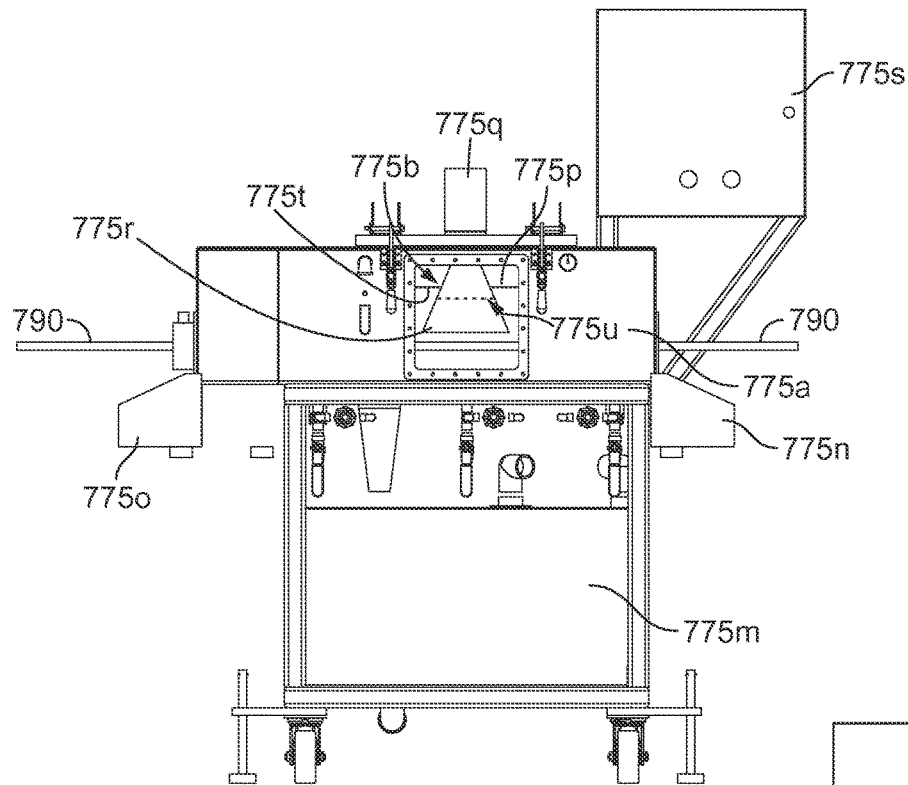
Figure 19D:
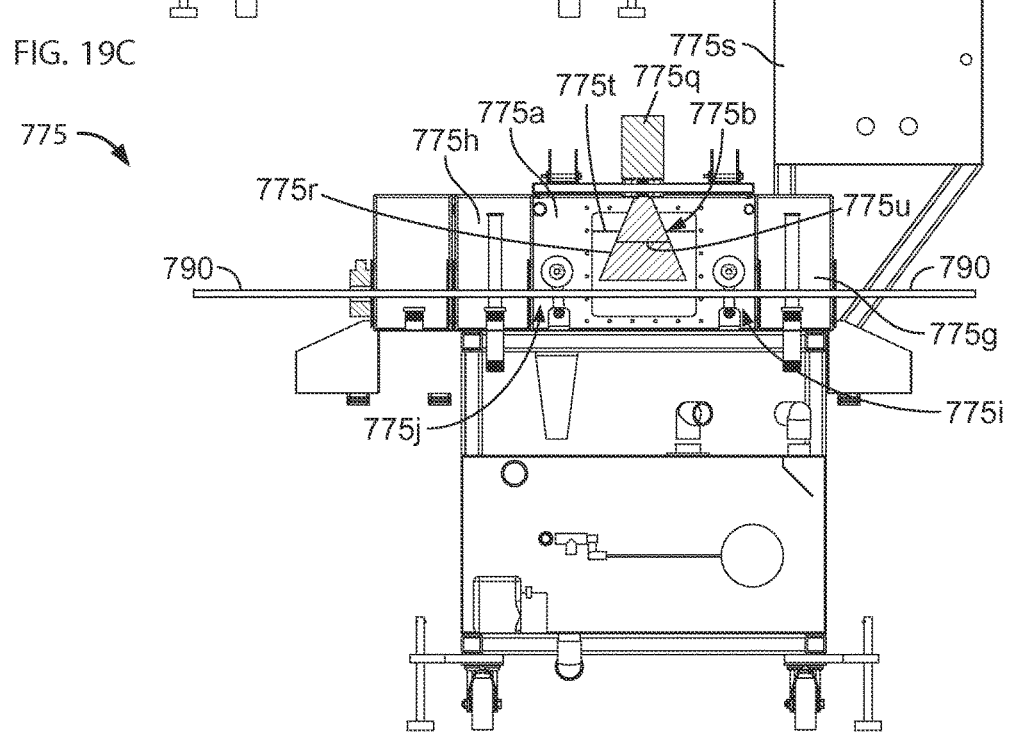
Figure 19E:
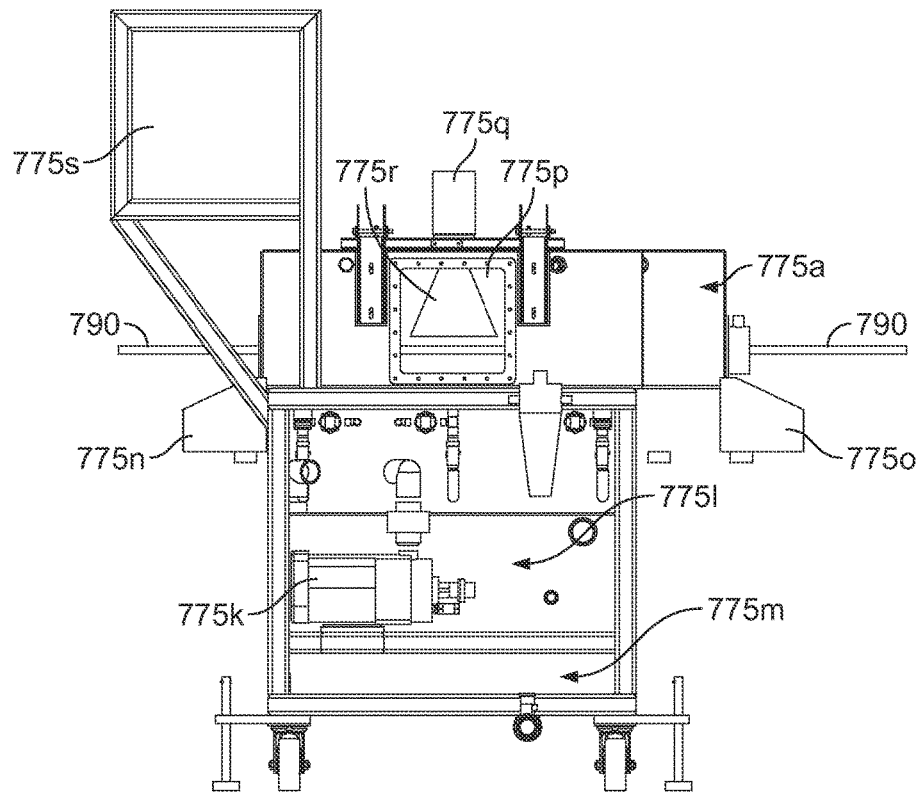
Figure 19F:
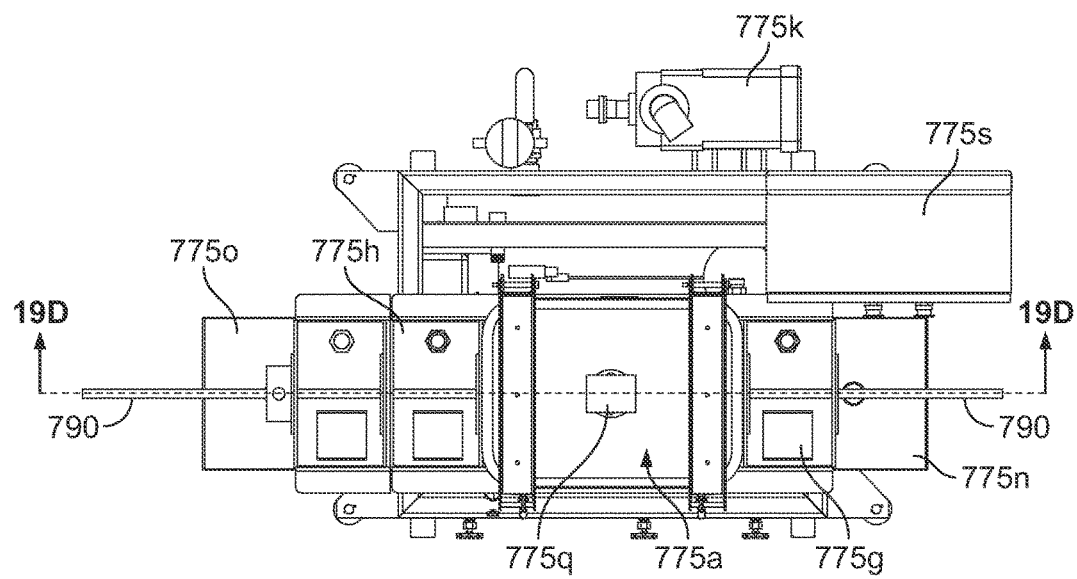

As best illustrated in the cross-sectional view of FIG. 19D, the tester 775 further includes guides 775i, 775j for stabilizing and guiding the conduit 790 as it moves through tester 775. An optional air knife blow off may also be included at the exit end of the tester 775 if desired. In the form illustrated, vacuum and water pumps 775k, 775l are located below the housing 775a and at least partially within the base or stand 775m. In addition, first and second drip trays 775n, 775o are positioned proximate the inlet opening 775c and outlet opening 775d, respectively, to collect excess water. The drip trays 775n, 775o include drains to allow the recaptured water to be recirculated for use with the tester 775 or elsewhere in the manufacturing line if desired.

In a preferred form, the tester 775 further includes at least one of a window, monitor or display, meter and camera for monitoring air escaping from outlet passages in the conduit 790 to detect excessive amounts of air which occurs with a poorly bonded emitter. More particularly, when the conduit 790 is run through the fluid filled vacuum chamber 790b, air is drawing through the emitter producing bubbles in the water. Any voids or poorly bonded areas of the emitter will be detectable by the quantity and size of the bubbles escaping from the emitter and conduit 790. If voids or faulty bonding is present, additional air will be drawn through the emitter thereby creating more bubbles. If these voids or poorly bonded emitters are allowed to remain in the drip line, the drip line will squirt water from the conduit at these points when put into use in the field and causing one area to receive much more water or fluid from the conduit than the remaining emitters in the drip line that are working properly. Thus, it is important to remove poorly bonded emitters so that the drip line works as intended and desired (i.e., with each emitter trickling or dripping a comparable amount of fluid out to the area surrounding the drip line.

In the form illustrated, the tester 775 includes windows 775p on opposite sides of housing 775a, which an operator may use to inspect bubbles escaping from emitter outlet passages in the conduit 790 as the conduit passes through the tester 775. In practice, however, it is desired to run the tubing 790 through the tester 775 at high rates of speed (e.g., 180 feet/minute, 300 feet/minute, or faster), thus, in a preferred form the tester will utilize an automated sensor for monitoring the amount of air or bubbles escaping from the conduit 790 in order to perform a consistent check that is capable of keeping up with such speeds. In the form illustrated, the tester 775 uses a flow meter 775q and collection cone 775r to deliver the air bubbles to the flow meter and measure the air escaping from each emitter outlet of the conduit 790. As an example, Alicat Scientific, Whisper Series Mass Flow Meter, Model 0-1 SLPM may be used for such a sensor.

When excessive air or bubbles are detected by the flow meter sensor 775q, the tester 775 will be programmed to shut off the reel or coiler 777 that coils the drip line 790. The tester 775 will also either cause the portion of the tubing with the poor emitter bond to be marked for later removal or activate a cutter for cutting this portion of the tubing or conduit from the drip line immediately at that time. While this is taking place, the tester 775 continues to draw drip line through the tester 775 so that the extrusion process 760 and the cutting or perforating process 774 do not have to be shutdown. Once the portion of tubing or conduit with the poor emitter bond is removed, the free ends of the drip line are reconnected to one another using a coupling, such as a straight coupling with barbed ends. Once the ends of the drip line are rejoined via the coupling, the reel or coiler 777 is reactivated allowing the drip line to continue being coiled.

In alternate embodiments, the tester 775 may be equipped with a camera for measuring the air or bubbles escaping from the outlets of the conduit 790 either in lieu of the flow meter 775q or in addition to the flow meter 775q. For example, a high resolution camera, such as the Cognex, In-Site 7402 model high resolution series vision system could be used for this purpose. In one form, a camera equipped tester 775 will also include a display (e.g., monitor, screen, etc.) that allows the camera's picture to be viewed either on a real time basis or in recall mode to illustrate the bubble image that led to a defective bond being detected.

Thus, tester 775 forms a bubble leak detection system that can identify if emitters are properly bonded to the inner surface of the conduit so that the finished product operates as intended (i.e., drip line with emitters that trickle fluid out at a generally constant flow rate so the areas surrounding each emitter receive comparable amounts of fluid). While, vacuum tanks or bubble leak detectors have been used in the past to test the integrity of extruded conduit to make sure it is free of leaks, none have been used in the manner disclosed herein to detect the sufficiency of the bond between conduit and in-line emitters. Rather, prior bubble leak detectors would be positioned upstream in the manufacturing process before perforators cut outlet openings in the conduit instead of being utilized downstream after the first puller 773 and/or cutter 774 as is disclosed herein. An additional vacuum or bubble leak tester could be added upstream in the current system 700, if desired, in order to also check the extruded conduit for leaks, however, this would be an optional feature.

Turning back to the embodiment of FIGS. 18-19H, the emitter bond tester 775 includes a controller 775s that monitors the bubble detection sensor 775q and takes the action discussed above when a faulty emitter bond is detected. It should be understood, however, that the tester 775 may either include its own controller or be connected to an existing controller in place in the manufacturing line (e.g., a master line controller, a logic controller for a nearby piece of equipment such as the pullers 773, 776, cutter 774, etc.). In a preferred form, the controller 775s will be local to the tester 775 and include an emergency shutoff switch as well in case the tester 775 needs to be shutdown. However, the controller could be placed elsewhere in the product line (e.g., connected to other equipment or freestanding) or operate remote from the product manufacturing line via a network, (e.g., LAN, WAN such as the Internet, etc.) and may be hard-wired to the equipment or wirelessly connected via wireless communication modules (e.g., Wi-Fi, Cellular, Bluetooth, RFID, NFC modules, etc.).

To further assist the tester 775 in detecting small leaks or low leak rates from the conduit or tubing 790, the tester may also be setup to create a pressure differential between the exterior or outside of the tapered guide (e.g., inverted funnel or collection cone 775r) and the interior or inside of the tapered guide 775r so that air escaping from the conduit 790 is directed toward the flow meter 775q. In one form, this pressure differential is created by keeping the level of the fluid outside of the tapered guide or cone 775r higher than the level of the fluid inside of the tapered guide or cone 775r. For example, in FIGS. 19C and 19D, a first fluid level of the fluid on the exterior of the tapered guide or cone 775r is illustrated and referenced by reference numeral 775t and a second fluid level of the fluid in the interior of the tapered guide or cone 775r is illustrated and referenced by reference numeral 775u. The first fluid level 775t and second fluid level 775u are different from one another and this difference in fluid level creates a pressure differential that urges escaped air from conduit 790 to flow up toward flow meter 775q.

Thus, an emitter bond tester 775 is illustrated for testing the bond between an emitter and a surrounding conduit to which the emitter is bonded to form drip line. In the form illustrated, the tester 775 includes a housing 775a defining a vacuum tank 775b capable of storing fluid within the tank. The housing 775a has first inlet opening 775c that forms a first seal 775d between the tester 775 and conduit 790 passing through the tester 775 and a second outlet opening 775e that forms a second seal 775f between the tester 775 and conduit 790 passing through the tester. A sensor, such as flow meter 775q, for detecting air bubbles or air leaks from the conduit 790 is illustrated connected to the housing 775a and having a guide 775r positioned at least in part within the fluid of the tank 775b and proximate the conduit 790 to capture air escaping from the conduit 790 to assist the flow meter 775q in detecting leaks. In a preferred form, tester 775 also includes a controller in communication with the flow meter 775q which is programmed to identify a poor bond between the emitter and conduit based on leaks detected by the flow meter or data provided by the flow meter 775q. In one form, the flow meter 775q is used to detect a leak rate of any air escaping from the conduit 790 and the controller identifies poor bonds based on leak rates at or above a predetermined threshold.

This configuration could be setup so that the detection of any air leakage signifies a poor emitter/conduit bond. Alternatively, it could be setup to allow for some leakage if the amount of air detected is not deemed sufficient to signify a bad bond between emitter and its surrounding conduit. For example, in some forms, the predetermined threshold for determining if a poor bond is present may be determined based on at least one of a size of the conduit being tested (e.g., inner diameter of tubing, tubing wall thickness, etc.), a size of the emitter bonded to the conduit, and/or a flow rate of the emitter bonded to the conduit.

In a preferred form, the controller is programmed to take some action once a faulty bond is detected between an emitter and the conduit. As mentioned above, this action could be to simply stop the product manufacturing line to correct the problem (e.g., remove the section of tubing or conduit with the poorly bonded emitter, mark the section for later removal, remove the section and reconnect the free ends of the line with a barbed coupler fitting, instruct the coiler to remove the section of tubing or conduit with the poorly bonded emitter, etc.).

In a preferred form, software or a non-transitory computer readable medium with computer executable instructions stored thereon executed by a processor is provided and run by the controller to perform the above mentioned methods of checking the bond between the emitter and surrounding conduit to which the emitter is bonded in the product ion or to form drip line. For example, in one form, the method includes monitoring a sensor positioned proximate the conduit for air escaping from the conduit, identifying a poor bond between the emitter and surrounding conduit when the air escaping from the conduit is at or above a predetermined threshold, and taking corrective action in response to an identified poor bond to prevent said poorly bonded emitter from remaining in finished drip line in a present state. If the sensor is a flow meter, the method of monitoring the sensor may include monitoring the flow meter to detect air escaping form the conduit. In a preferred form, the flow meter will have a tapered guide for directing air escaping from the conduit toward the flow meter, and the method will include disposing at least a portion of the tapered guide and the conduit into a fluid and creating a pressure differential between an interior of the tapered guide and an exterior of the tapered guide to assist in directing escaped air toward the flow meter so that small leaks may be detected.

In addition to the above mentioned embodiments, it should be appreciated that several methods are also disclosed herein. For example, methods for checking the bond between an emitter and surrounding conduit is disclosed herein, as is a method for manufacturing drip line having such an emitter bond tester. A method of assembling a drip line is disclosed, as are methods for detecting defective emitters or leaks. It should be understood that these method and apparatus for checking emitter bonds may be used for any in-line emitters, not just elastomeric emitters.

Many different embodiments and methods have been provided herein, thus, it should be understood that the following claims are not exhaustive and that many more alternate embodiments and methods in accordance with the disclosure set forth herein are contemplated in the appended claims. For example, of the numerous different concepts discussed, it should be understood that alternate embodiments are contemplated that utilize any one of these concepts on their own or combine, mix or match any number of these concepts in different ways.

Thus it is apparent that there has been provided, in accordance with the invention, apparatus for transporting and/or inserting elastomeric emitters, apparatus for manufacturing and assembling drip line using elastomeric emitters and methods relating to same that fully satisfy the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A production line with emitter bond tester for testing the bond between an emitter and a surrounding conduit to which the emitter is bonded to form drip line, the tester comprising:
    a housing defining a vacuum chamber capable of storing fluid within the chamber, the housing defining a first inlet opening that forms a first seal between the tester and conduit passing through the tester and a second outlet opening that forms a second seal between the tester and conduit passing through the tester;
    wherein the tester further includes at least one of a display, meter or camera for monitoring air escaping from outlet passages in the conduit into the vacuum chamber;
    wherein the housing is positioned downstream of a conduit extruder, a conduit cooling tank and an outlet passage cutter for making the outlet passages in the conduit.

2. The production line with emitter bond tester of claim 1 wherein the at least one display, meter or camera comprises a camera disposed in a first portion of the housing for providing a first position for monitoring air escaping from outlet passages in the conduit and a window disposed in a second portion of the housing, different than the first portion, for providing a second position for monitoring air escaping from outlet passages of the conduit, the second position being different than the first position.

3. The production line with emitter bond tester of claim 1 wherein the at least one display, meter or camera comprises a camera connected to the housing in a first portion of the housing and positioned to capture images of the air escaping from the outlet passages of the conduit and a window disposed in a second portion of the housing different than the first portion such that the window and camera are spaced apart from one another to provide for further visual inspection beyond that provided by the camera.

4. The production line with emitter bond tester of claim 1 wherein the at least one display, meter or camera comprises a flow meter positioned to detect air escaping from the outlet passages of the conduit.

5. The production line with emitter bond tester of claim 1 further comprising a controller coupled the emitter bond tester to monitor at least one of the flow meter or the camera and to stop production of the conduit.

6. The production line with emitter bond tester of claim 2 further comprising at least one of a downstream reel and a controller, wherein the controller executes a command instructing the downstream reel to stop.

7. The production line with emitter bond tester of claim 1 wherein the tester further includes first and second drip compartments positioned proximate the first and second seals to catch fluid leaking from the tester.

8. The production line with emitter bond tester of claim 7 wherein the first and second drip compartments include drains for draining the leaked fluid from the drip compartments.

9. The production line with emitter bond tester of claim 1 further comprising a vacuum pump for lowering pressure within the vacuum chamber.

10. The production line with emitter bond tester of claim 9 further comprising a base or stand to which the housing and vacuum pump are connected.

11. The production line with emitter bond tester of claim 10 wherein the housing is connected atop the base or stand and at least a portion of the vacuum pump is disposed within the base or stand, the base or stand further having a plurality of wheels for allowing the tester to be moved.

12. The production line with emitter bond tester of claim 4 wherein the flow meter has a tapered guide for directing the amount of air escaping from outlet passages in the conduit to the flow meter in order to measure the amount of escaping air.

13. The production line with emitter bond tester of claim 12 wherein fluid stored within the housing is at a first level outside of the tapered guide and at a second level inside the tapered guide, with the second level being different from the first level in order to create a pressure differential to urge escaped air from outlet passages of the conduit to flow to the tapered guide and the flow meter.

14. A production line with emitter bond tester for testing the bond between an emitter and a surrounding conduit to which the emitter is bonded to form drip line, the tester comprising:
    a housing defining a vacuum tank capable of storing fluid within the tank, a first inlet opening that forms a first seal between the tester and conduit passing through the tester and a second outlet opening that forms a second seal between the tester and conduit passing through the tester;
    a flow meter connected to the housing and having a guide positioned at least in part within fluid within the tank and proximate the conduit to capture air escaping from openings formed in the conduit to assist the flow meter in measuring the escaping air;
    a controller in communication with the flow meter to monitor the flow meter;
    wherein the flow meter detects a leak rate of air escaping from the openings formed in the conduit; and
    wherein the emitter bond tester is positioned downstream of a cutter for making the openings formed in the conduit.

15. The production line with emitter bond tester of claim 1 wherein the emitter bond tester is a standalone component.

16. The production line with emitter bond tester of claim 14 wherein fluid stored within the housing is at a first level outside of the guide and at a second level inside the guide, with the second level being different from the first level in order to create a pressure differential to urge escaped air from outlet passages of the conduit to flow to the tapered guide and the flow meter.

17. The production line with emitter bond tester of claim 16 wherein the first fluid level outside of the guide is higher than the second fluid level fluid level inside the guide to create the pressure differential.

18. The production line with emitter bond tester of claim 14 wherein the emitter bond tester is a standalone component.

19. A production line with emitter bond tester comprising:
an emitter insertion tool;
an extruder into which the emitter insertion tool may be at least partially disposed to connect individual emitters to tubing extruded by the extruder;
a vacuum sizing tank containing fluid and positioned downstream of the extruder to receive the extruded tubing and assist in maintaining a desired form of the extruded tubing;
a cutter positioned downstream of the vacuum sizing tank to make holes in the extruded tubing, each hole being associated with one of the emitters; and
an emitter bond tester positioned downstream of the cutter and comprising a second separate fluid filled vacuum tank and having:

a housing defining a vacuum tank capable of storing fluid within the tank, a first inlet opening that forms a first seal between the tester and the extruded tubing passing through the tester and a second outlet opening that forms a second seal between the tester and extruded tubing passing through the tester;
a flow meter connected to the housing and having a guide positioned at least in part within the fluid of the tank to capture air escaping from openings in the extruded tubing to assist the flow meter in collecting the escaped air;
a controller in communication with the flow meter to monitor the flow meter; and
wherein the flow meter detects a flow rate of air escaping from openings in the extruded tubing.

\* \* \* \* \*

UNITED STATES PATENT AND TRADEMARK OFFICE
CERTIFICATE OF CORRECTION

PATENT NO. : 10,330,559 B2
APPLICATION NO. : 14/851545
DATED : June 25, 2019
INVENTOR(S) : Mark Richard Edris et al.

Page 1 of 1

It is certified that error appears in the above-identified patent and that said Letters Patent is hereby corrected as shown below:

In the Claims

Column 30, Line 66, in Claim 17, delete the second occurrence of "fluid level"

Signed and Sealed this
Third Day of September, 2019

Andrei Iancu
*Director of the United States Patent and Trademark Office*